(12) United States Patent
Midorikawa

(10) Patent No.: US 6,373,893 B1
(45) Date of Patent: Apr. 16, 2002

(54) MOTION VECTOR DETECTION DEVICE

(75) Inventor: Masayuki Midorikawa, Tokyo (JP)

(73) Assignee: Oki Electric Industry Co., Ltd., Tokyo (JP)

( * ) Notice: Subject to any disclaimer, the term of this patent is extended or adjusted under 35 U.S.C. 154(b) by 0 days.

(21) Appl. No.: 09/216,870

(22) Filed: Dec. 21, 1998

(30) Foreign Application Priority Data

Dec. 26, 1997 (JP) .............................................. 9-359784

(51) Int. Cl.[7] .................................................. H04B 1/66
(52) U.S. Cl. ............................ 375/240.16; 375/240.24; 382/236
(58) Field of Search ....................... 375/240.16, 240.12, 375/240.13, 240.24, 240.14, 240.17; 348/415.1, 699, 407.1, 402.1, 413.1, 416.1; 382/236, 107

(56) References Cited

U.S. PATENT DOCUMENTS 5,398,078 A * 3/1995 Masuda et al. ............. 348/699
5,453,789 A * 9/1995 Machida et al. ........ 375/240.16
5,543,848 A * 8/1996 Murakami et al. ....... 348/416.1
5,754,237 A * 5/1998 Jung .......................... 348/413
5,838,827 A * 11/1998 Kobayashi et al. ......... 382/236

* cited by examiner

Primary Examiner—Chris Kelley
Assistant Examiner—Gims Philippe
(74) Attorney, Agent, or Firm—Venable; Robert J. Frank

(57) ABSTRACT

The invention intends to provide a motion vector detecting device capable of increasing the processing speed and simplifying the construction of the device. The motion vector detecting device relating to the invention searches a block most similar to a reduced image of a gazed block from reduced images of the reference region as a first step, and searches a block most similar to the gazed block from a part including the block searched in the first step, of the reference region not reduced, as a second step. And, the motion vector detecting device stores the gazed block and the reference region in the internal memory, and executes the first step and the second step. Further, the device contains an image processing unit that reduces at least one of the gazed block and the reference region into a form that can be used in the first step, and thereafter transfers the reduced one to the internal memory.

18 Claims, 55 Drawing Sheets

FIG. 15
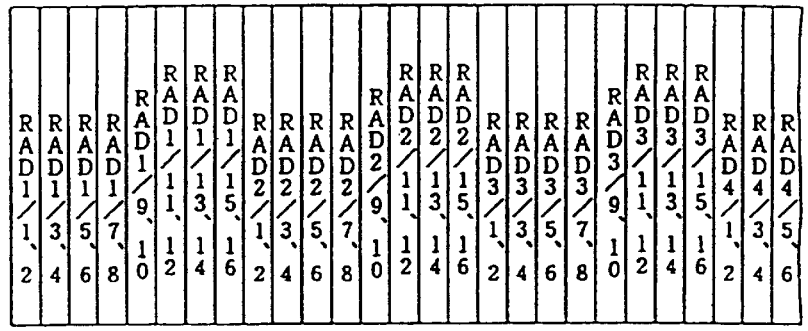
MEEMRAD
MEEMRDEN
SRAM READ DATA
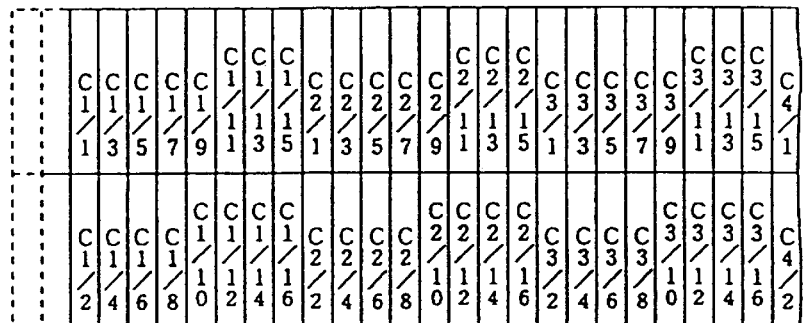
MEEMWAD
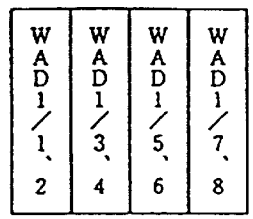
MEEMWEN
MEEMWTPL
SRAM WRITE DATA
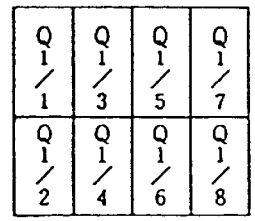

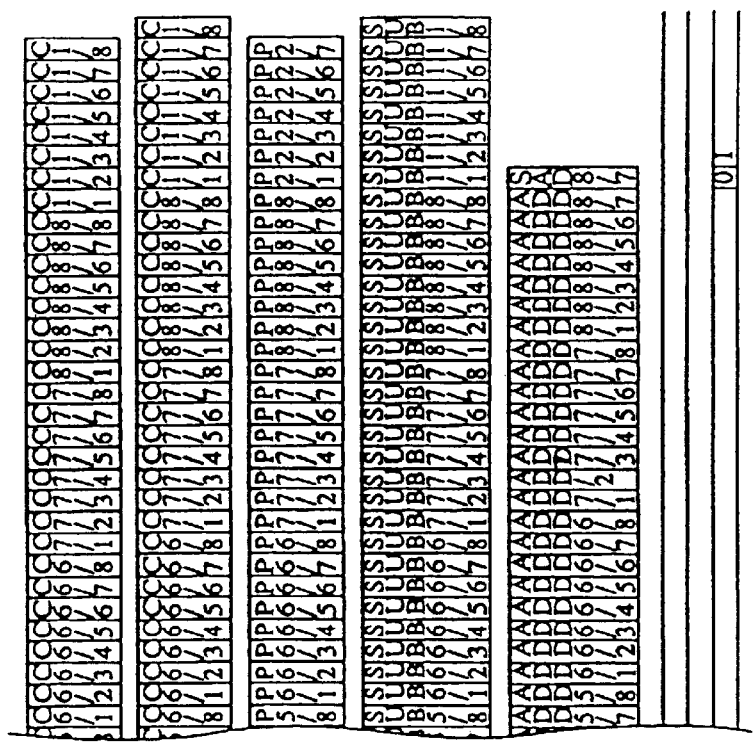
FIG. 25
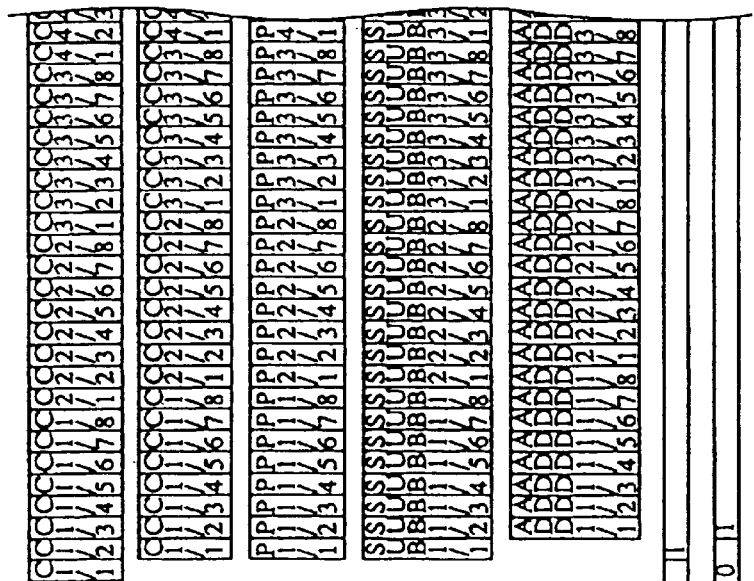

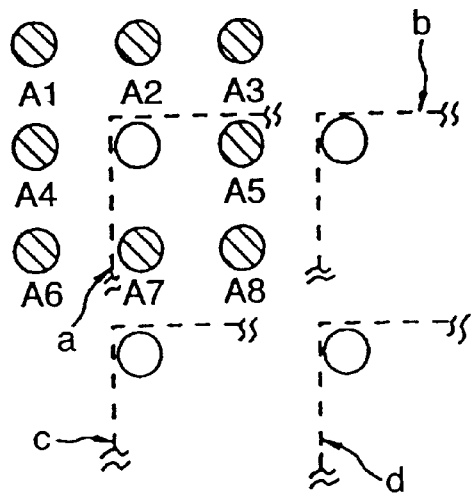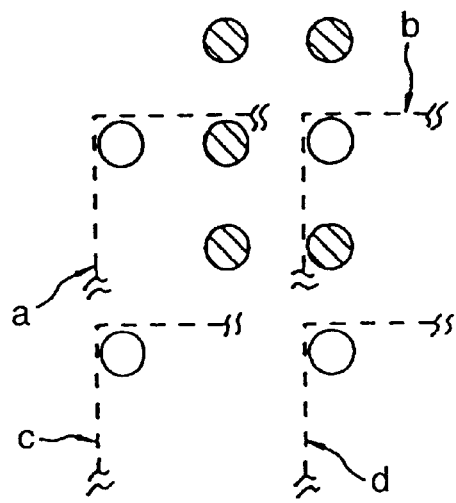
FIG. 31(A)　　　　　　　FIG. 31(B)
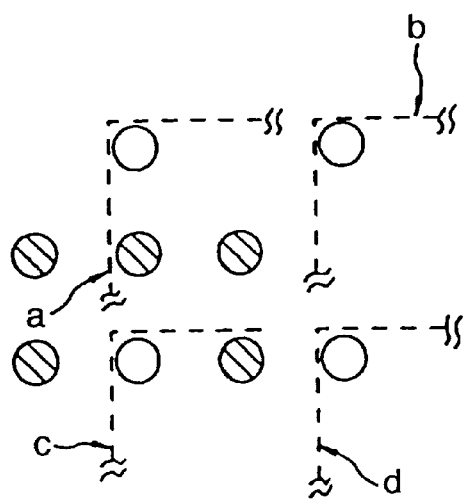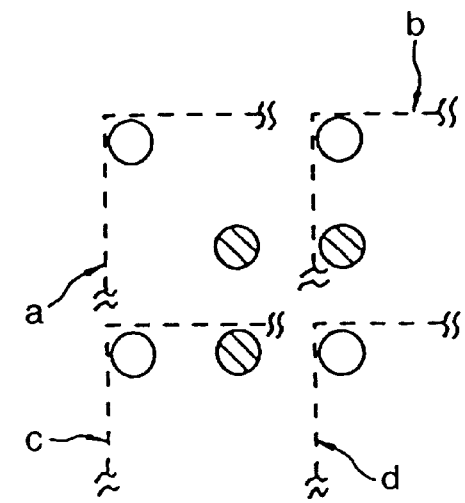
FIG. 31(C)　　　　　　　FIG. 31(D)

FIG. 33

| Signal | Value |
|---|---|
| SELPREV1 | 2 |
| SELPREV2 | 1 |
| SELPREV3 | 1 |
| SELPREV4 | 0 |
| SELPREV5 | 0 |
| SELPREV11 | 3 |
| SELPREV12 | 4 |
| SELPREV13 | 4 |
| SELPREV15 | 5 |
| SELPREV 0,6-10,14 | 7 |
| SUBCLR1 | 0 1 0 1 |
| SUBCLR2 | 0 1 0 1 |
| SUBCLR3 | 0 1 0 1 |
| SUBCLR4 | 0 1 0 1 |
| SUBCLR5 | 0 1 0 1 |
| SUBCLR11 | 0 1 0 1 |
| SUBCLR12 | 0 1 0 1 |
| SUBCLR13 | 0 1 0 1 |
| SUBCLR14 | 0 1 0 1 |
| SUBCLR 0,6~10,14 | 0 |
| SADCLR1 | 0 1 |
| SADCLR2 | 0 1 |
| SADCLR3 | 0 1 |
| SADCLR4 | 0 1 |
| SADCLR5 | 0 1 |
| SADCLR11 | 0 1 |
| SADCLR12 | 0 1 |
| SADCLR13 | 0 1 |
| SADCLR15 | 0 1 |
| SADCLR 0,6~10,14 | 0 |
| SELSAD | 15 | tz     tz+n

| SELMEM | MEMD | MEMTH |
|---|---|---|
| 00 | DRAM DATA | 0 |
| 01 | SRAM DATA | DRAM DATA |
| 10 | SRAM DATA | 0 |
| 11 | 0 | SRAM DATA |

FIG. 39

| SELPEL | OUTPUT OF SELECTOR 415 | OUTPUT OF SELECTOR 416 | OUTPUT OF SELECTOR 418 |
|---|---|---|---|
| 0 | OUTPUT OF FF 404 | OUTPUT OF FF 405 | OUTPUT OF FF 407 |
| 1 | OUTPUT OF FF 411 | OUTPUT OF FF 412 | OUTPUT OF FF 414 |

FIG. 40

| SEL54 | SELPEL | OUTPUT OF SELECTOR 417 |
|---|---|---|
| 0 | 0 | OUTPUT FO FF 406 |
| 0 | 1 | OUTPUT OF FF 413 |
| 1 | x | OUTPUT OF FF 404 |
| 2 | x | OUTPUT OF FF 410 |
| 3 | x | OUTPUT OF FF 405 |
| 4 | x | OUTPUT OF FF 411 |
| 5 | x | OUTPUT OF FF 406 |
| 6 | x | OUTPUT OF FF 412 |
| 7 | x | OUTPUT OF FF 407 |
| 8 | x | OUTPUT OF FF 413 |
| 9 | x | OUTPUT OF FF 408 |

FIG. 41

| SELIDCT2 | OUTPUT OF SELECTOR 501 | OUTPUT OF SELECTOR 502 |
|---|---|---|
| 0 | 0 | 0 |
| 1 | SP0 | DVHP1 |
| 2 | SP1 | SP2 |
| 3 | THRD0 | THRD1 |

FIG. 42

| SELCGEN | OUTPUT OF SELECTOR 503 |
|---|---|
| 0 | OUTPUT OF FF 521 |
| 1 | OUTPUT OF FF 511 |

FIG. 43

| SELIDCT | OUTPUT OF SELECTOR 504 |
|---|---|
| 0 | HVHP3 |
| 1 | SP0 |

FIG. 44

| SELADV | OUTPUT OF SELECTOR 505 |
|---|---|
| 0 | OUTPUT OF FF 520 |
| 1 | OUTPUT OF FF 504 |

FIG. 45

| SELC | OUTPUT OF SELECTOR 601 |
|---|---|
| 0 | C |
| 1 | OUTPUT OF FF 609 |

FIG. 46

| SELP0 | OUTPUT OF SELECTOR 602 |
|---|---|
| 0 | SP0 |
| 1 | HHP0 |

FIG. 47

| SELP3 | OUTPUT OF SELECTOR 603 |
|---|---|
| 0 | HVHP3 |
| 1 | QP4 |

FIG. 48

| SELP1 | OUTPUT OF SELECTOR 604 |
|---|---|
| 0 | SP1 |
| 1 | DQP1 |

FIG. 49

| SELP2 | OUTPUT OF SELECTOR 605 |
|---|---|
| 0 | SP2 |
| 1 | DVHP1 |

FIG. 50

| SELDLY | OUTPUT OF SELECTOR 607 | OUTPUT OF SELECTOR 608 |
|---|---|---|
| 0 | OUTPUT OF FF 618 | OUTPUT OF FF 617 |
| 1 | OUTPUT OF FF 617 | OUTPUT OF FF 627 |

FIG. 51

| SELIM | OUTPUT OF SELECTOR 627 |
|---|---|
| 0 | OUTPUT OF FF 623 |
| 1 | OUTPUT OF FF 624 |
| 2 | OUTPUT OF FF 625 |
| 3 | OUTPUT OF FF 626 |

FIG. 52

| SELPREV0 | OUTPUT OF SELECTOR 751 |
|---|---|
| 0 | OUTPUT OF FF 717 |
| 1 | OUTPUT OF FF 718 |
| 2 | OUTPUT OF FF 719 |
| 3-7 | 0 |

FIG. 53

| SELPREV1 | OUTPUT OF SELECTOR 752 |
|---|---|
| 0 | OUTPUT OF FF 717 |
| 1 | OUTPUT OF FF 718 |
| 2 | OUTPUT OF FF 719 |
| 3 | OUTPUT OF FF 720 |
| 4-7 | 0 |

FIG. 54

| SELPREV2 | OUTPUT OF SELECTOR 753 |
|---|---|
| 0 | OUTPUT OF FF 717 |
| 1 | OUTPUT OF FF 718 |
| 2 | OUTPUT OF FF 719 |
| 3 | OUTPUT OF FF 720 |
| 4-7 | 0 |

FIG. 55

| SELPREV3 | OUTPUT OF SELECTOR 754 |
|---|---|
| 0 | OUTPUT OF FF 717 |
| 1 | OUTPUT OF FF 718 |
| 2 | OUTPUT OF FF 719 |
| 3 | OUTPUT OF FF 720 |
| 4-7 | 0 |

FIG. 56

| SELPREV4 | OUTPUT OF SELECTOR 755 |
|---|---|
| 0 | OUTPUT OF FF 717 |
| 1 | OUTPUT OF FF 718 |
| 2 | OUTPUT OF FF 719 |
| 3-7 | 0 |

FIG. 57

| SELPREV5 | OUTPUT OF SELECTOR 756 |
|---|---|
| 0 | OUTPUT OF FF 717 |
| 1 | OUTPUT OF FF 718 |
| 2 | OUTPUT OF FF 719 |
| 3-7 | 0 |

FIG. 58

| SELPREV6 | OUTPUT OF SELECTOR 757 |
|---|---|
| 0 | OUTPUT OF FF 717 |
| 1 | OUTPUT OF FF 718 |
| 2 | OUTPUT OF FF 719 |
| 3-7 | 0 |

FIG. 59

| SELPREV7 | OUTPUT OF SELECTOR 758 |
|---|---|
| 0 | OUTPUT OF FF 717 |
| 1 | OUTPUT OF FF 718 |
| 2 | OUTPUT OF FF 719 |
| 3-7 | 0 |

FIG. 60

| SELPREV8 | OUTPUT OF SELECTOR 759 |
|---|---|
| 0 | OUTPUT OF FF 717 |
| 1 | OUTPUT OF FF 718 |
| 2 | OUTPUT OF FF 719 |
| 3-7 | 0 |

FIG. 61

| SELPREV9 | OUTPUT OF SELECTOR 760 |
|---|---|
| 0 | OUTPUT OF FF 717 |
| 1 | OUTPUT OF FF 718 |
| 2 | OUTPUT OF FF 719 |
| 3-7 | 0 |

FIG. 62

| SELPREV10 | OUTPUT OF SELECTOR 761 |
|---|---|
| 0 | OUTPUT OF FF 717 |
| 1 | OUTPUT OF FF 718 |
| 2 | OUTPUT OF FF 719 |
| 3-7 | 0 |

FIG. 63

| SELPREV11 | OUTPUT OF SELECTOR 762 |
|---|---|
| 0 | OUTPUT OF FF 717 |
| 1 | OUTPUT OF FF 718 |
| 2 | OUTPUT OF FF 719 |
| 3 | OUTPUT OF FF 720 |
| 3-7 | 0 |

FIG. 64

| SELPREV12 | OUTPUT OF SELECTOR 763 |
|---|---|
| 0 | OUTPUT OF FF 717 |
| 1 | OUTPUT OF FF 718 |
| 2 | OUTPUT OF FF 719 |
| 3 | OUTPUT OF FF 720 |
| 4 | OUTPUT OF FF 721 |
| 5-7 | 0 |

FIG. 65

| SELPREV13 | OUTPUT OF SELECTOR 764 |
|---|---|
| 0 | OUTPUT OF FF 717 |
| 1 | OUTPUT OF FF 718 |
| 2 | OUTPUT OF FF 719 |
| 4 | OUTPUT OF FF 720 |
| 3,5-7 | 0 |

FIG. 66

| SELPREV14 | OUTPUT OF SELECTOR 765 |
|---|---|
| 0 | OUTPUT OF FF 717 |
| 1 | OUTPUT OF FF 718 |
| 2 | OUTPUT OF FF 719 |
| 3-7 | 0 |

FIG. 67

| SELPREV15 | OUTPUT OF SELECTOR 766 |
|---|---|
| 0 | OUTPUT OF FF 717 |
| 1 | OUTPUT OF FF 718 |
| 2 | OUTPUT OF FF 719 |
| 5 | MB MEAN |
| 3,4,6-7 | 0 |

FIG. 68

| SELSAD | OUTPUT OF SELECTOR 767 |
|---|---|
| 0 | OUTPUT OF PE 731 |
| 1 | OUTPUT OF PE 732 |
| 2 | OUTPUT OF PE 733 |
| 3 | OUTPUT OF PE 734 |
| 4 | OUTPUT OF PE 735 |
| 5 | OUTPUT OF PE 736 |
| 6 | OUTPUT OF PE 737 |
| 7 | OUTPUT OF PE 738 |
| 8 | OUTPUT OF PE 739 |
| 9 | OUTPUT OF PE 740 |
| 10 | OUTPUT OF PE 741 |
| 11 | OUTPUT OF PE 742 |
| 12 | OUTPUT OF PE 743 |
| 13 | OUTPUT OF PE 744 |
| 14 | OUTPUT OF PE 745 |
| 15 | OUTPUT OF PE 746 |

FIG. 69

| SELSUBD | OUTPUT OF SELECTOR 768 |
|---|---|
| 0 | 0 |
| 1 | OUTPUT OF PE 732 |
| 2 | OUTPUT OF PE 733 |
| 3 | OUTPUT OF PE 734 |

FIG. 70

| SELPARA | OUTPUT OF SELECTOR 1205 |
|---|---|
| 2 | OUTPUT OF LATCH CIRCUIT 1203 |
| 4 | OUTPUT OF LATCH CIRCUIT 1201 |
| 5 | OUTPUT OF LATCH CIRCUIT 1202 |
| 7 | OUTPUT OF LATCH CIRCUIT 1204 |
| 0,1,3,6 | 0 |

FIG. 71

| SRAM CLOCK | USE FOR | |
|---|---|---|
| E0 | PRESENT SCREEN REGION Y1 BLOCK REGION | |
| E1 | PRESENT SCREEN REGION Y2 BLOCK REGION | |
| E2 | PRESENT SCREEN REGION Y3 BLOCK REGION | |
| E3 | PRESENT SCREEN REGION Y4 BLOCK REGION | |
| E4 | PRESENT SCREEN 4 PIXEL AVERAGE REGION | |
| E5 | REFERENCE SCREEN 4 PIXEL AVERAGE REGION 0 | BLOCK0 |
| E6 | REFERENCE SCREEN 4 PIXEL AVERAGE REGION 1 | |
| E7 | REFERENCE SCREEN 4 PIXEL AVERAGE REGION 2 | |
| E8 | REFERENCE SCREEN 4 PIXEL AVERAGE REGION 3 | BLOCK1 |
| E9 | REFERENCE SCREEN 4 PIXEL AVERAGE REGION 4 | |
| E10 | REFERENCE SCREEN 4 PIXEL AVERAGE REGION 5 | |
| E11 | REFERENCE SCREEN 4 PIXEL AVERAGE REGION 6 | BLOCK2 |
| E12 | REFERENCE SCREEN 4 PIXEL AVERAGE REGION 7 | |
| E13 | REFERENCE SCREEN 4 PIXEL AVERAGE REGION 8 | |
| E14 | REFERENCE SCREEN REGION 0 | |
| E15 | REFERENCE SCREEN REGION 1 | |
| E16 | REFERENCE SCREEN REGION 2 | |
| E17 | REFERENCE SCREEN REGION 3 | |
| E18 | REFERENCE SCREEN REGUIN 4 | |
| E19 | REFERENCE SCREEN REGION 5 | |

FIG. 72

| R1/1 | R1/2 | | | | | | R1/8 |
|---|---|---|---|---|---|---|---|
| R2/1 | R2/2 | | | | | | |
| R3/1 | R3/2 | | | | | | |
| R4/1 | R4/2 | | | | | | |
| | | | | | | | |
| | | | | | | | |
| | | | | | | | |
| | | | | | | | |
| R9/1 | | | | | | | R9/8 |
| | | | | | | | |

FIG. 73

| RQ1/1 | RQ1/2 | | RQ1/4 |
|---|---|---|---|
| RQ2/1 | | | |
| | | | |
| | | | |
| RQ5/1 | | | RQ5/4 |

FIG. 74

| PROCESS | CONTENT |
|---|---|
| PRESENT SCREEN READ (CDLC PROCESS) | READ PIXEL DATA OF GAZED BLOCK OF PRESENT SCREEN FROM EXTERNAL DRAM TO STORE IN SRAM |
| 4 PIXEL AVERAGE (IMAGE REDUCTION: 1/4 IGC PROCESS) | GENERATE 4 PIXEL AVERAGE IMAGE OF GAZED BLOCK TO STORE IN SRAM |
| REFERENCE SCREEN READ 1 (DLC1 PROCESS) | READ PIXEL DATA OF REFERENCE SCREEN (48 x 16) FROM EXTERNAL DRAM, GENERATE 4 PIXEL AVERAGE (REDUCED IMAGE)TO STORE IN SRAM |
| FIRST STEP SEARCH (S1VDC PROCESS) | SEARCH VECTOR, USING 4 PIXEL AVERAGE, OF BOTH GAZED BLOCK AND REFERENCE SCREEN |
| REFERENCE SCREEN READ 2 (DLC2 PROCESS) | READ PIXEL DATA OF REFERENCE SCREEN (18 x 18) SURROUNDING CANDIDATE VECTOR OUTPUTTED BY S1VDC PROCESS FROM EXTERNAL DRAM TO STORE IN SRAM |
| SECOND STEP SEARCH (S2VDC PROCESS) | SEARCH VECTOR, USING INTEGER PIXEL SCREEN, OF BOTH GAZED BLOCK AND REFERENCE SCREEN |
| THIRD STEP SEARCH (S3VDC PROCESS) | MAKE A REFERENCE SCREEN OF HALF PIXEL ACCURACY AND SEARCH VECTOR |

FIG. 75

| Q1/1 | Q1/2 | Q1/3 | Q1/4 | Q1/5 | Q1/ | /12 | Q1/13 | Q1/14 | Q1/15 | Q1/16 | Q1/17 |
|---|---|---|---|---|---|---|---|---|---|---|---|
| Q2/1 | Q2/2 | Q2/3 | Q2/4 | Q2/5 | Q2/ | 2/12 | Q2/13 | Q2/14 | Q2/15 | Q2/16 | Q2/17 |
| Q3/1 | Q3/2 | Q3/3 | Q3/4 | Q3/5 | Q3/ | 3/12 | Q3/13 | Q3/14 | Q3/15 | Q3/16 | Q3/17 |
| Q4/1 | Q4/2 | Q4/3 | Q4/4 | Q4/5 | Q4/ | 4/12 | Q4/13 | Q4/14 | Q4/15 | Q4/16 | Q4/17 |
| Q5/1 | Q5/2 | Q5/3 | Q5/4 | Q5/5 | Q5/ | 5/12 | Q5/13 | Q5/14 | Q5/15 | Q5/16 | Q5/17 |
| Q6/1 | Q6/2 | Q6/3 | Q6/4 | Q6/5 | Q6/ | /12 | Q6/13 | Q6/14 | Q6/15 | Q6/16 | Q6/17 |
| Q7/1 | Q7/2 | Q7/3 | Q7/4 | Q7/5 | Q7/ | /12 | Q7/13 | Q7/14 | Q7/15 | Q7/16 | Q7/17 |
| Q8/1 | Q8/2 | Q8/3 | Q8/4 | Q8/5 | Q8/ | /12 | Q8/13 | Q8/14 | Q8/15 | Q8/16 | Q8/17 |
| Q9/1 | Q9/2 | Q9/3 | Q9/4 | Q9/5 | Q9/ | /12 | Q9/13 | Q9/14 | Q9/15 | Q9/16 | Q9/17 |
| Q10/1 | Q10/2 | Q10/3 | Q10/4 | Q10/5 | Q10/ | 0/12 | Q10/13 | Q10/14 | Q10/15 | Q10/16 | Q10/17 |
| Q11/1 | Q11/2 | Q11/3 | Q11/4 | Q11/5 | Q11/ | 1/12 | Q11/13 | Q11/14 | Q11/15 | Q11/16 | Q11/17 |
| Q12/1 | Q12/2 | Q12/3 | Q12/4 | Q12/5 | Q12/ | 2/12 | Q12/13 | Q12/14 | Q12/15 | Q12/16 | Q12/17 |
| Q13/1 | Q13/2 | Q13/3 | Q13/4 | Q13/5 | Q13/ | 3/12 | Q13/13 | Q13/14 | Q13/15 | Q13/16 | Q13/17 |
| Q14/1 | Q14/2 | Q14/3 | Q14/4 | Q14/5 | Q14/ | 4/12 | Q14/13 | Q14/14 | Q14/15 | Q14/16 | Q14/17 |
| Q15/1 | Q15/2 | Q15/3 | Q15/4 | Q15/5 | Q15/ | 5/12 | Q15/13 | Q15/14 | Q15/15 | Q15/16 | Q15/17 |
| Q16/1 | Q16/2 | Q16/3 | Q16/4 | Q16/5 | Q16/ | 6/12 | Q16/13 | Q16/14 | Q16/15 | Q16/16 | Q16/17 |
| Q17/1 | Q17/2 | Q17/3 | Q17/4 | Q17/5 | Q17/ | 7/12 | Q17/13 | Q17/14 | Q17/15 | Q17/16 | Q17/17 |

FIG. 76

| Q1/1 | Q1/2 | Q1/3 | Q1/4 | Q1/5 | Q1/ | /12 | Q1/13 | Q1/14 | Q1/15 | Q1/16 | Q1/17 |
|---|---|---|---|---|---|---|---|---|---|---|---|
| Q2/1 | Q2/2 | Q2/3 | Q2/4 | Q2/5 | Q2/ | 2/12 | Q2/13 | Q2/14 | Q2/15 | Q2/16 | Q2/17 |
| Q3/1 | Q3/2 | Q3/3 | Q3/4 | Q3/5 | Q3/ | 3/12 | Q3/13 | Q3/14 | Q3/15 | Q3/16 | Q3/17 |
| Q4/1 | Q4/2 | Q4/3 | Q4/4 | Q4/5 | Q4/ | 4/12 | Q4/13 | Q4/14 | Q4/15 | Q4/16 | Q4/17 |
| Q5/1 | Q5/2 | Q5/3 | Q5/4 | Q5/5 | Q5/ | 5/12 | Q5/13 | Q5/14 | Q5/15 | Q5/16 | Q5/17 |
| Q6/1 | Q6/2 | Q6/3 | Q6/4 | Q6/5 | Q6/ | /12 | Q6/13 | Q6/14 | Q6/15 | Q6/16 | Q6/17 |
| Q7/1 | Q7/2 | Q7/3 | Q7/4 | Q7/5 | Q7/ | /12 | Q7/13 | Q7/14 | Q7/15 | Q7/16 | Q7/17 |
| Q8/1 | Q8/2 | Q8/3 | Q8/4 | Q8/5 | Q8/ | /12 | Q8/13 | Q8/14 | Q8/15 | Q8/16 | Q8/17 |
| Q9/1 | Q9/2 | Q9/3 | Q9/4 | Q9/5 | Q9/ | /12 | Q9/13 | Q9/14 | Q9/15 | Q9/16 | Q9/17 |
| Q10/1 | Q10/2 | Q10/3 | Q10/4 | Q10/5 | Q10/ | 0/12 | Q10/13 | Q10/14 | Q10/15 | Q10/16 | Q10/17 |
| Q11/1 | Q11/2 | Q11/3 | Q11/4 | Q11/5 | Q11/ | 1/12 | Q11/13 | Q11/14 | Q11/15 | Q11/16 | Q11/17 |
| Q12/1 | Q12/2 | Q12/3 | Q12/4 | Q12/5 | Q12/ | 2/12 | Q12/13 | Q12/14 | Q12/15 | Q12/16 | Q12/17 |
| Q13/1 | Q13/2 | Q13/3 | Q13/4 | Q13/5 | Q13/ | 3/12 | Q13/13 | Q13/14 | Q13/15 | Q13/16 | Q13/17 |
| Q14/1 | Q14/2 | Q14/3 | Q14/4 | Q14/5 | Q14/ | 4/12 | Q14/13 | Q14/14 | Q14/15 | Q14/16 | Q14/17 |
| Q15/1 | Q15/2 | Q15/3 | Q15/4 | Q15/5 | Q15/ | 5/12 | Q15/13 | Q15/14 | Q15/15 | Q15/16 | Q15/17 |
| Q16/1 | Q16/2 | Q16/3 | Q16/4 | Q16/5 | Q16/ | 6/12 | Q16/13 | Q16/14 | Q16/15 | Q16/16 | Q16/17 |
| Q17/1 | Q17/2 | Q17/3 | Q17/4 | Q17/5 | Q17/ | 7/12 | Q17/13 | Q17/14 | Q17/15 | Q17/16 | Q17/17 |

FIG. 77

| Q1/1 | Q1/2 | Q1/3 | Q1/4 | Q1/5 | ... | /12 | Q1/13 | Q1/14 | Q1/15 | Q1/16 | Q1/17 |
|---|---|---|---|---|---|---|---|---|---|---|---|
| Q2/1 | Q2/2 | Q2/3 | Q2/4 | Q2/5 | | /12 | Q2/13 | Q2/14 | Q2/15 | Q2/16 | Q2/17 |
| Q3/1 | Q3/2 | Q3/3 | Q3/4 | Q3/5 | | /12 | Q3/13 | Q3/14 | Q3/15 | Q3/16 | Q3/17 |
| Q4/1 | Q4/2 | Q4/3 | Q4/4 | Q4/5 | | /12 | Q4/13 | Q4/14 | Q4/15 | Q4/16 | Q4/17 |
| Q5/1 | Q5/2 | Q5/3 | Q5/4 | Q5/5 | | /12 | Q5/13 | Q5/14 | Q5/15 | Q5/16 | Q5/17 |
| Q6/1 | Q6/2 | Q6/3 | Q6/4 | Q6/5 | | /12 | Q6/13 | Q6/14 | Q6/15 | Q6/16 | Q6/17 |
| Q7/1 | Q7/2 | Q7/3 | Q7/4 | Q7/5 | | /12 | Q7/13 | Q7/14 | Q7/15 | Q7/16 | Q7/17 |
| Q8/1 | Q8/2 | Q8/3 | Q8/4 | Q8/5 | | /12 | Q8/13 | Q8/14 | Q8/15 | Q8/16 | Q8/17 |
| Q9/1 | Q9/2 | Q9/3 | Q9/4 | Q9/5 | | /12 | Q9/13 | Q9/14 | Q9/15 | Q9/16 | Q9/17 |
| Q10/1 | Q10/2 | Q10/3 | Q10/4 | Q10/5 | | 0/12 | Q10/13 | Q10/14 | Q10/15 | Q10/16 | Q10/17 |
| Q11/1 | Q11/2 | Q11/3 | Q11/4 | Q11/5 | | 1/12 | Q11/13 | Q11/14 | Q11/15 | Q11/16 | Q11/17 |
| Q12/1 | Q12/2 | Q12/3 | Q12/4 | Q12/5 | | 2/12 | Q12/13 | Q12/14 | Q12/15 | Q12/16 | Q12/17 |
| Q13/1 | Q13/2 | Q13/3 | Q13/4 | Q13/5 | | 3/12 | Q13/13 | Q13/14 | Q13/15 | Q13/16 | Q13/17 |
| Q14/1 | Q14/2 | Q14/3 | Q14/4 | Q14/5 | | 4/12 | Q14/13 | Q14/14 | Q14/15 | Q14/16 | Q14/17 |
| Q15/1 | Q15/2 | Q15/3 | Q15/4 | Q15/5 | | 5/12 | Q15/13 | Q15/14 | Q15/15 | Q15/16 | Q15/17 |
| Q16/1 | Q16/2 | Q16/3 | Q16/4 | Q16/5 | | 6/12 | Q16/13 | Q16/14 | Q16/15 | Q16/16 | Q16/17 |
| Q17/1 | Q17/2 | Q17/3 | Q17/4 | Q17/5 | | 7/12 | Q17/13 | Q17/14 | Q17/15 | Q17/16 | Q17/17 |

FIG. 78

| Q1/1 | Q1/2 | Q1/3 | Q1/4 | Q1/5 | ... | /12 | Q1/13 | Q1/14 | Q1/15 | Q1/16 | Q1/17 |
|---|---|---|---|---|---|---|---|---|---|---|---|
| Q2/1 | Q2/2 | Q2/3 | Q2/4 | Q2/5 | | /12 | Q2/13 | Q2/14 | Q2/15 | Q2/16 | Q2/17 |
| Q3/1 | Q3/2 | Q3/3 | Q3/4 | Q3/5 | | /12 | Q3/13 | Q3/14 | Q3/15 | Q3/16 | Q3/17 |
| Q4/1 | Q4/2 | Q4/3 | Q4/4 | Q4/5 | | /12 | Q4/13 | Q4/14 | Q4/15 | Q4/16 | Q4/17 |
| Q5/1 | Q5/2 | Q5/3 | Q5/4 | Q5/5 | | /12 | Q5/13 | Q5/14 | Q5/15 | Q5/16 | Q5/17 |
| Q6/1 | Q6/2 | Q6/3 | Q6/4 | Q6/5 | | /12 | Q6/13 | Q6/14 | Q6/15 | Q6/16 | Q6/17 |
| Q7/1 | Q7/2 | Q7/3 | Q7/4 | Q7/5 | | /12 | Q7/13 | Q7/14 | Q7/15 | Q7/16 | Q7/17 |
| Q8/1 | Q8/2 | Q8/3 | Q8/4 | Q8/5 | | /12 | Q8/13 | Q8/14 | Q8/15 | Q8/16 | Q8/17 |
| Q9/1 | Q9/2 | Q9/3 | Q9/4 | Q9/5 | | /12 | Q9/13 | Q9/14 | Q9/15 | Q9/16 | Q9/17 |
| Q10/1 | Q10/2 | Q10/3 | Q10/4 | Q10/5 | | 0/12 | Q10/13 | Q10/14 | Q10/15 | Q10/16 | Q10/17 |
| Q11/1 | Q11/2 | Q11/3 | Q11/4 | Q11/5 | | 1/12 | Q11/13 | Q11/14 | Q11/15 | Q11/16 | Q11/17 |
| Q12/1 | Q12/2 | Q12/3 | Q12/4 | Q12/5 | | 2/12 | Q12/13 | Q12/14 | Q12/15 | Q12/16 | Q12/17 |
| Q13/1 | Q13/2 | Q13/3 | Q13/4 | Q13/5 | | 3/12 | Q13/13 | Q13/14 | Q13/15 | Q13/16 | Q13/17 |
| Q14/1 | Q14/2 | Q14/3 | Q14/4 | Q14/5 | | 4/12 | Q14/13 | Q14/14 | Q14/15 | Q14/16 | Q14/17 |
| Q15/1 | Q15/2 | Q15/3 | Q15/4 | Q15/5 | | 5/12 | Q15/13 | Q15/14 | Q15/15 | Q15/16 | Q15/17 |
| Q16/1 | Q16/2 | Q16/3 | Q16/4 | Q16/5 | | 6/12 | Q16/13 | Q16/14 | Q16/15 | Q16/16 | Q16/17 |
| Q17/1 | Q17/2 | Q17/3 | Q17/4 | Q17/5 | | 7/12 | Q17/13 | Q17/14 | Q17/15 | Q17/16 | Q17/17 |

FIG. 79

| VH1/1 | VH1/2 | VH1/3 | VH1/4 | VH1 | | H1/14 | VH1/15 | VH1/16 | VH1/17 |
|---|---|---|---|---|---|---|---|---|---|
| VH2/1 | VH2/2 | VH2/3 | VH2/4 | VH2 | | H2/14 | VH2/15 | VH2/16 | VH2/17 |
| VH3/1 | VH3/2 | VH3/3 | VH3/4 | VH3 | | H3/14 | VH3/15 | VH3/16 | VH3/17 |
| VH4/1 | VH4/2 | VH4/3 | VH4/4 | VH4 | | H4/14 | VH4/15 | VH4/16 | VH4/17 |
| VH5/1 | VH5/2 | VH5/3 | VH5/4 | VH5 | | H5/14 | VH5/15 | VH5/16 | VH5/17 |
| VH6/1 | VH6/2 | VH6/3 | VH6/4 | VH6 | | H6/14 | VH6/15 | VH6/16 | VH6/17 |
| VH7/1 | VH7/2 | VH7/3 | VH7/4 | VH7 | | H7/14 | VH7/15 | VH7/16 | VH7/17 |
| VH8/1 | VH8/2 | VH8/3 | VH8/4 | VH8 | | H8/14 | VH8/15 | VH8/16 | VH8/17 |
| VH9/1 | VH9/2 | VH9/3 | VH9/4 | VH9 | ·· | H9/14 | VH9/15 | VH9/16 | VH9/17 |
| VH10/1 | VH10/2 | VH10/3 | VH10/4 | VH10 | | H10/14 | VH10/15 | VH10/16 | VH10/17 |
| VH11/1 | VH11/2 | VH11/3 | VH11/4 | VH11 | | H11/14 | VH11/15 | VH11/16 | VH11/17 |
| VH12/1 | VH12/2 | VH12/3 | VH12/4 | VH12 | | H12/14 | VH12/15 | VH12/16 | VH12/17 |
| VH13/1 | VH13/2 | VH13/3 | VH13/4 | VH13 | | H13/14 | VH13/15 | VH13/16 | VH13/17 |
| VH14/1 | VH14/2 | VH14/3 | VH14/4 | VH14 | | H14/14 | VH14/15 | VH14/16 | VH14/17 |
| VH15/1 | VH15/2 | VH15/3 | VH15/4 | VH15 | | H15/14 | VH15/15 | VH15/16 | VH15/17 |
| VH16/1 | VH16/2 | VH16/3 | VH16/4 | VH16 | | H16/14 | VH16/15 | VH16/16 | VH16/17 |
| VH17/1 | VH17/2 | VH17/3 | VH17/4 | VH17 | | H17/14 | VH17/15 | VH17/16 | VH17/17 |

FIG. 80

| VH1/1 | VH1/2 | VH1/3 | VH1/4 | VH1 | | H1/14 | VH1/15 | VH1/16 | VH1/17 |
|---|---|---|---|---|---|---|---|---|---|
| VH2/1 | VH2/2 | VH2/3 | VH2/4 | VH2 | | H2/14 | VH2/15 | VH2/16 | VH2/17 |
| VH3/1 | VH3/2 | VH3/3 | VH3/4 | VH3 | | H3/14 | VH3/15 | VH3/16 | VH3/17 |
| VH4/1 | VH4/2 | VH4/3 | VH4/4 | VH4 | | H4/14 | VH4/15 | VH4/16 | VH4/17 |
| VH5/1 | VH5/2 | VH5/3 | VH5/4 | VH5 | | H5/14 | VH5/15 | VH5/16 | VH5/17 |
| VH6/1 | VH6/2 | VH6/3 | VH6/4 | VH6 | | H6/14 | VH6/15 | VH6/16 | VH6/17 |
| VH7/1 | VH7/2 | VH7/3 | VH7/4 | VH7 | | H7/14 | VH7/15 | VH7/16 | VH7/17 |
| VH8/1 | VH8/2 | VH8/3 | VH8/4 | VH8 | | H8/14 | VH8/15 | VH8/16 | VH8/17 |
| VH9/1 | VH9/2 | VH9/3 | VH9/4 | VH9 | ·· | H9/14 | VH9/15 | VH9/16 | VH9/17 |
| VH10/1 | VH10/2 | VH10/3 | VH10/4 | VH10 | | H10/14 | VH10/15 | VH10/16 | VH10/17 |
| VH11/1 | VH11/2 | VH11/3 | VH11/4 | VH11 | | H11/14 | VH11/15 | VH11/16 | VH11/17 |
| VH12/1 | VH12/2 | VH12/3 | VH12/4 | VH12 | | H12/14 | VH12/15 | VH12/16 | VH12/17 |
| VH13/1 | VH13/2 | VH13/3 | VH13/4 | VH13 | | H13/14 | VH13/15 | VH13/16 | VH13/17 |
| VH14/1 | VH14/2 | VH14/3 | VH14/4 | VH14 | | H14/14 | VH14/15 | VH14/16 | VH14/17 |
| VH15/1 | VH15/2 | VH15/3 | VH15/4 | VH15 | | H15/14 | VH15/15 | VH15/16 | VH15/17 |
| VH16/1 | VH16/2 | VH16/3 | VH16/4 | VH16 | | H16/14 | VH16/15 | VH16/16 | VH16/17 |
| VH17/1 | VH17/2 | VH17/3 | VH17/4 | VH17 | | H17/14 | VH17/15 | VH17/16 | VH17/17 |

FIG. 81

| HH1/1 | HH1/2 | HH1/3 | HH1/4 | HH1 | H1/14 | HH1/15 | HH1/16 | HH1/17 |
|---|---|---|---|---|---|---|---|---|
| HH2/1 | HH2/2 | HH2/3 | HH2/4 | HH2 | H2/14 | HH2/15 | HH2/16 | HH2/17 |
| HH3/1 | HH3/2 | HH3/3 | HH3/4 | HH3 | H3/14 | HH3/15 | HH3/16 | HH3/17 |
| HH4/1 | HH4/2 | HH4/3 | HH4/4 | HH4 | H4/14 | HH4/15 | HH4/16 | HH4/17 |
| HH5/1 | HH5/2 | HH5/3 | HH5/4 | HH5 | H5/14 | HH5/15 | HH5/16 | HH5/17 |
| HH6/1 | HH6/2 | HH6/3 | HH6/4 | HH6 | H6/14 | HH6/15 | HH6/16 | HH6/17 |
| HH7/1 | HH7/2 | HH7/3 | HH7/4 | HH7 | H7/14 | HH7/15 | HH7/16 | HH7/17 |
| HH8/1 | HH8/2 | HH8/3 | HH8/4 | HH8 | H8/14 | HH8/15 | HH8/16 | HH8/17 |
| HH9/1 | HH9/2 | HH9/3 | HH9/4 | HH9 | H9/14 | HH9/15 | HH9/16 | HH9/17 |
| HH10/1 | HH10/2 | HH10/3 | HH10/4 | HH10 | H10/14 | HH10/15 | HH10/16 | HH10/17 |
| HH11/1 | HH11/2 | HH11/3 | HH11/4 | HH11 | H11/14 | HH11/15 | HH11/16 | HH11/17 |
| HH12/1 | HH12/2 | HH12/3 | HH12/4 | HH12 | H12/14 | HH12/15 | HH12/16 | HH12/17 |
| HH13/1 | HH13/2 | HH13/3 | HH13/4 | HH13 | H13/14 | HH13/15 | HH13/16 | HH13/17 |
| HH14/1 | HH14/2 | HH14/3 | HH14/4 | HH14 | H14/14 | HH14/15 | HH14/16 | HH14/17 |
| HH15/1 | HH15/2 | HH15/3 | HH15/4 | HH15 | H15/14 | HH15/15 | HH15/16 | HH15/17 |
| HH16/1 | HH16/2 | HH16/3 | HH16/4 | HH16 | H16/14 | HH16/15 | HH16/16 | HH16/17 |
| HH17/1 | HH17/2 | HH17/3 | HH17/4 | HH17 | H17/14 | HH17/15 | HH17/16 | HH17/17 |

FIG. 82

| HH1/1 | HH1/2 | HH1/3 | HH1/4 | HH1 | H1/14 | HH1/15 | HH1/16 | HH1/17 |
|---|---|---|---|---|---|---|---|---|
| HH2/1 | HH2/2 | HH2/3 | HH2/4 | HH2 | H2/14 | HH2/15 | HH2/16 | HH2/17 |
| HH3/1 | HH3/2 | HH3/3 | HH3/4 | HH3 | H3/14 | HH3/15 | HH3/16 | HH3/17 |
| HH4/1 | HH4/2 | HH4/3 | HH4/4 | HH4 | H4/14 | HH4/15 | HH4/16 | HH4/17 |
| HH5/1 | HH5/2 | HH5/3 | HH5/4 | HH5 | H5/14 | HH5/15 | HH5/16 | HH5/17 |
| HH6/1 | HH6/2 | HH6/3 | HH6/4 | HH6 | H6/14 | HH6/15 | HH6/16 | HH6/17 |
| HH7/1 | HH7/2 | HH7/3 | HH7/4 | HH7 | H7/14 | HH7/15 | HH7/16 | HH7/17 |
| VH8/1 | HH8/2 | HH8/3 | HH8/4 | HH8 | H8/14 | HH8/15 | HH8/16 | HH8/17 |
| HH9/1 | HH9/2 | HH9/3 | HH9/4 | HH9 | H9/14 | HH9/15 | HH9/16 | HH9/17 |
| HH10/1 | HH10/2 | HH10/3 | HH10/4 | HH10 | H10/14 | HH10/15 | HH10/16 | HH10/17 |
| HH11/1 | HH11/2 | HH11/3 | HH11/4 | HH11 | H11/14 | HH11/15 | HH11/16 | HH11/17 |
| HH12/1 | HH12/2 | HH12/3 | HH12/4 | HH12 | H12/14 | HH12/15 | HH12/16 | HH12/17 |
| VH13/1 | HH13/2 | HH13/3 | HH13/4 | HH13 | H13/14 | HH13/15 | HH13/16 | HH13/17 |
| HH14/1 | HH14/2 | HH14/3 | HH14/4 | HH14 | H14/14 | HH14/15 | HH14/16 | HH14/17 |
| HH15/1 | HH15/2 | HH15/3 | HH15/4 | HH15 | H15/14 | HH15/15 | HH15/16 | HH15/17 |
| HH16/1 | HH16/2 | HH16/3 | HH16/4 | HH16 | H16/14 | HH16/15 | HH16/16 | VH16/17 |
| HH17/1 | HH17/2 | HH17/3 | HH17/4 | HH17 | H17/14 | HH17/15 | HH17/16 | HH17/17 |

FIG. 83

| NAME OF SIGNAL | CDLC PROCESS | 1/4 IGC PROCESS | DLC1 PROCESS |
|---|---|---|---|
| DRAM READ DATA | GB PIXEL DATA | NONE | SR PIXEL DATA |
| SRAM READ DATA | NONE | GB PIXEL DATA | NONE |
| SRAM WRITE DATA | GB PIXEL DATA | GB 1/4 REDUCED PIXEL DATA | SB 1/4 REDUCED PIXEL DATA |
| THRD0 | M-TH GB PIXEL DATA | M-TH GB PIXEL DATA | M-TH SR PIXEL DATA |
| THRD1 | (M+1)-TH GB PIXEL DATA | (M+1)-TH GB PIXEL DATA | (M+1)-TH SR PIXEL DATA |
| C | NONE | NONE | NONE |
| SP0 | NONE | NONE | NONE |
| SP1 | NONE | NONE | NONE |
| SP2 | NONE | NONE | NONE |
| HHP0 | NONE | NONE | NONE |
| HVHP3 | NONE | GB HORIZONTAL 2 PIXEL AVERAGE DATA | SR HORIZONTAL 2 PIXEL AVERAGE DATA |
| QP4 | NONE | GB 4 PIXEL AVERAGE DATA | SR 4 PIXEL AVERAGE DATA |
| DQP1 | NONE | NONE | NONE |
| DVHP1 | NONE | NONE | NONE |
| CRT | NONE | NONE | NONE |
| PREV0 | NONE | NONE | NONE |
| PREV1 | NONE | NONE | NONE |
| PREV2 | NONE | NONE | NONE |
| PREV3 | NONE | NONE | NONE |
| PREV4 | NONE | NONE | NONE |

FIG. 84

| NAME OF SIGNAL | S1VDC PROCESS | DLC2 PROCESS | S2VDC PROCESS |
| --- | --- | --- | --- |
| DRAM READ DATA | NONE | SB PIXEL DATA | NONE |
| SRAM READ DATA | GB 1/4 REDUCED PIXEL DATA AND SR 1/4 REDUCED PIXEL DATA | NONE | GB PIXEL DATA AND SR PIXEL DATA |
| SRAM WRITE DATA | NONE | SB PIXEL DATA | NONE |
| THRD0 | NONE | NONE | NONE |
| THRD1 | NONE | NONE | NONE |
| C | GB 1/4 REDUCED PIXEL DATA | NONE | GB PIXEL DATA |
| SP0 | SR 1/4 REDUCED PIXEL, DATA LINE N | SB PIXEL DATA | SR PIXEL, DATA LINE N |
| SP1 | SR 1/4 REDUCED PIXEL, DATA LINE | NONE | SR PIXEL, DATA LINE N+1 |
| SP2 | SR 1/4 REDUCED PIXEL, DATA LINE | NONE | NONE |
| HHP0 | NONE | NONE | NONE |
| HVHP3 | NONE | NONE | NONE |
| QP4 | NONE | NONE | NONE |
| DQP1 | NONE | NONE | NONE |
| DVHP1 | NONE | NONE | NONE |
| CRT | GB 1/4 REDUCED PIXEL DATA | NONE | GB PIXEL DATA |
| PREV0 | SR 1/4 REDUCED PIXEL, DATA LINE N | NONE | SR PIXEL, DATA LINE N |
| PREV1 | SR 1/4 REDUCED PIXEL, DATA LINE | NONE | SR PIXEL, DATA LINE N+1 |
| PREV2 | SR 1/4 REDUCED PIXEL, DATA LINE | NONE | NONE |
| PREV3 | NONE | NONE | NONE |
| PREV4 | NONE | NONE | NONE |

FIG. 85

| NAME OF SIGNAL | S3DVC PROCESS | DCT PROCESS | IDCT PROCESS |
|---|---|---|---|
| DRAM READ DATA | NONE | NONE | NONE |
| SRAN READ DATA | GB PIXEL DATA AND SR PIXEL DATA | GB PIXEL DATA AND SB PIXEL DATA | SB PIXEL DATA |
| SRAM WRITE DATA | NONE | NONE | SR PIXEL DATA OR HORIZONTAL 2 PIXEL AVERAGE, VERTICAL 2 PIXEL AVERAGE, 4 PIXEL AVERAGE |
| THRD0 | NONE | NONE | NONE |
| THRD1 | NONE | NONE | NONE |
| C | GB PIXEL DATA | GB PIXEL DATA | NONE |
| SP0 | 14 CYCLE DELAYED DATA OF SP0 | SB PIXEL DATA | SB PIXEL DATA |
| SP1 | SR PIXEL, DATA LINE N | NONE | NONE |
| SP2 | SR PIXEL, DATA LINE N+1 | NONE | NONE |
| HHP0 | SR HORIZONTAL 2 PIXEL AVERAGE DATA | SB HORIZONTAL 2 PIXEL AVERAGE DATA | SB HORIZONTAL 2 PIXEL AVERAGE DATA |
| HVHP3 | SR VERTICAL 2 PIXEL AVERAGE DATA | SB VERTICAL 2 PIXEL AVERAGE DATA | SB VERTICAL 2 PIXEL AVERAGE DATA |
| QP4 | SR 4 PIXEL AVERAGE DATA | SB 4 PIXEL AVERAGE DATA | SB 4 PIXEL AVERAGE DATA |
| DQP1 | 10 CYCLE DELAYED DATA OF QP4 | NONE | NONE |
| DVHP1 | 10 CYCLE DELAYED DATA OF HVHP3 | DELAYED SB PIXEL DATA | DELAYED SB PIXEL DATA |
| CRT | GB PIXEL DATA | GB PIXEL DATA | NONE |
| PREV0 | SR HORIZONTAL 2 PIXEL AVERAGE DATA | SB PIXEL DATA OR SB HORIZONTAL 2 PIXEL AVERAGE DATA | NONE |
| PREV1 | 10 CYCLE DELAYED DATA OF PREV4 | NONE | NONE |
| PREV2 | 10 CYCLE DELAYED DATA OF PREV3 | NONE | NONE |
| PREV3 | SR VERTICAL 2 PIXEL AVERAGE DATA | SB VERTICAL 2 PIXEL AVERAGE DATA OR SB 4 PIXEL AVERAGE DATA | NONE |
| PREV4 | SR 4 PIXEL AVERAGE DATA | NONE | NONE |

FIG. 86

| NAME OF SIGNAL | MEANING |
| --- | --- |
| SELIDCT2 | SELECTION OF INPUT DATA TO ADDER 506 |
| HPIEN | ENABLE OF FF IN HARF PIXEL ACCURACY SCREEN GENERATOR |
| SELCGEN | SELECTION OF INPUT DATA TO ADDER 508 |
| SELIDCT | SELECTION OF INPUT DATA TO FF 513 |
| SELADV | SELECTION OF INPUT DATA TO FF 522 |
| MB MEAN | AVERAGE VALUE OF GB PIXEL DATA |
| SELPREV0~15 | SELECTION OF INPUT DATA TO EACH PE |
| SUBCLR0~15 | OUTPUT CLEARANCE OF FIRST STAGE ADDER OF EACH PE |
| SADCLR0~15 | CLEARANCE OF DIFFERENTIAL ABSOLUTE VALUE SUM BY EACH PE |
| SELSAD | SELECTION OF DIFFERENTIAL ABSOLUTE VALUE SUM BY EACH PE |
| SELSUBD | OUTPUT SELECTION OF DIFFERENTIAL DATA BETWEEN GB AND SB |
| SAD | OUTPUT OF DIFFERENTIAL ABSOLUTE VALUE SUM BY EACH PE |
| DCT | DIFFERENTIAL DATA BETWEEN GB PIXEL DATA AND SB PIXEL DATA |

MOTION VECTOR DETECTION DEVICE

BACKGROUND OF THE INVENTION

1. Field of the Invention

The present invention relates to a motion vector detecting device, especially to a motion vector detecting device suitable for use in the inter-frame coding of the motion compensation being the compression coding system of dynamic image information.

2. Description of the Related Art

Dynamic images include many similar images in two continuous screens. To reuse the previous images of these similar images in two continuous screens will make it possible to reduce the transmission of information to form the images. That is, the reuse of the previous images will achieve the compression coding of the dynamic images. To achieve this requires information indicating the location in the present screen which a part of the previous screen moves to (namely, a motion vector).

The detection of the motion vector generally employs the following method. First, the method gazes a. block consisting of M×N pixels (including M=N) of the present screen. Further, it gazes each of the blocks of M×N pixels contained in a (M+α)×(N+β) pixel region (hereunder, referred to as a "reference region", also including α=β) which is wider than the block consisting of the M×N pixels of the previous screen (hereunder, referred to as the "reference screen"). And, it searches the most similar block to the gazed block of the present screen among the blocks of the M×N pixels contained in the reference region. Concretely, the sums of the differential absolute values are calculated between corresponding pixel data of the blocks of the present screen and the reference region. The block is searched in the reference region, which reduces the sum of the differential absolute values to the minimum. The motion vector is expressed by the difference (Δx, Δy) of the coordinates between the searched block and the gazed block of the present screen.

In practice, the detection of the motion vector is executed by a plurality of steps in order to enhance the processing efficiency or to increase the processing speed in many cases. The actual steps in an example are as follows.

First, the gazed block of the present screen and the reference region of the reference screen each are reduced, when a block of the present screen is compared with each of the blocks of the reference region.

The first method to reduce the foregoing block thins out every other pixel, for example, from the M×N pixels into a block of M/2×N/2 pixels as to the block of the present screen, and thins out every other pixel from the (M+α)×(N+β) pixels into a block of (M+α)/2×(N+β)/2 pixels as to the reference region. And, the second method obtains the averages of four pixels each, for example, from the M×N pixels to make a block of M/2×N/2 pixels as to the block of the present screen, and obtains the averages of the four pixels each from the (M+α)×(N+β) pixels to make a block of (M+α)/2×(N+β)/2 pixels as to the reference region.

Next, the second step gazes a part including the block that was searched in the first step, of the reference region not reduced; and it searches the most similar block to the block of the present screen from the part region gazed. Further, some cases need a third step and the succeeding steps (for example, the detection of the motion vector employing the reference region of the half pixel accuracy explained later).

However, the conventional motion vector detecting device involves the following problems in the improvement of the processing speed and/or the simplification of the device construction.

(1): The detection of the motion vector through a plurality of the foregoing steps has generally adopted the following procedure in the conventional technique. FIG. 36 is a conceptual chart to explain the procedure.

A motion vector detecting device 11 contains an internal memory (also called as a local memory) 11a and a motion vector detecting unit 11b. The internal memory 11a is generally made up with an SRAM.

The image data of the present screen and the reference screen are stored in an external memory 13 provided outside the motion vector detecting device 11. The external memory 13 is generally made up with a DRAM.

In the conventional method of the detection of the motion vector, the data of the M×N pixels (for example, 16×16 pixels) are inputted as they are from the external memory 13 into the internal memory 11a, as an information of the present screen. Further, the data of the (M+α)×(N+β) pixels (for example, 48×48 pixels) are inputted as they are, as an information of the reference region. And, at the first step to execute the comparison between the reduced blocks, the motion vector detecting unit 11b reduces each of the blocks of the present screen and the reference region of the reference screen as mentioned above.

The reason that the M×N pixels as the information of the present screen and the (M+α)×(N+β) pixels as the information of the reference region each have been inputted in the internal memory as they are mainly lies in the facility in the process of the second step and after, namely, the process of the comparison between the blocks not reduced.

However, this conventional method requires the storage capacity of at least M×N+(M+α)×(N+β)+M/2×N/2+(M+α)/2×(N+β)/2 for the internal memory 11a, and therefore, a memory of a large storage capacity has been necessary for the internal memory.

(2): Further, in the conventional method, the data of the blocks of the present screen and the data of the reference region of the reference screen each are stored in the internal memory 11a from the external memory 13 in the state that they are not reduced, and thereafter, they are reduced. Therefore, the conventional method requires a time to store the data and a time to reduce the data separately, and needs a longer processing time.

(3): Further, in the conventional method, every time when the motion vector of one block of the present screen is being detected, the data of the reference region corresponding to the one block is transferred to the internal memory 11a. However, the reference regions corresponding to the adjoining blocks of the present screen have an overlapping region in many cases. As shown in FIG. 37, suppose that the present screen 21 contains first and second blocks 21a, 21b, each adjoining. The reference screen 23 contains first and second reference regions 23a, 23b corresponding to the first and second blocks 21a, 21b. These reference regions 23a, 23b often contain overlapping image data 25. In such a situation, the conventional method transfers this overlapping image data 25 to the internal memory 11a during detection of the motion vector of the first block 21a and during detection of the motion vector of the second block 21b. Accordingly, the conventional method requires a longer time to transfer the data.

(4): Further, the compression coding of dynamic images frequently employs inter-frame predictive coding. And generally, the judgment whether or not to execute the inter-frame predictive coding with regard to a block (also referred to as a gazed block) of the present screen is performed as follows. First, the sum of the differential absolute values between the average of all the pixel values of the gazed block and each of the pixel values of the gazed block is calculated (this is also referred to as a second sum of the differential absolute values). And, this second sum of the differential absolute values is compared with the sum of the differential absolute values (also referred to as a first sum of the differential absolute values) that was obtained for detecting the foregoing motion vector. From this comparison result, whether or not to execute the inter-frame predictive coding is judged.

However, the conventional method separately performs the operation to obtain the first sum of the differential absolute values and the operation to obtain the second sum of the differential absolute values. Accordingly, the conventional method takes a longer operation time.

(5): Further, the detection of the motion vector through a plurality of the steps requires a third step frequently, as described hereunder.

New pixel data are calculated on the basis of the pixel data of a part including the block of the reference region not reduced, which was searched by the foregoing second step, and the adjoining pixel data of the foregoing pixels. A new reference region (reference region of the half pixel accuracy) is generated by means of the new pixel data and the original pixel data. And, the most similar block to the foregoing gazed block is searched from the reference region of the half pixel accuracy. This third step is often carried out in the conventional method.

Accordingly, the motion vector detecting device that detects the motion vector by the third step requires a circuit to reduce each of the gazed block and the reference region, and a circuit to generate the foregoing reference region of the half pixel accuracy. However, to provide both the circuits individually will increase the hardware, or the circuit scale of the motion vector detecting device.

Therefore, the motion vector detecting device is desired which exceeds the conventional method in terms of the processing speed and the simplification of the device construction.

SUMMARY OF THE INVENTION

The object of the invention is to provide a motion vector detecting device capable of solving the foregoing problems.

(1) In order to accomplish the foregoing object, the motion vector detecting device according to one aspect of the invention detects the motion vector of a gazed block, by means of a process including a first step to reduce each of the gazed block of a present screen and a reference region of a reference screen and to search a block most similar to the reduced gazed block from the reduced reference region, and a second step to search a block most similar to the gazed block from a part including the block searched in the first step, of the reference region not reduced. And, the motion vector detecting device stores each of the gazed block and the reference region in the internal memory, and executes the searches in the first and second steps on the basis of the stored information. Further, the motion vector detecting device is characterized by comprising an image processing unit that reduces at least one of the gazed block and the reference region into a form that can be used in the first step, and thereafter, transfers the reduced one to the internal memory.

In the motion vector detecting device provided with this image processing unit, at least one of the gazed block and the reference region is reduced into a form that can be used in the first step, and thereafter, stored in the internal memory; and therefore, the capacity of the internal memory can be reduced to that extent.

Further, to implement the invention, preferably, the image processing unit is constructed such that at least one of the gazed block and the reference region is sequentially reduced, and the reduced one is sequentially transferred to the internal memory. With this construction, the reduction process and the storage process to the internal memory can be carried out substantially in parallel; and therefore, the processing time can be shortened to that extent.

Further, to implement the invention, both of the gazed block and the reference region may be reduced, or either one of them may be reduced. However, in case either one of them is reduced, preferably the reference region is reduced. The reason is that the reduction of the reference region gives a greater contribution to the capacity reduction of the internal memory, since the capacity of the reference region is larger than the capacity of the gazed block.

Further, to implement the invention, when the motion vector detecting device is a device to execute the third step that generates the foregoing reference region of the half pixel accuracy, and searches a block most similar to the gazed block from the reference region of the half pixel accuracy, preferably the image processing unit is used also as a means to generate the reference region of the half pixel accuracy.

With this arrangement, the circuit to reduce at least one of the gazed block and the reference region can be shared with the circuit to generate the reference region of the half pixel accuracy. Thereby, the circuit scale of the motion vector detecting device can be reduced.

Preferably, such an image processing unit is made up with a first means to add values of two horizontal pixels of an image to thereby generate a horizontal two pixel average, a second means to be selectively used as either a means to add values of two horizontal pixels of the image to thereby generate a horizontal two pixel average, or a means to add values of two vertical pixels to thereby generate a vertical two pixel average, and a third means to add a sum calculated by the second means and a sum calculated in the past by the second means to thereby generate a four pixel average.

Although the detail will be described later, the image processing unit of this preferred example is able to calculate the pixel value to obtain an image in which the image is reduced into 1/4 by the second means. Further, to use the first~the third means in combination enables the image processing unit to calculate the pixel values of the horizontal two pixel average, the vertical two pixel average, and the four pixel average for obtaining the reference region of the half pixel accuracy.

(2) Further, the motion vector detecting device according to another aspect of the invention searches a part most similar to a gazed block of a present screen from a reference region of a reference screen to detect a motion vector of the gazed block, in which the gazed block and the reference region (including a case in which the same are stored in a reduced state) are stored in an internal memory contained in the motion vector detecting device and the search is executed on the basis of the stored information. And, the motion vector detecting device is characterized by comprising a reference region preparation unit that rewrites only a part of the reference region stored in the internal memory into a new data in order to detect the motion vector of a previous gazed block, and thereby forms a reference region for a gazed block for this time in the internal memory.

As already explained with reference to FIG. 37, the reference regions for adjoining gazed blocks have an overlapping part in many cases. Therefore, the most parts of the reference regions that are stored in the internal memory to detect the motion vector of the previous gazed block can be considered as the common parts with the reference regions to detect the motion vector of the gazed block for this time. Accordingly, it will not conceivably give any problems to the detection of the motion vector to rewrite with new data only a part of the reference regions stored in the internal memory and use the new data as the data of the reference region for detecting the motion vector of the gazed block for this time. With this arrangement, the transfer data from the external memory to the internal memory can be reduced in quantity, and the processing speed of the motion vector detecting device can be increased.

Further, the extent of data to be rewritten into the new data out of the data of the reference regions stored in the internal memory will be determined in accordance with the design. Although it is not limited thereto, in the embodiment described later, the data of the reference regions stored in the internal memory are designed to be rewritten into new data by each 1/3.

(3) Further, the motion vector detecting device according to still another aspect of the invention detects the motion vector of the gazed block by means of a process including a first step to reduce each of a gazed block of a present screen and a reference region of a reference screen and search a block most similar to the reduced gazed block from the reduced reference region, and a second step to search a block most similar to the gazed block from a part including the block searched in the first step, of the reference region not reduced. And, the motion vector detecting device connected to an inter-frame predictive coding device in use comprises a differential absolute value summing calculation unit including a plurality of processor elements (PE) that calculates, for the searches in the first and second steps, a sum of the differential absolute values (the first sum of the differential absolute values) between pixel data of the gazed block and pixel data of the reference region. Further, the differential absolute value summing calculation unit uses a PE that is not in use for the calculation of the first sum of the differential absolute values during a period of the first step or the second step, and thereby calculates either one of an average value of all the pixels of the gazed block, which is used as a parameter for judging whether or not to execute an inter-frame predictive coding, and a sum of the differential absolute values (the second sum of the differential absolute values) between the average value and each pixel data of the gazed block.

When the motion vector is obtained through a plurality of steps, the number of processes to calculate the sum of the differential absolute values through the first step is larger than the number of processes to calculate the same through the second step and after. Accordingly, the number of PEs is set so that the processes in the first step can be carried out effectively. As a result, there emerge PEs that are not used for the subsequent processes, namely, vacant PEs in the second step and after. This invention utilizes the vacant PEs actively. Thereby, the motion vector detecting device of the invention is able to carry out, without increasing the circuit scale of the device, the process to detect the motion vector and the process to calculate the parameter for the judgment of the inter-frame predictive coding in parallel. Therefore, the motion vector detecting device will achieve a higher processing speed without increasing the circuit scale of the device.

Further, to implement the invention of the motion vector detecting device provided with the differential absolute value summing calculation unit in which the vacant PEs are utilized, when the motion vector detecting device is a device to execute the third step that calculates an average value of adjoining pixel data in a part including the block searched in the second step, of the reference region not reduced, to thereby generate a new pixel, generates a new reference region (reference region of a half pixel accuracy) with the new pixel and the original pixel, and searches a block most similar to the gazed block from the reference region of the half pixel accuracy, preferably, the differential absolute value summing calculation unit is the means as follows.

Preferably, the differential absolute value summing calculation unit uses a PE that is not in use for the calculation of the first sum of the differential absolute values during the period of the second step to thereby calculate the average value of all the pixels of the gazed block, and uses a PE that is not in use for the calculation of the first sum of the differential absolute values during the period of the third step to thereby calculate the second sum of the differential absolute values.

This arrangement necessarily enables the average value of all the pixels of the gazed block to be obtained. Then, the average value obtained can be used to calculate the second sum of the differential absolute values. Therefore, it becomes possible to effectively use the vacant PEs in accordance with the procedure, and the efficiency to detect the motion vector can be enhanced effectively.

(4) Further, to implement the invention, preferably, the motion vector detecting device is provided with at least two of the foregoing image processing unit, the reference region preparation unit, and the differential absolute value summing calculation unit. This arrangement will simplify the construction of the motion vector detecting device and increase the processing speed of the same more efficiently than a device provided with the foregoing units individually.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

In the drawings:

FIG. 15 is a time chart of the read/write operation from/in the internal memory;

FIG. 25 is a time chart to explain the SAD calculation operation in the PE (processor element) 0;

FIGS. 31(A), 31(B), 31(C), and 31(D) are charts to explain the reference region of the half pixel accuracy;

FIG. 33 is a chart to explain the S3VDC process;

Figure 34:
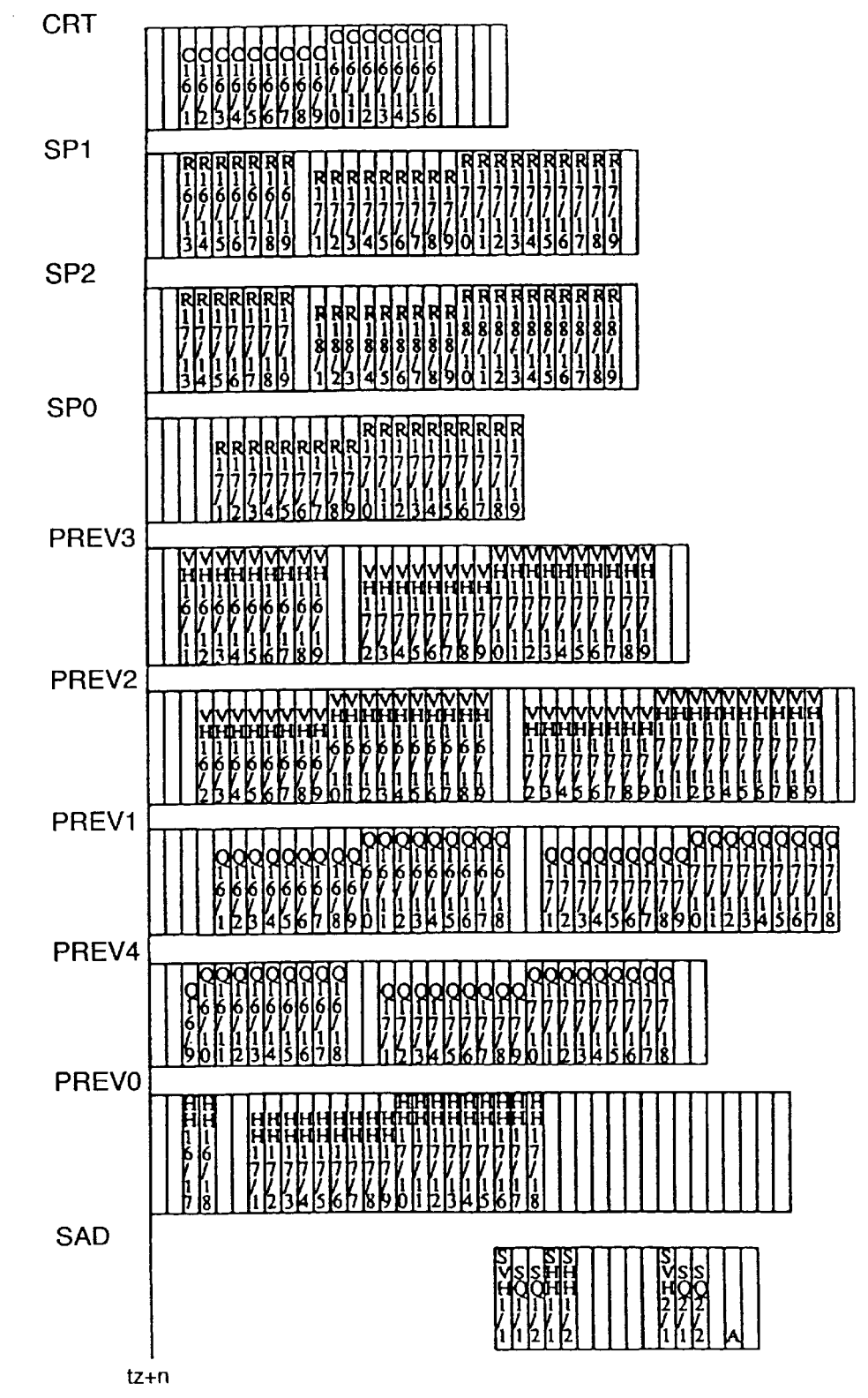

FIG. 34 is a chart to explain the S3VDC process;

FIG. 38 is a table to illustrate the operation of a switch 401;

FIG. 39 is a table to illustrate the operation of selectors 415, 416, and 418;

FIG. 40 is a table to illustrate the operation of a selector 417;

FIG. 41 is a table to illustrate the operation of selectors 501 and 502;

FIG. 42 is a table to illustrate the operation of a selector 503;

FIG. 43 is a table to illustrate the operation of a selector 504;

FIG. 44 is a table to illustrate the operation of a selector 505;

FIG. 45 is a table to illustrate the operation of a selector 601;

FIG. 46 is a table to illustrate the operation of a selector 602;

FIG. 47 is a table to illustrate the operation of a selector 603;

FIG. 48 is a table to illustrate the operation of a selector 604;

FIG. 49 is a table to illustrate the operation of a selector 605;

FIG. 50 is a table to illustrate the operation of selectors 607 and 608;

FIG. 51 is a table to illustrate the operation of a selector 627;

FIG. 52 is a table to illustrate the operation of a selector 751;

FIG. 53 is a table to illustrate the operation of a selector 752;

FIG. 54 is a table to illustrate the operation of a selector 753;

FIG. 55 is a table to illustrate the operation of a selector 754;

FIG. 56 is a table to illustrate the operation of a selector 755;

FIG. 57 is a table to illustrate the operation of a selector 756;

FIG. 58 is a table to illustrate the operation of a selector 757;

FIG. 59 is a table to illustrate the operation of a selector 758;

FIG. 60 is a table to illustrate the operation of a selector 759;

FIG. 61 is a table to illustrate the operation of a selector 760;

FIG. 62 is a table to illustrate the operation of a selector 761;

FIG. 63 is a table to illustrate the operation of a selector 762;

FIG. 64 is a table to illustrate the operation of a selector 763;

FIG. 65 is a table to illustrate the operation of a selector 764;

FIG. 66 is a table to illustrate the operation of a selector 765;

FIG. 67 is a table to illustrate the operation of a selector 766;

FIG. 68 is a table to illustrate the operation of a selector 767;

FIG. 69 is a table to illustrate the operation of a selector 768;

FIG. 70 is a table to illustrate the operation of a selector 1205;

FIG. 71 is a table to illustrate an example in which the SRAM in the internal memory is divided;

FIG. 72 is a chart to illustrate an example in which the reference region is subdivided;

FIG. 73 is a chart to illustrate an example in which the image of the reference region is reduced into 1/4;

FIG. 74 is a table to explain the outline of the motion vector detecting process;

FIG. 75 is a chart to illustrate the region (1) by the average of four pixels with A1 as the leader;

FIG. 76 is a chart to illustrate the region (2) by the average of longitudinal two pixels with A2 as the leader;

FIG. 77 is a chart to illustrate the region (3) by the average of four pixels with A3 as the leader;

FIG. 78 is a chart to illustrate the region (4) by the average of latitudinal two pixels with A4 as the leader;

FIG. 79 is a chart to illustrate the region (5) by the average of latitudinal two pixels with A5 as the leader;

FIG. 80 is a chart to illustrate the region (6) by the average of four pixels with A6 as the leader;

FIG. 81 is a chart to illustrate the region (7) by the average of longitudinal two pixels with A7 as the leader;

FIG. 82 is a chart to illustrate the region (8) by the average of four pixels with A8 as the leader;

FIG. 83 is a table to explain signals that alter the meanings depending on the operation contents of the motion vector detecting unit;

FIG. 84 is a table to explain signals that alter the meanings depending on the operation contents of the motion vector detecting unit;

FIG. 85 is a table to explain signals that alter the meanings depending on the operation contents of the motion vector detecting unit; and FIG. 86 is a table to explain signals that do not alter the meanings regardless of the operation contents of the motion vector detecting unit.

DESCRIPTION OF THE PREFERRED EMBODIMENT

Preferred embodiments of the motion vector detecting device relating to the invention will hereafter be described in detail with reference to the accompanying drawings. The drawings here are made schematically so that the reader will understand the concept of this invention. And in these drawings, common components are given the same numbers, in which repetitive descriptions will be omitted. The components shown in these drawings can be integrated in one IC chip, and the invention includes such a case.

The meanings of the main signals of the signals (SRAM data, PREVO, etc., in FIG. 2) shown in these drawings are collectively shown in FIG. 83 through FIG. 86; and the explanation on these signals will be omitted in the following description. In FIG. 83 through FIG. 86, GB denotes the gazed block of the present screen, SR denotes the reference region of the reference screen, and SB denotes the blocks in the reference region.

1. Description of the Total Construction of the Device

Figure 1:
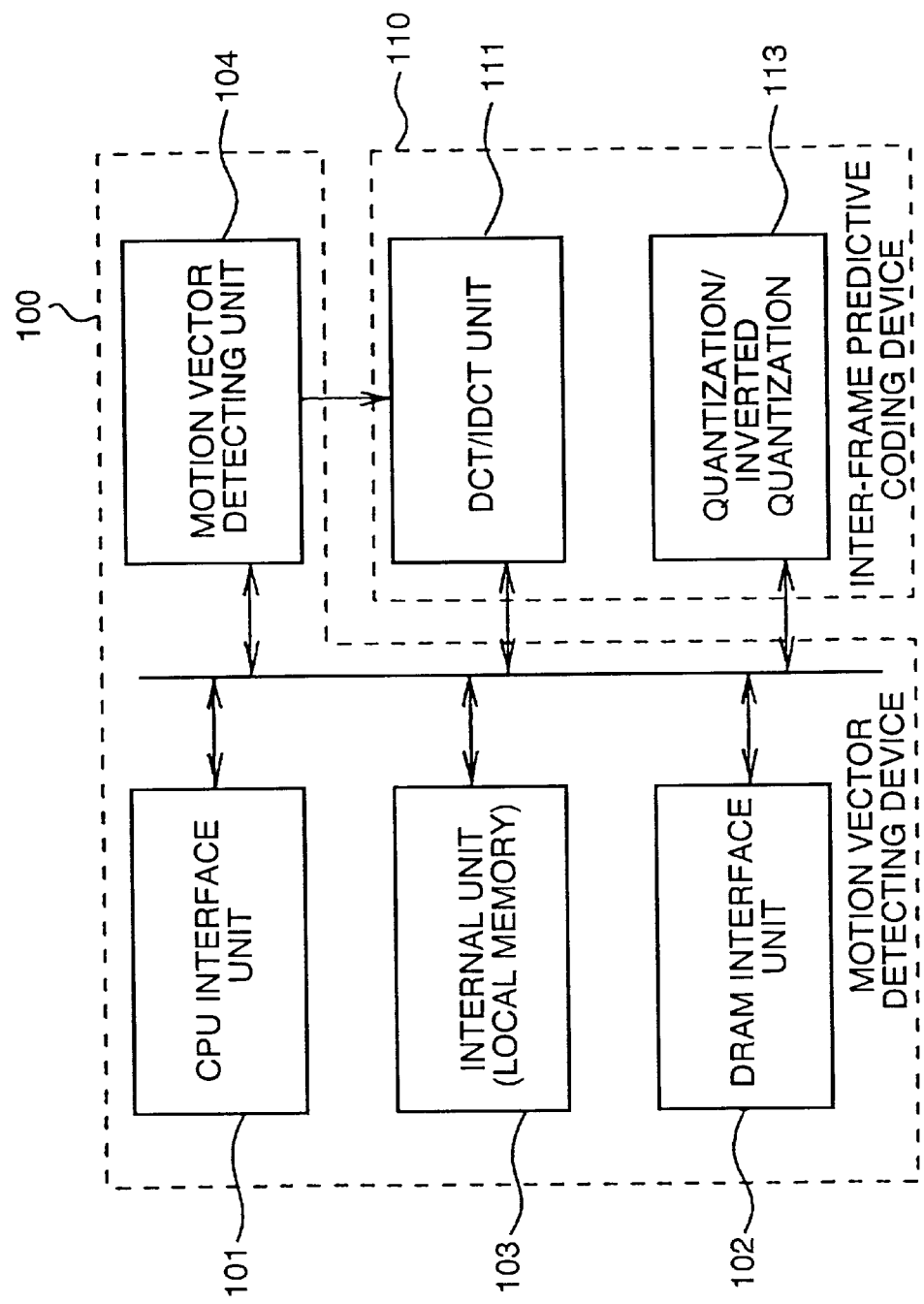
FIG. 1 is a block diagram to illustrate a schematic construction of a motion vector detecting device of an embodiment relating to the present invention.

FIG. 1 is a block diagram to illustrate the total construction of a motion vector detecting device 100 of the embodiment. Here, in this drawing is presented an example in which the motion vector detecting device 100 is coupled with an inter-frame predictive coding device 110.

The motion vector detecting device 100 contains a CPU interface unit 101, a DRAM interface unit 102 as the external memory interface, a local memory unit (internal memory unit) 103, and a motion vector detecting unit 104.

And, the inter-frame predictive coding device 110 contains a DCT/IDCT unit 111 and a quantization/inverted quantization unit 113.

The CPU interface unit 101 controls the accesses from the CPU (not illustrated).

The DRAM interface unit 102 controls to read the DRAM (not illustrated) that is used as the frame memory. This frame memory is provided outside the motion vector detecting device 100, and is served as the external memory. Naturally, the external memory may be made up with a storage medium other than the DRAM.

The internal memory 103 contains an internal memory made up with an SRAM, for example. Naturally, the internal memory may be made up with a storage medium other than the SRAM. This internal memory unit 103 stores the image data of a block whose motion vector is being obtained (namely, gazed block), and the image data of the reference region of the reference screen. However, in this invention, at least one of the image data of the gazed block and the image data of the reference region is reduced in such a configuration that the data can be used at the first step to detect the motion vector, and is stored in the internal memory (the details will be described later).

The motion vector detecting unit 104 executes the address control, the calculation of the sum of the differential absolute values, and the detection of the motion vector of each of the frame memory (not illustrated) and the internal memory unit 103.

Further, the motion vector detecting unit 104 includes an image processing unit 302 (see FIG. 3) as the means to reduce at least one of the image data of the gazed block and the image data of the reference region that are transferred from the frame memory (not illustrated) into a configuration such that the data can be used at the first step to detect the motion vector, and to transfer the data to the internal memory unit 103.

Further, the motion vector detecting unit 104 of this embodiment judges whether or not to perform the inter-frame predictive coding.

As is well known, the DCT/IDCT unit 111 performs the DCT process and the inverted DCT process. Concretely, in accordance with the judgment result as to whether or not to perform inter-frame predictive coding that the motion vector detecting unit 104 executes, the DCT/ILDCT unit 111 executes the DCT process on the pixel data of the gazed block of the present screen or the differential pixel data between the pixel data of the gazed block and the block of the reference screen, converts the processed data into DCT coefficients, and sends the converted data to the quantization/inverted quantization unit 113. On the other hand, when the data (concretely, the inverted quantization coefficients) are inputted from the quantization/inverted quantization unit 113, the DCT/IDCT unit 111 executes the inverted DCT process on the inputted data to convert into the image data or the differential pixel data.

After quantizing the foregoing DCT coefficients, the quantization/inverted quantization unit 113 sends quantization coefficients to a variable length encoder (not illustrated), and sends to the DCT/IDCT unit 111 the inverted quantization coefficients obtained by applying the inverted quantization to the quantization coefficients.

Since this invention relates to the detection of the motion vector, the detailed explanation on the DCT/IDCT unit 111 and the quantization/inverted quantization unit 113 will be omitted.

Figure 2:
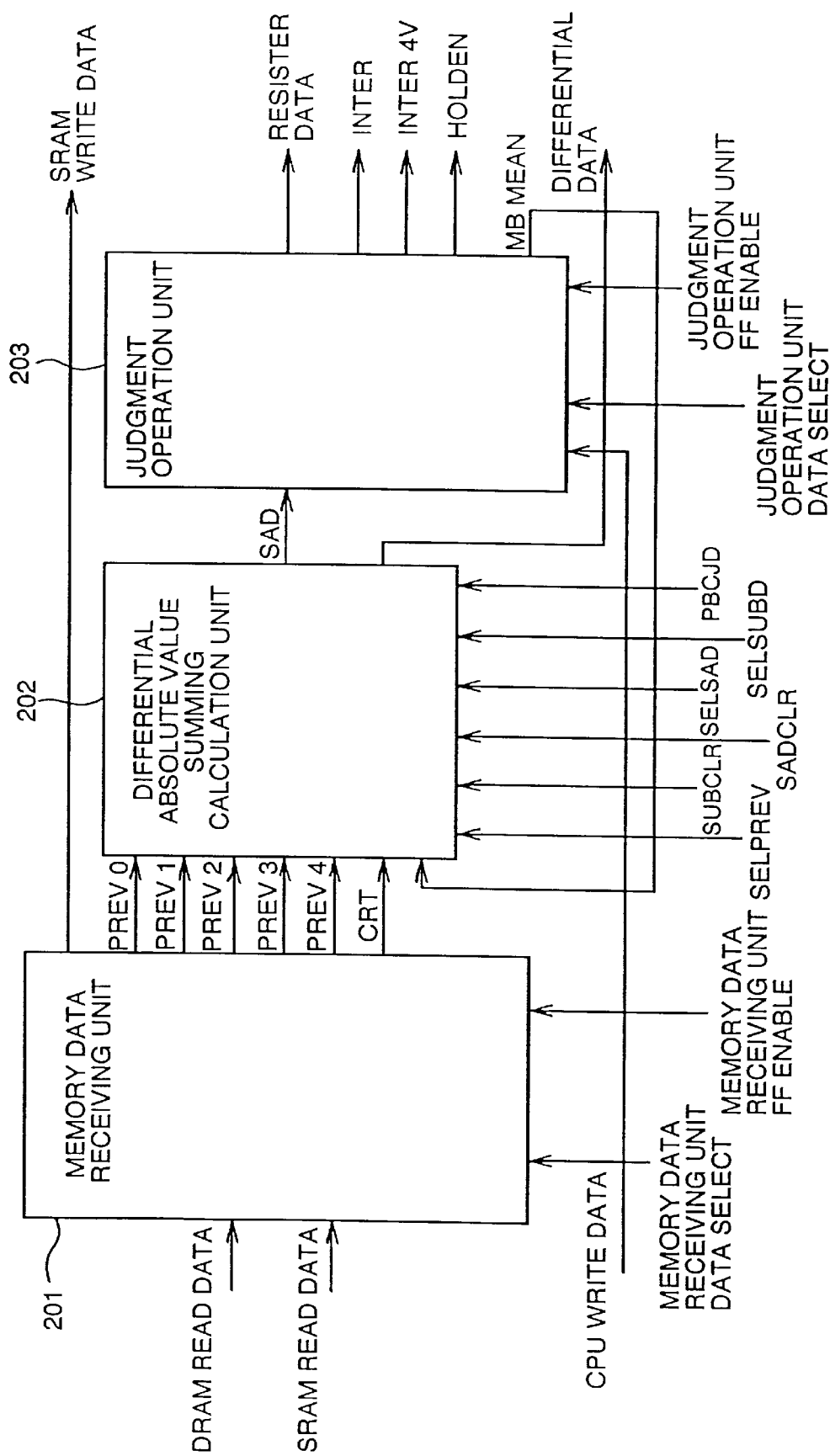
FIG. 2 is a block diagram to illustrate a schematic construction of a motion vector detecting unit 104.

Next, the inner construction of the motion vector detecting unit 104 will be described. FIG. 2 is a block diagram to schematically illustrate the inner construction of the motion vector detecting unit 104.

The motion vector detecting unit 104 contains a memory data receiving unit 201, a differential absolute value summing calculation unit 202, and a judgment operation unit 203.

The memory data receiving unit 201 receives the data read out from the frame memory (the external DRAM) and the data read out from the internal memory unit 103, and sends these data to the differential absolute value summing calculation unit 202.

The differential absolute value summing calculation unit 202 calculates each of the differential absolute values between the data of pixels that take similar positions in both of the gazed block and each block in the reference region, and calculates the sum of these differential absolute values.

The judgment operation unit 203 compares multiple sums of the differential absolute values calculated by the differential absolute value summing calculation unit 202, and judges whether or not to execute the inter-frame predictive coding as to the gazed block.

Figure 3:
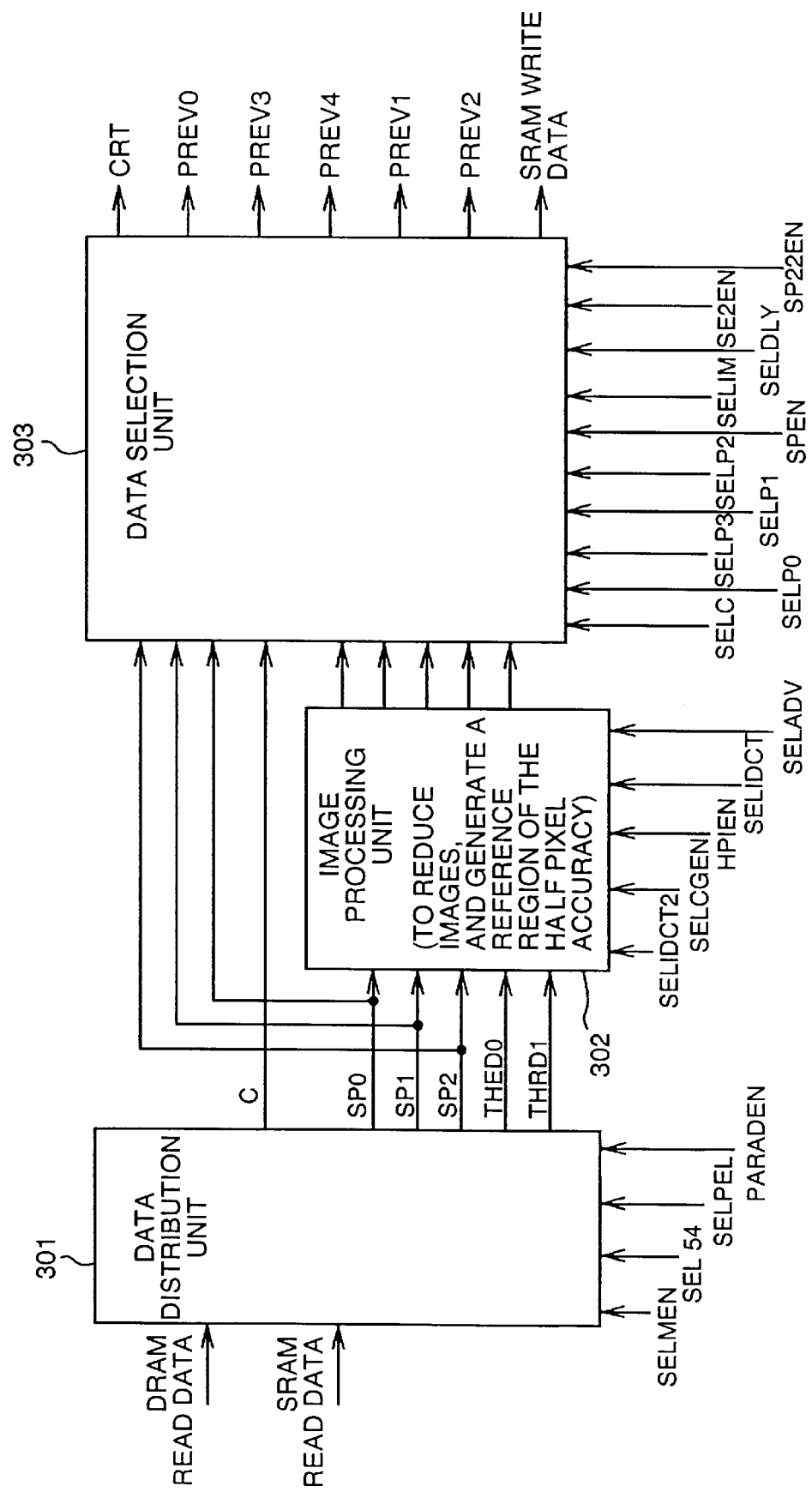
FIG. 3 is a block diagram to illustrate a schematic construction of a memory data receiving unit 201.

Next, the inner construction of the memory data receiving unit 201 will be described. FIG. 3 is a block diagram to schematically illustrate the inner construction of the memory data receiving unit 201. The memory data receiving unit 201 contains a data distribution unit 301, the image processing unit 302, and a data selection unit 303.

The data distribution unit 301 distributes the data read out from the frame memory and the data read out from the internal memory unit 103 to a plurality of ports (six ports in case of FIG. 3).

Although the detail will be described later in FIG. 16, the image processing unit 302 has the function to reduce at least one of the image data of the gazed block and the image data of the reference region, and the function to generate the image data of the half pixel accuracy from the image data of the reference region.

The data selection unit 303 selects either the data outputted from the data distribution unit 301 or the data outputted from the image processing unit 302.

Figure 4:
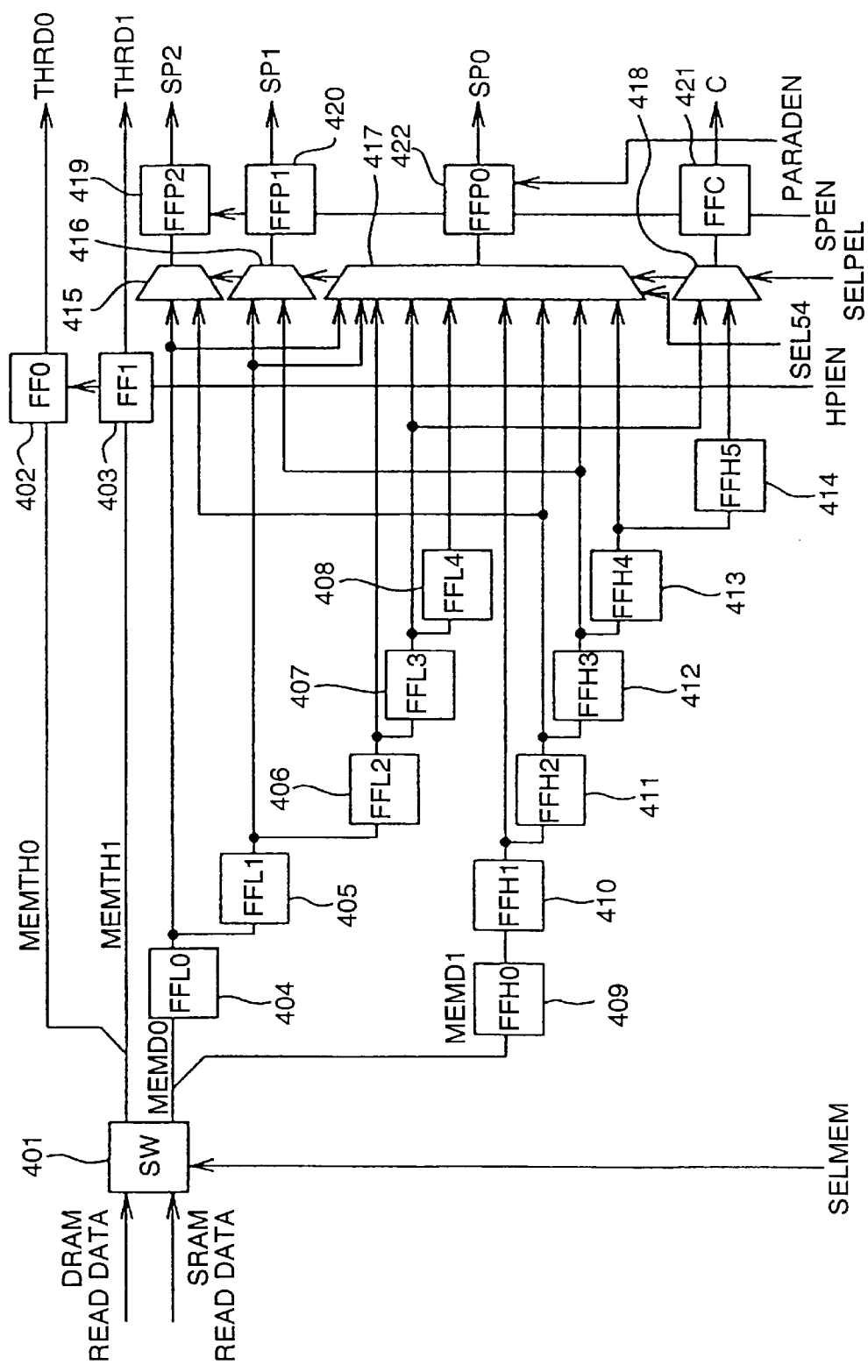
FIG. 4 illustrates a circuit example of a data distribution unit 301.

Next, a concrete circuit example of the data distribution unit 301 will be described. FIG. 4 illustrates one circuit example of the data distribution unit 301.

The data distribution unit 301 contains a switch 401, flip-flops 402~414, selectors 415, 416, 418, a selector 417, flip-flops 419, 420, 421, and a flip-flop 422. These components are connected as in FIG. 4.

The switch 401 is controlled by the signal SELMEM. And, this switch 401 outputs the data transmitted from the frame memory (denoted the DRAM read data) and the data transmitted from the internal memory 103 (denoted the SRAM read data) to the circuits of the subsequent stages as the signal MEMD or the signal MEMTH as shown in FIG. 38 in accordance with the status of the signal SELMEM.

The flip-flops 402~414 delay the data inputted to each of these flip-flops, in accordance with the clock signal.

The selectors 415, 416, 418 each are controlled by the signal SELPEL, and output the signals as shown in FIG. 39 in accordance with the status of the signal SELPEL.

The selector 417 is controlled by the signal SELPEL and the signal SEL54, and outputs the signals as shown in FIG. 40 in accordance with the status of the signal SELPEL and the signal SEL54.

The flip-flops 419, 420, 421 hold the data inputted to each of these flip-flops in accordance with the signal SPEN and the clock signal.

And, the flip-flop 422 holds the data inputted thereto in accordance with the signal SPEN and the signal PARADEN.

Figure 5:
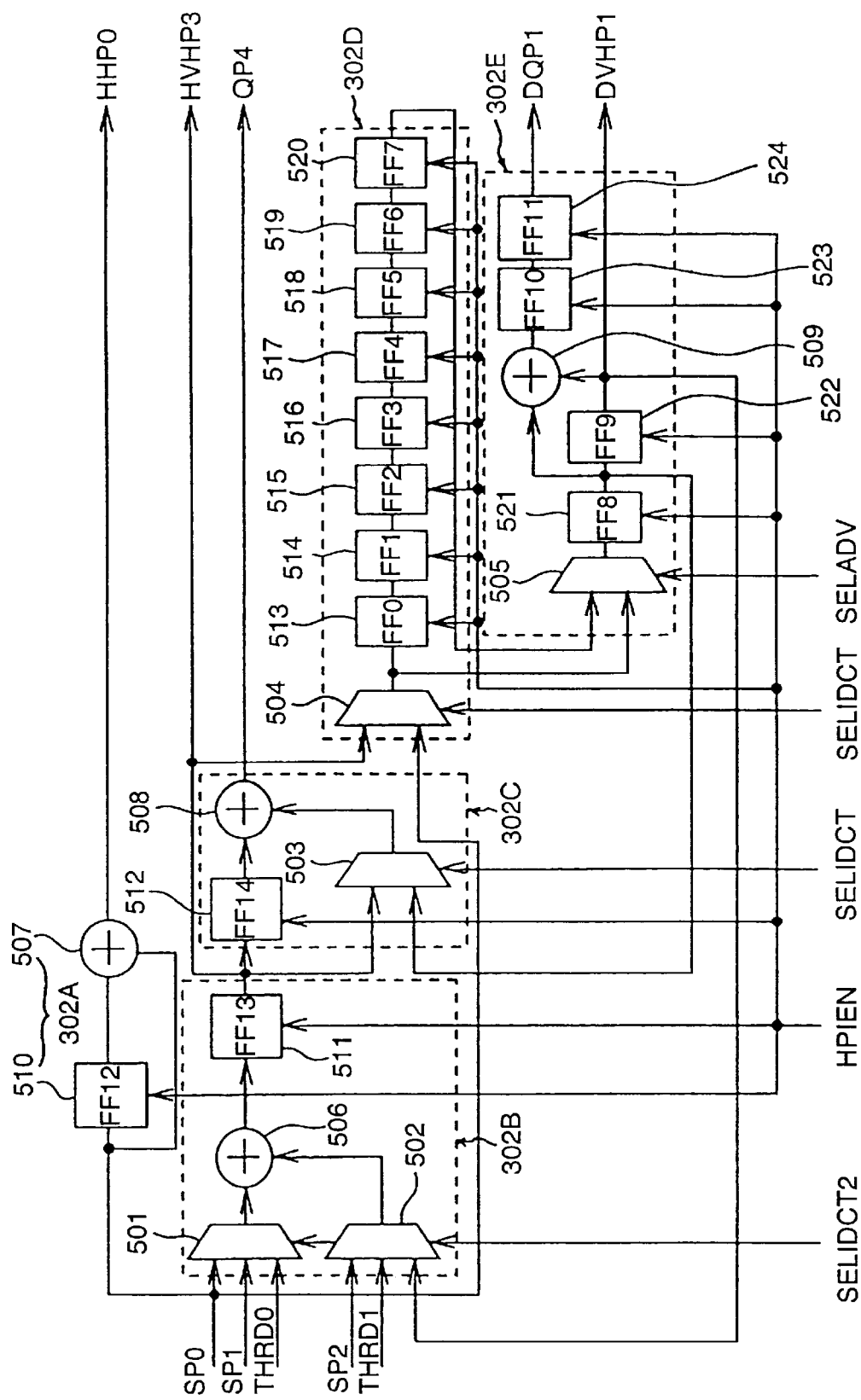
FIG. 5 illustrates a circuit example of an image processing unit 302.

Next, a concrete circuit example of the image processing unit 302 will be described. FIG. 5 illustrates one circuit example of the image processing unit 302.

The image processing unit 302 contains selectors 501~505, adders 506~509, and flip-flops 510~525. These components are connected as shown in FIG. 5.

The selectors 501 and 502 each are controlled by the signal SELIDCT2, and outputs the signals as shown in FIG. 41 in accordance with the status of the signal SELIDCT2.

The selector 503 is controlled by the signal SELCGEN, and outputs the signals as shown in FIG. 42 in accordance with the status of the signal SELCGEN.

The selector 504 is controlled by the signal SELIDCT, and outputs the signals as shown in FIG. 43 in accordance with the status of the signal SELIDCT.

The selector 505 is controlled by the signal SELAVD, and outputs the signals as shown in FIG. 44 in accordance with the status of the signal SELAVD.

The adder 506 adds the outputs from the selectors 501 and 502. The adder 507 adds the input signal to and the output signal from the flip-flop 510. The adder 508 adds the output from the flip-flop 512 and the output from the selector 503. The adder 509 adds the input signal to and the output signal from the flip-flop 522.

The flip-flops 510~524 hold the data inputted to each of these flip-flops in accordance with the signal HPIEN and the clock signal.

The image processing unit 302 in FIG. 5 contains the first through fifth means 302a~302e defined in this invention.

The first means 302a adds the values of the horizontal two pixels of an image, an generates the horizontal two pixel average. In FIG. 5, the first means 302a is made up of the flip-flop 510 and the adder 507. Here, assuming that the output of the flip-flop 510 forms n bits, only the n−1 bits excluding the lowest bit are connected to the circuits of the subsequent stages of the image processing unit 302 as the signal HHP0. Thus, the first means 302a generates the two pixel average (the two pixel averages hereunder are generated in the same manner).

The second means 302b adds the values of the horizontal two pixels of an image, and generates the horizontal two pixel average; or the second means 302b adds the values of the vertical two pixels of an image, and generates the vertical two pixel average, that is, the second means 302b is selectively used between the above two functions. In FIG. 5, the second means 302b is made up with the selectors 501, 502, the adder 506, and the flip-flop 511.

The third means 302c adds the sum calculated by the second means 302b and the sum calculated by the second means 302b in the past, and generates the four pixel average. In FIG. 5, the third means 302c is made up of the flip-flop 512, the selector 503, and the adder 508.

In this embodiment, the sum calculated by the second means 302b in the past represents the sum delayed by the flip-flop 512, or the sum that is delayed by the fourth means 302d and thereafter inputted through the flip-flop 521 and the selector 503. And, in the third means 302c, assuming that the output of the adder 508 forms n bits, only the upper bits, excluding the lowest two bits, are connected to the circuits of the subsequent stages of the image processing unit 302 as the signal QP4. Thus, the third means 302c generates the four pixel average (the four pixel averages hereunder are generated in the same manner).

The fourth means 302d receives either the sum from the second means 302b or the horizontal one pixel value, and delays the inputted value for a specific time. In FIG. 5, the fourth means 302d is made up of the adder 504 and the flip-flops 513~520.

Here, the horizontal one pixel value means the signal SP0 that is inputted to the image processing unit 302. And, the delay time by the fourth means 302d is defined as the time within which the second means 302b completes the addition of the horizontal one line of an image by each two pixels.

The fifth means 302e is selectively supplied with either the value inputted to the fourth means 302d or the value, after being inputted to and delayed by the fourth means 302d. Further, the fifth means 302e adds the inputted value and a value inputted to the fifth means 302e in the past, and generates the average. In FIG. 5, the fifth means 302e is made up of the selector 505, the flip-flops 521, 522, the adder 509, and the flip-flops 523, 524.

The fifth means 302e calculates the signal DVHP1, equivalent to a signal in which the foregoing signal HVHP3 (namely, the vertical two pixel average data) is delayed for 10 cycles, and the signal DQP1, equivalent to a signal in which the foregoing signal QP4 (namely, the four pixel average data) is delayed for 10 cycles (for the detail, refer to the paragraph of the S3VDC process described later).

The image processing unit 302 generates the reduced image of the reference region by the second~fourth means 302b~302d and a part of the fifth means 302e, and generates the reference region of the half pixel accuracy by the first~fifth means 302a~302e, which will be detailed later.

Figure 6:
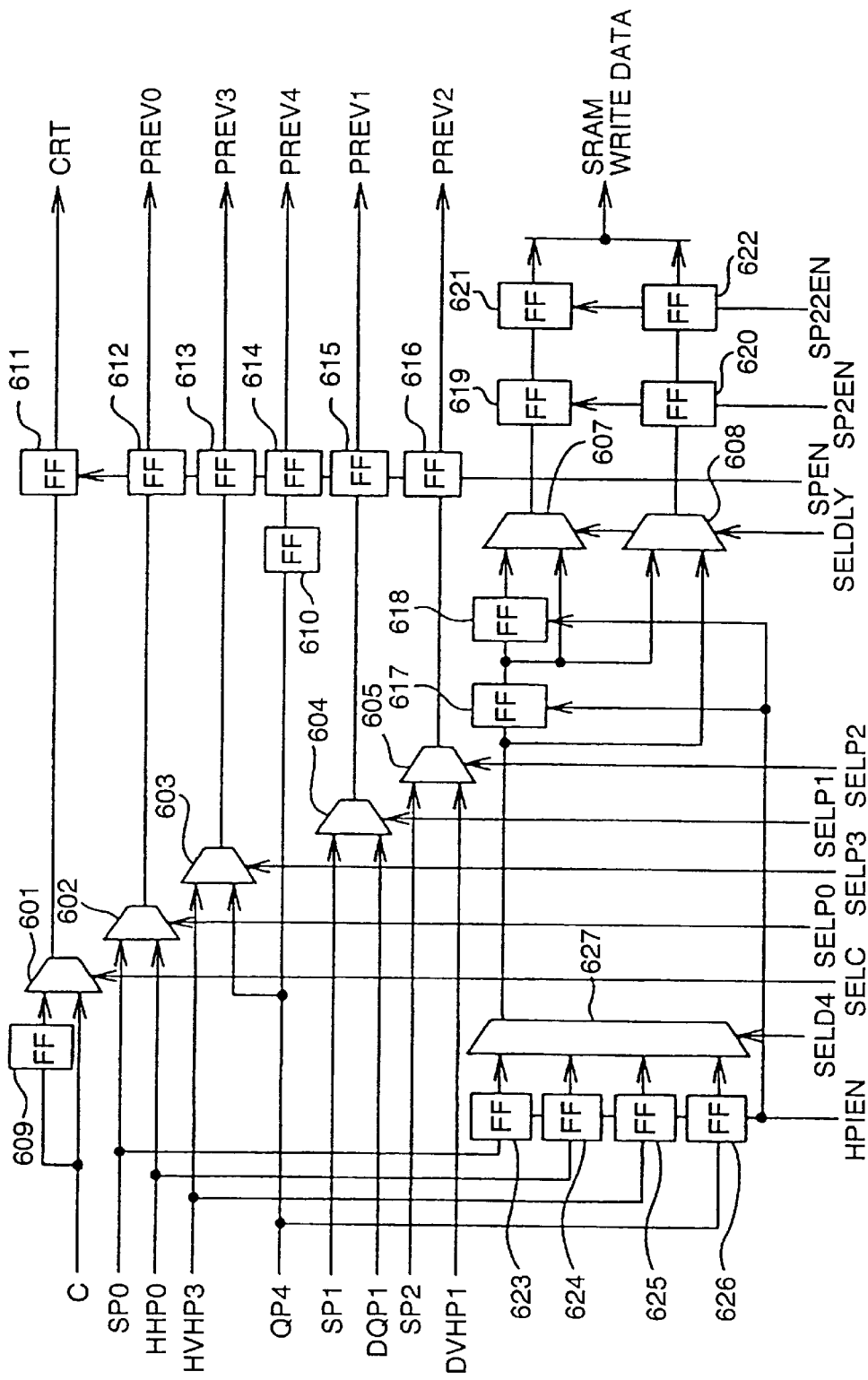
FIG. 6 illustrates a circuit example of a data selection unit 303.

Next, a concrete circuit example of the data selection unit 303 will be described. FIG. 6 illustrates one circuit example of the data selection unit 303.

The data selection unit 303 contains selectors 601~605, selectors 607, 608, flip-flops 609~626, and a selector 627. These components are connected as shown in FIG. 6.

The selectors 601 is controlled by the signal SELIC, and outputs the signals as shown in FIG. 45 in accordance with the status of the signal SELC.

The selector 602 is controlled by the signal SELP0, and outputs the signals as shown in FIG. 46 in accordance with the status of the signal SELP0.

The selector 603 is controlled by the signal SELP3, and outputs the signals as shown in FIG. 47 in accordance with the. status of the signal SELP3.

The selector 604 is controlled by the signal SELP1, and outputs the signals as shown in FIG. 48 in accordance with the status of the signal SELP1.

The selector 605 is controlled by the signal SELP2, and outputs the signals as shown in FIG. 49 in accordance with the status of the signal SELP2.

The selectors 607, 608 are controlled by the signal SELDLY, and outputs the signals as shown in FIG. 50 in accordance with the status of the signal SELDLY.

The selector 627 is controlled by the signal SELIM, and outputs the signals as shown in FIG. 51 in accordance with the status of the signal SELIM.

The flip-flops 609, 610 hold the data inputted to each of these flip-flops for one clock. The flip-flops 611~616 hold the data inputted to each of these flip-flops in accordance with the signal SPEN and the clock signal. The flip-flops 617, 618 hold the data inputted to each of these flip-flops in accordance with the signal SPEN and the clock signal. The flip-flops 619, 620 hold the data inputted to each of these flip-flops in accordance with the signal SP2EN and the clock signal. And, the flip-flops 621, 622 hold the data inputted to each of these flip-flops in accordance with the signal SP22EN and the clock signal.

Next, a concrete circuit example of the differential absolute value summing calculation unit 202 will be described.

Figure 7:
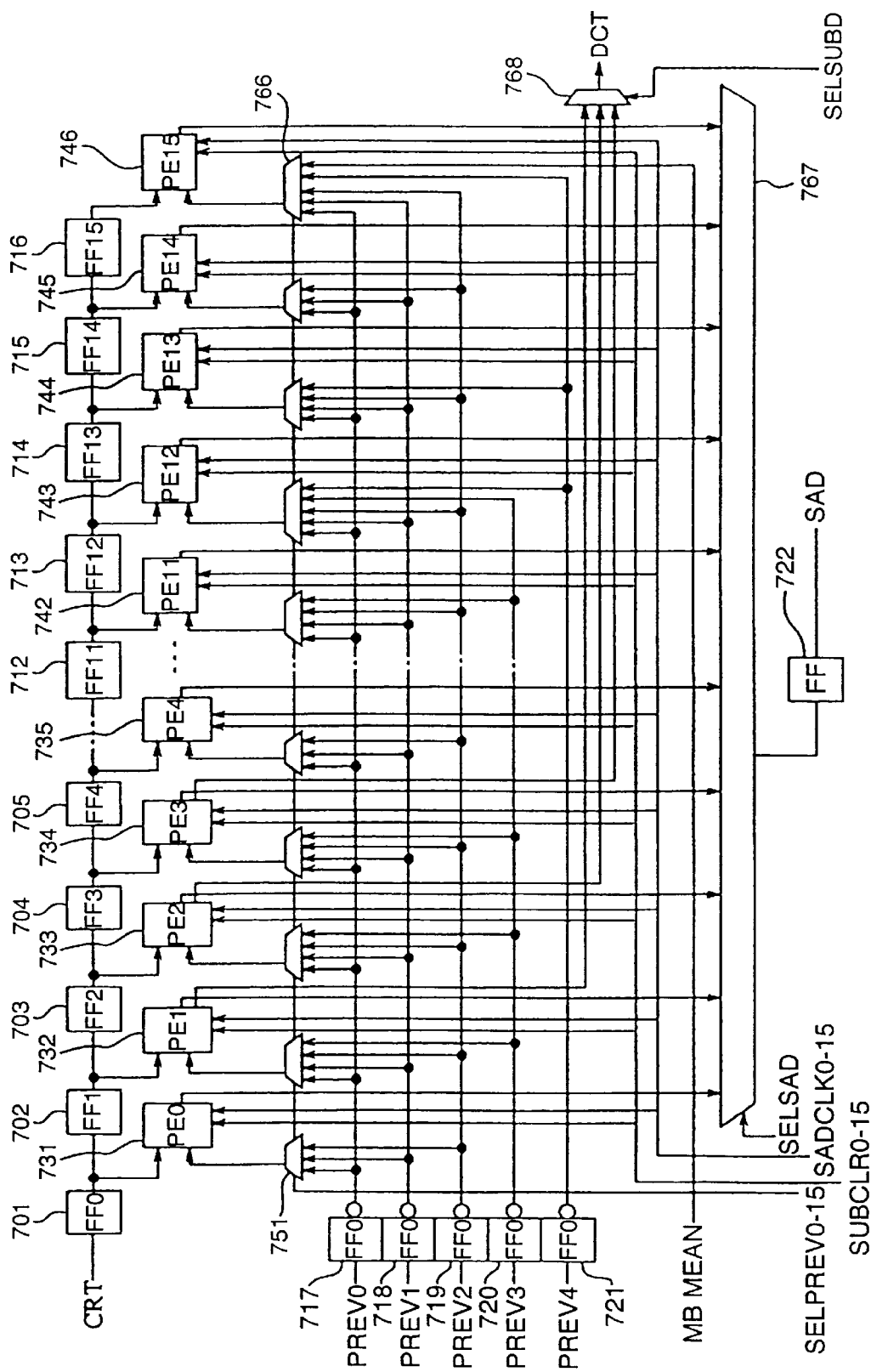
FIG. 7 illustrates a circuit example of a differential absolute value summing calculation unit 202.

FIG. 7 illustrates one circuit example of the differential absolute value summing calculation unit 202.

The differential absolute value summing calculation unit 202 contains flip-flops 701~716, flip-flops 717~721, a flip-flop 722, processor elements (PE) 731~746, selectors 751~766, a selector 767, and a selector 768. These components are connected as shown in FIG. 7.

Here in this example, the number of the processor elements (PE) is specified as 16; however, this is only one example.

Since this example contains 16 processor elements (PE), the first step in this invention is able to calculate, virtually in parallel, the sum of the differential absolute values between the pixel data of the gazed block and the pixel data of the 16 blocks in the reference region. In order to calculate the average value MBMEAN of all the pixels of the gazed block, the second step utilizes one of the vacant PEs out of the 16 PEs, which are not used for calculating the sum of the differential absolute values, and the third step utilizes one of the vacant PEs for calculating the second sum of the differential absolute values (the details will be explained later).

The flip-flops 701~716 delay the input signal CRT in accordance with the clock signal.

The processor elements 731~746 calculate the sum of the differential absolute values.

The selector 751 is controlled by the signal SELPREV0, and outputs the signals as shown in FIG. 52 in accordance with the status of the signal SELPREV0. The output from the selector 751 is inputted to the processor element 731.

The selector 752 is controlled by the signal SELPREV1, and outputs the signals as shown in FIG. 53 in accordance with the status of the signal SELPREV1. The output from the selector 752 is inputted to the processor element 732.

The selector 753 is controlled by the signal SELPREV2, and outputs the signals as shown in FIG. 54 in accordance with the status of the signal SELPREV2. The output from the selector 753 is inputted to the processor element 733.

The selector 754 is controlled by the signal SELPREV3, and outputs the signals as shown in FIG. 55 in accordance with the status of the signal SELPREV3. The output from the selector 754 is inputted to the processor element 734.

The selector 755 is controlled by the signal SELPREV4, and outputs the signals as shown in FIG. 56 in accordance with the status of the signal SELPREV4. The output from the selector 755 is inputted to the processor element 735.

The selector 756 is controlled by the signal SELPREV5, and outputs the signals as shown in FIG. 57 in accordance with the status of the signal SELPREV5. The output from the selector 756 is inputted to the processor element 736.

The selector 757 is controlled by the signal SELPREV6, and outputs the signals as shown in FIG. 58 in accordance with the status of the signal SELPREV6. The output from the selector 757 is inputted to the processor element 737.

The selector 758 is controlled by the signal SELPREV7, and outputs the signals as shown in FIG. 59 in accordance with the status of the signal SELPREV7. The output from the selector 758 is inputted to the processor element 738.

The selector 759 is controlled by the signal SELPREV8, and outputs the signals as shown in FIG. 60 in accordance with the status of the signal SELPREV8. The output from the selector 759 is inputted to the processor element 739.

The selector 760 is controlled by the signal SELPREV9, and outputs the signals as shown in FIG. 61 in accordance with the status of the signal SELPREV9. The output from the selector 760 is inputted to the processor element 740.

The selector 761 is controlled by the signal SELPREV10, and outputs the signals as shown in FIG. 62 in accordance with the status of the signal SELPREV10. The output from the selector 761 is inputted to the processor element 741.

The selector 762 is controlled by the signal SELPREV11, and outputs the signals as shown in FIG. 63 in accordance with the status of the signal SELPREV11. The output from the selector 762 is inputted to the processor element 742.

The selector 763 is controlled by the signal SELPREV12, and outputs the signals as shown in FIG. 64 in accordance with the status of the signal SELPREV12. The output from the selector 763 is inputted to the processor element 743.

The selector 764 is controlled by the signal SELPREV13, and outputs the signals as shown in FIG. 65 in accordance with the status of the signal SELPREV13. The output from the selector 764 is inputted to the processor element 744.

The selector 765 is controlled by the signal SELPREV14, and outputs the signals as shown in FIG. 66 in accordance with the status of the signal SELPREV14. The output from the selector 765 is inputted to the processor element 745.

The selector 766 is controlled by the signal SELPREV15, and outputs the signals as shown in FIG. 67 in accordance with the status of the signal SELPREV15. The output from the selector 766 is inputted to the processor element 746.

The selector 767 selects one of the outputs from the processor elements 731~746. The selector 767 is controlled by the signal SELSAD, and outputs the signals as shown in FIG. 68 in accordance with the status of the signal SELSAD. The output from the selector 767 is the sum of the differential absolute values SAD.

The selector 768 selects one of the outputs from the processor elements 732~734. The selector 768 is controlled by the signal SELSUBD, and outputs the signals as shown in FIG. 69 in accordance with the status of the signal SELSUBD.

Next, concrete constructions of the processor elements 731~746 each will be described.

Figure 8:
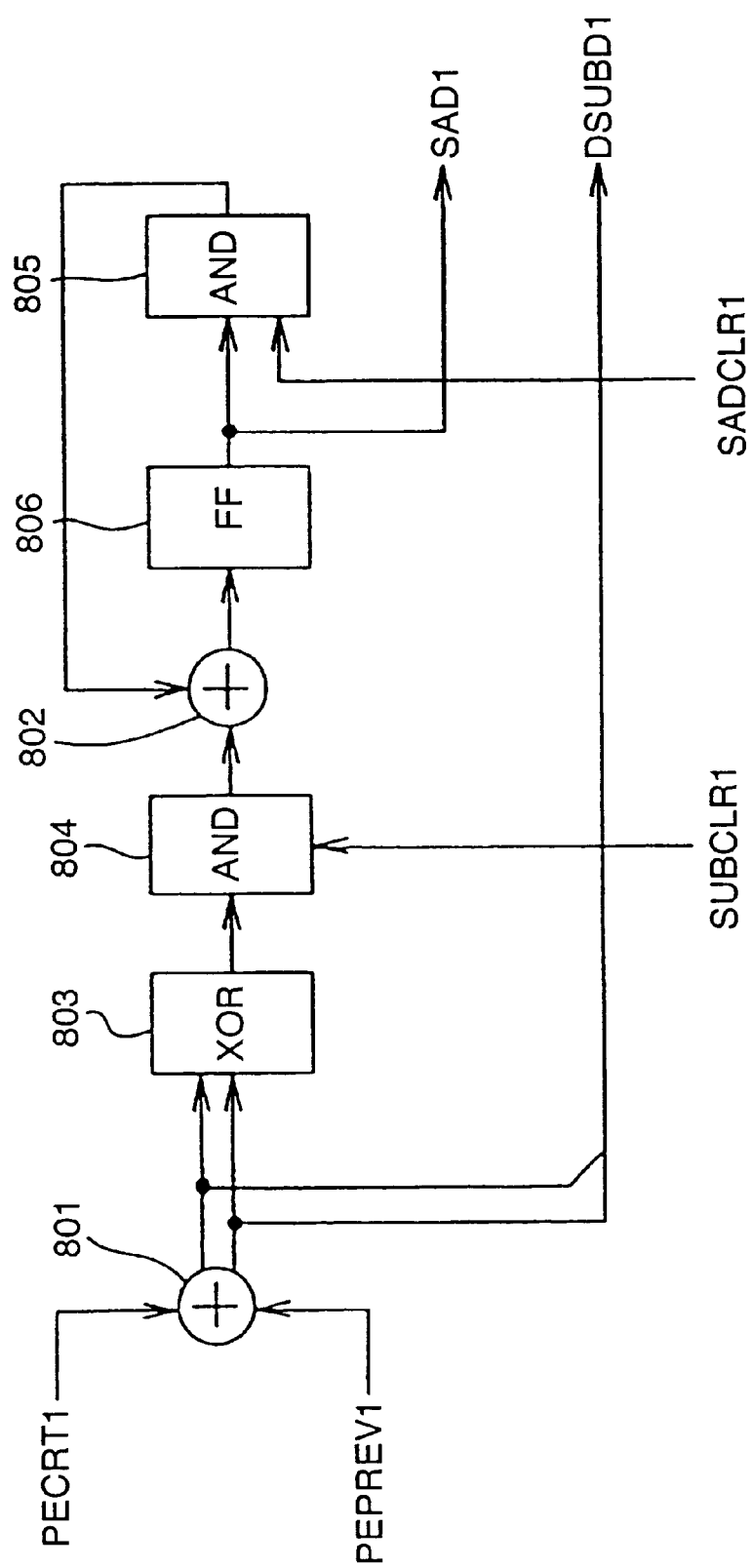
FIG. 8 illustrates a circuit example of PE (processor element) 1~3.

The processor elements 732~734 each have the identical construction. FIG. 8 illustrates one circuit example for the processor elements 732~734.

Each of the processor elements 732~734 has adders 801, 802, an exclusive OR circuit (xor) 803, AND circuits 804, 805, and a flip-flop 806. These components are connected as shown in FIG. 8.

The adder 801 calculates the differences between the image data of the gazed block of the present screen and the image data of the reference region of the reference screen. Specifically, the adder 801 calculates the differences between the data of the pixels corresponding to the same positions in the gazed block and each of the blocks in the reference region.

The exclusive OR circuit 803 converts the difference calculated by the added 801 into an absolute value.

The AND circuit 804 clears the differential absolute value to zero. The adder 802 calculates the sum of the differential absolute values. The flip-flop 806 holds the sum of the differential absolute values that the adder 802 calculated. The AND circuit 805 clears the sum of the differential absolute values to zero.

Figure 9:
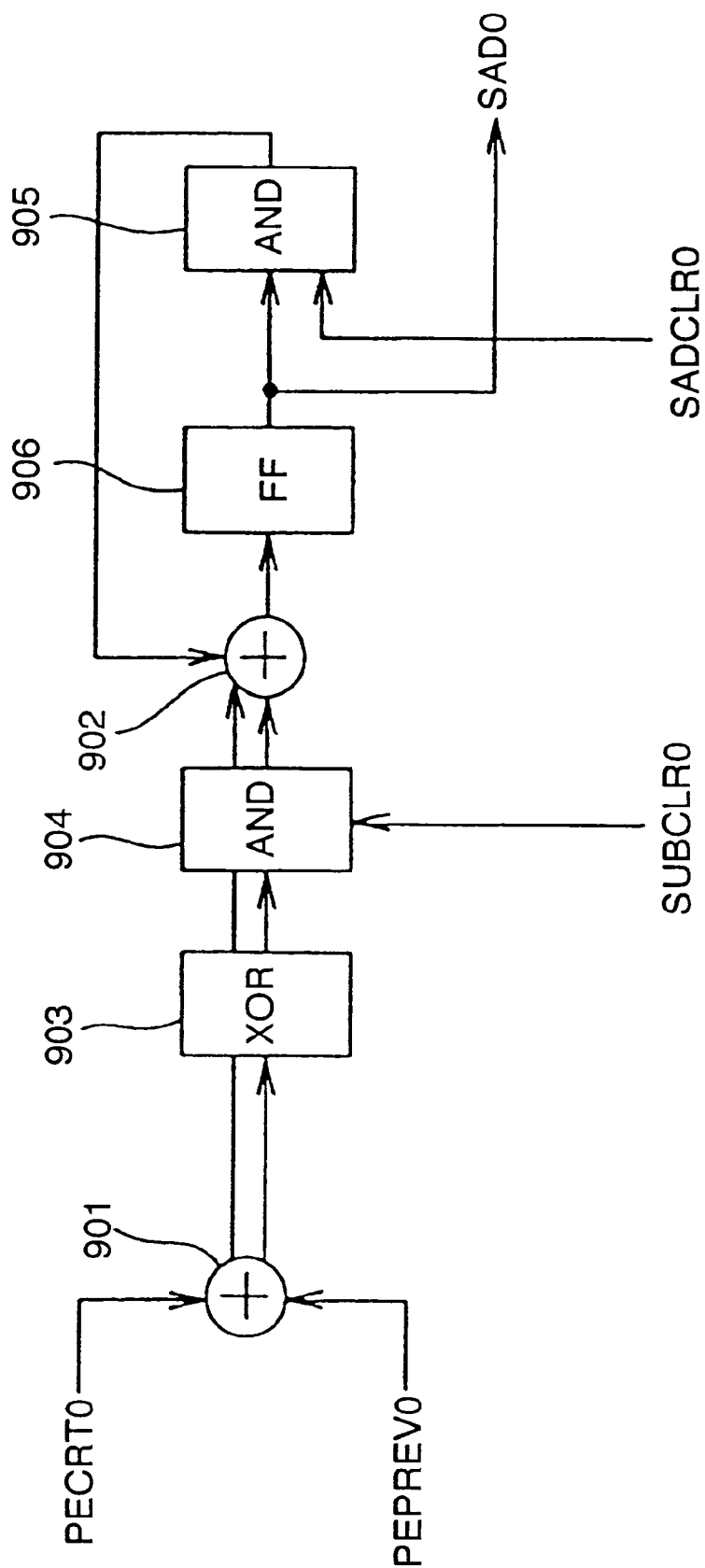
FIG. 9 illustrates a circuit example of PE (processor element) 0, 4~14.

The processor elements 731, 735~745 each have the identical construction. FIG. 9 illustrates one circuit example for the processor elements 731, 735~745.

Each of the processor elements 731, 735~745 contains adders 901, 902, an exclusive OR circuit (xor) 903, AND circuits 904, 905, and a flip-flop 906. These components are connected as shown in FIG. 9.

The adder 901 has the same function as the foregoing adder 801. That is, the adder 901 calculates the differences between the image data of the gazed block of the present screen and the image data of the reference region of the reference screen.

The exclusive OR circuit 903 converts the difference calculated by the added 901 into an absolute value.

The AND circuit 904 clears the differential absolute value to zero. The adder 902 calculates the sum of the differential absolute values. The flip-flop 906 holds the sum of the differential absolute values that the adder 902 calculated. The AND circuit 905 clears the sum of the differential absolute values to zero.

Figure 10:
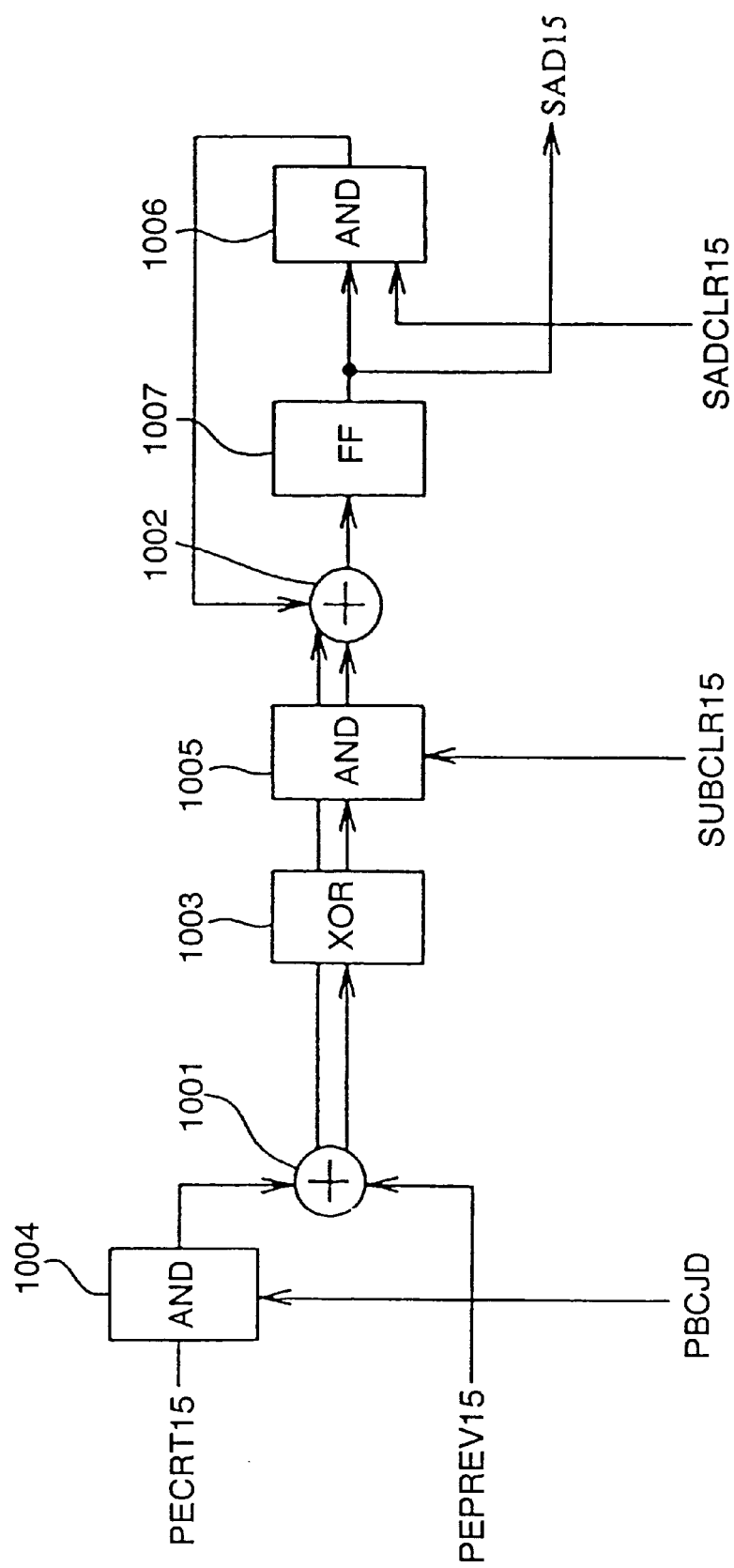
FIG. 10 illustrates a circuit example of a PE (processor element) 15.

FIG. 10 illustrates one circuit example for the processor element 746. The processor element 746 contains adders 1001, 1002, an exclusive OR circuit (xor) 1003, AND circuits 1004, 1005, 1006, and a flip-flop 1007. These components are connected as shown in FIG. 10.

The AND circuit 1004 clears the image data of the gazed block GB of the present screen to zero. The adder 1001 calculates the difference between the image data of the gazed block of the present screen and the image data of the reference region of the reference screen.

The exclusive OR circuit 1003 converts the difference calculated by the adder 1001 into an absolute value.

The AND circuit 1005 clears the differential absolute value to zero. The adder 1002 calculates the sum of the differential absolute values. The flip-flop 1007 holds the sum of the differential absolute values that the adder 1002 calculated. The AND circuit 1006 clears the sum of the differential absolute values to zero.

Figure 11:
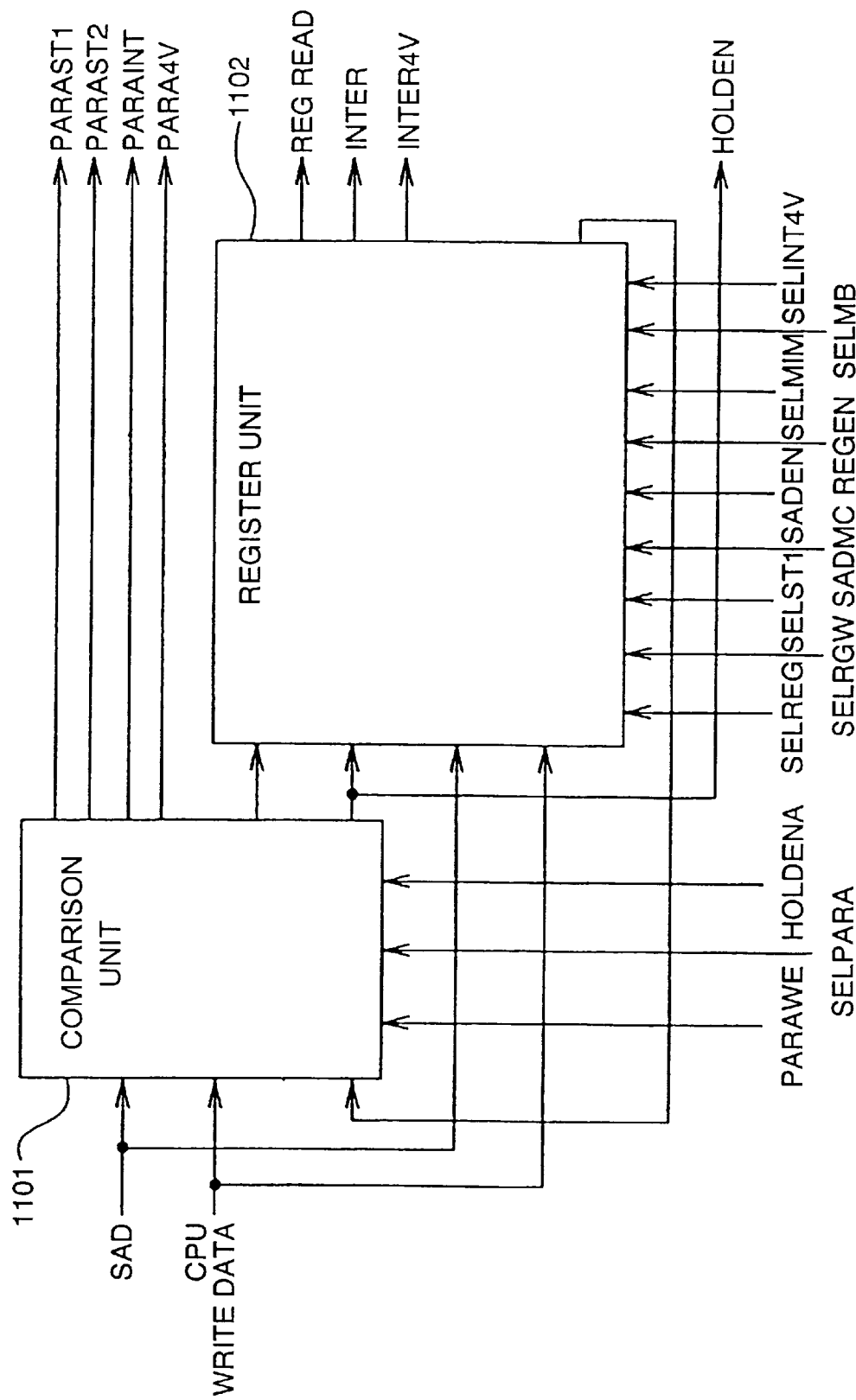
FIG. 11 is a block diagram to illustrate a schematic construction of a judgment operation unit 203.

Next, the inner construction of the judgment operation unit 203 will be described. FIG. 11 is a block diagram to schematically illustrate the inner construction of the judgment operation unit 203.

The judgment operation unit 203 contains a comparison unit 1101 and a register unit 1102.

The comparison unit 1101 performs the operation to generate parameters used in determining the magnitude between the sums SAD of the differential absolute values that the differential absolute value summing calculation unit 202 outputs, and judging whether or not to execute the inter-frame predictive coding. Further, the comparison unit 1101 outputs the minimum differential absolute value through the generated parameters, and the judgment result as to the execution of the inter-frame predictive coding.

The register unit 1102 holds information such as the minimum differential absolute value and the judgment result as to the execution of the inter-frame predictive coding outputted from the comparison unit 1101.

Figure 12:
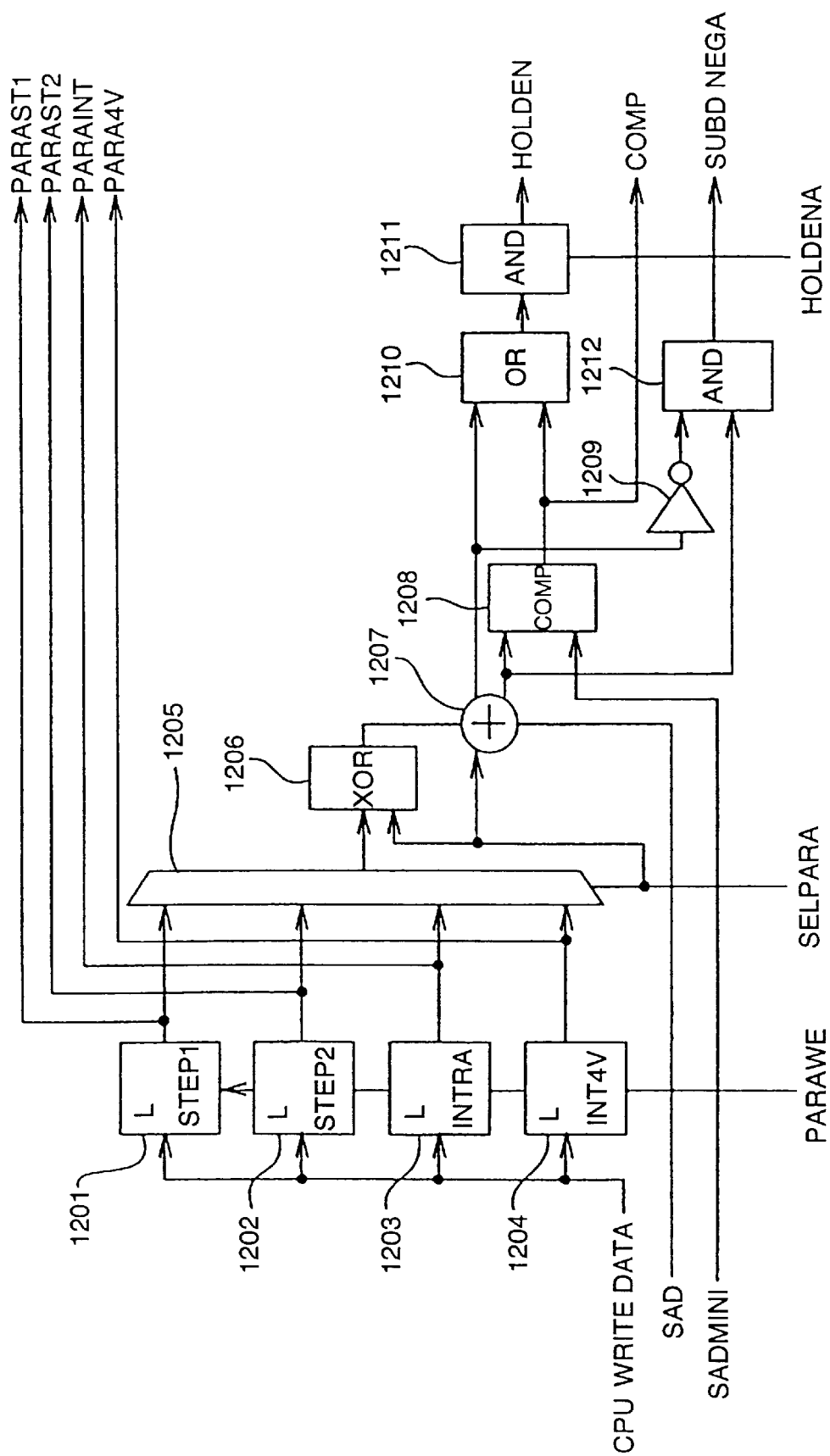
FIG. 12 illustrates a circuit example of a comparison unit 1101.

Next, a concrete construction example of the comparison unit 1101 will be described. FIG. 12 illustrates one circuit example of the comparison unit 1101.

The comparison unit 1101 contains latch circuits 1201~1204, a selector 1205, an exclusive OR circuit 1206, an adder 1207, a comparator 1208, a NOT circuit 1209, OR circuit 1210, and AND circuits 1211, 1212. These components are connected as shown in FIG. 12.

The latch circuit 1201 holds a parameter, of the parameters, to be subtracted from the differential absolute value SADq of the zero vector at the first step to detect the motion vector.

The latch circuit 1202 holds a parameter, of the second parameter, to be subtracted from the differential absolute value SAD of the zero vector at the second step to detect the motion vector.

The latch circuit 1203 holds a judgment parameter INTRA, of the parameters, to be added to A during the judgment operation of the inter-frame predictive coding. Here, A represents the sum of the differential absolute values between the average of the pixel data of the gazed block GB and each of the pixel data (the second sum A of the differential absolute values).

The latch circuit 1204 holds a judgment parameter INTRA4, of the parameters, to be added to the foregoing A during judging whether or not to apply the 4 vector to the gazed block (the 4 vector will be explained later in the paragraph of the motion vector detecting operation).

The selector 1205 selects one of the outputs of the latch circuits 1201~1204. The selector 1205 is controlled by the signal SELPARA, and outputs the signals as shown in FIG. 70 in accordance with the status of the signal SELEPARA.

The exclusive OR circuit 1206 inverts the parameter used for the subtraction of the foregoing parameter used for the judgment.

The adder 1207 adds the parameter used for the judgment and the sum SAD of the differential absolute values.

The comparator 1208 compares the output of the adder 1207 with the minimum value SADMINI of the differential absolute values.

The NOT circuit 1209 inverts the sign bit that the adder 1208 outputs.

The OR circuit 1210 outputs the comparison result when the adder 1207 delivers the negative output.

The AND circuit 1211 outputs the comparison result as the comparison result HOLDEN, only when the value of the motion vector is within the effective range of the comparison.

The AND circuit 1212 zeroizes the output result of the adder 1207, when the adder 1207 delivers the negative output.

Figure 13:
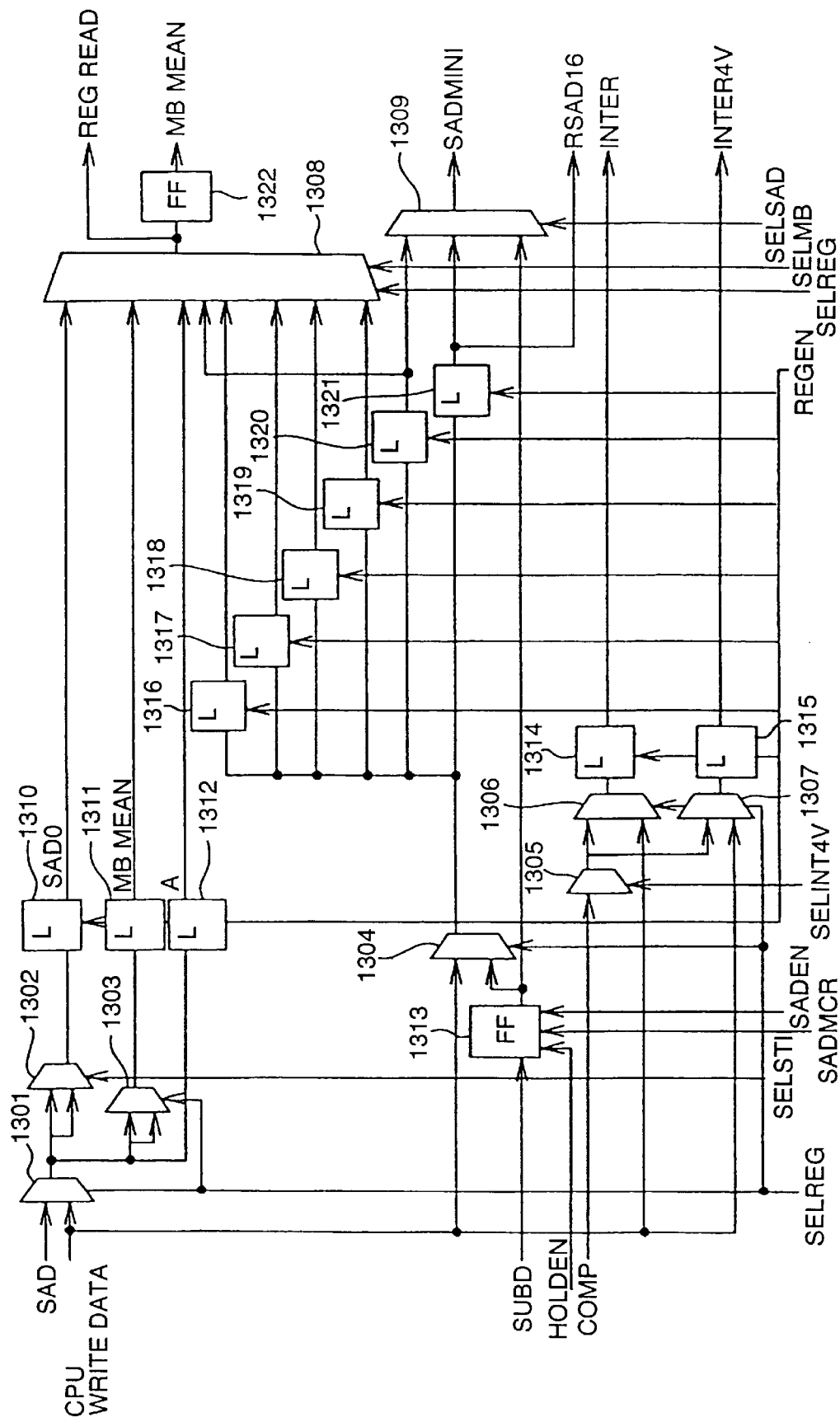
FIG. 13 illustrates a circuit example of a register unit 1102.

Next, a concrete construction example of the register unit 1102 will be described. FIG. 13 illustrates one circuit example of the register unit 1102.

The register unit 1102 contains selectors 1301~1309, latch circuits 1310~1312, 1314~1321, flip-flops 1313, 1322. These components are connected as shown in FIG. 13.

Each of the selectors 1301, 1303, 1304, 1306, 1307 is controlled by the signal SELREG. The selector 1302 is controlled by the signal SELST1. The selector 1305 is controlled by the signal SELINT4V. The selector 1308 is controlled by the signal SELREG and the signal SELGB.

Each of the latch circuits 1310~1312, 1314~1321 holds the data inputted to each of these circuits in accordance with the signal REGEN.

The flip-flop 1322 is cleared by the signal SADMCR, and holds the data by the signal SADEN.

The flip-flop 1322 delays the data inputted thereto by the clock signal.

Next, the construction of the internal memory unit 103 will be described. The internal memory unit in this case includes an SRAM. The area of the SRAM is divided into E0~E19, in which each block consists of 64 bytes. And, the usage of each block E0~E19 of the SRAM is predetermined as shown in FIG. 71.

Further, the foregoing motion vector detecting device may be constructed by assembling individual electronic components, or by incorporating these components into integrated circuits, or by using the CPU, the internal memory, and the computer program.

2. Description of the Operation of the Motion Vector Detecting Device

Next, the operation of the motion vector detecting device 100 of this embodiment will be described. In this embodiment will be described an example in which the invention is applied to the standard H.263 of the compression/expansion of dynamic images that is recommended by the ITU-T (International Telecommunications Union-Telecommunication Standardization Bureau). Naturally, the motion vector detecting device of this invention can be applied not only to the foregoing standard of the compression/expansion of dynamic images, but also to motion vector detection in general.

Although the detail will be explained later, an example in which the motion vector is detected through three steps will be described.

2-1. Relation of the Units of the Motion Vector Detecting Device 100

Before the operation to detect the motion vector is explained, first, the relation of the units 101~104 of the motion vector detecting device 100 with the other components will be described.

First, the relation of the DRAM interface unit 102 with the other components is as follows.

The DRAM interface unit 102 executes the arbitration in the DRAM bus, on the basis of the DRAM access address (SDMEAD) and the DRAM access request (SDMERQ) from the motion vector detecting unit 104. Here as already mentioned, the DRAM is the frame memory as the external memory.

From the result of the arbitration, the DRAM interface unit 102 sends the DRAM access permission (SDMEGT) to the motion vector detecting unit 104, and executes to the DRAM that access that the motion vector detecting unit 104 requests. And, the DRAM interface unit 102 reads the data from the DRAM, and transfers the data read out to the motion vector detecting unit 104. For example, the motion vector detecting unit 104 executes a 4 burst read by one access to the DRAM, and transfer the data for 8 pixels.

Figure 14:
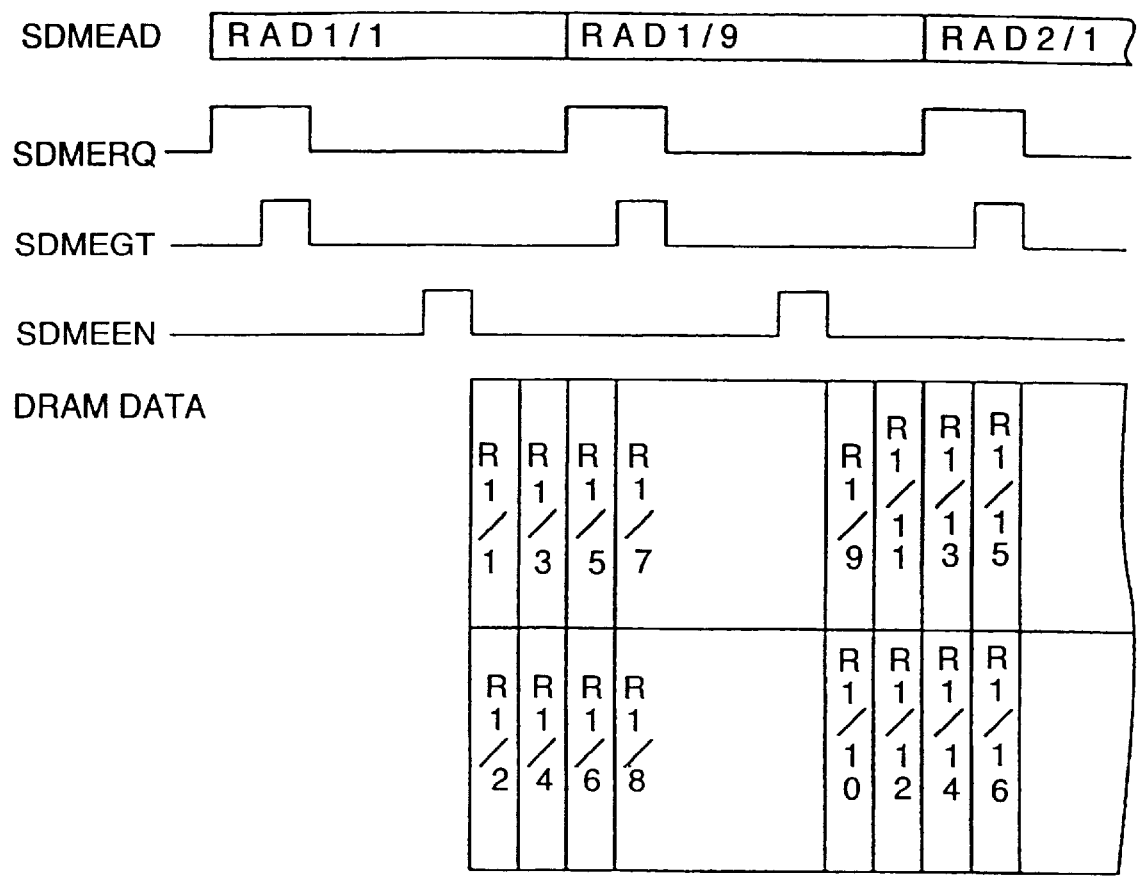
FIG. 14 is a time chart of the data read operation from a DRAM.

FIG. 14 is a time chart to illustrate the data read operation from the foregoing DRAM. In FIG. 14, the signal SDMEEN denotes the Enable signal of the data read. The R1/1, etc., denote the data of each pixel read out from the frame memory. For example, the R1/1 indicates the data of the first pixel of the first line read out from the SRAM.

And, the relation of the internal memory unit 103 with the other components is as follows.

The internal memory unit 103 executes the read access to the SRAM inside the internal memory unit 103, on the basis of the SRAM read address (MEEMRAD) and the SRAM read Enable (MEEMRDEN) from the motion vector detecting unit 104. And, the internal memory unit 103 transfers the data read out from the SRAM to the motion vector detecting unit 104. Further, the internal memory unit 103 executes the write access to the SRAM inside the internal memory unit 103, on the basis of the SRAM write address (MEEMWAD), the SRAM write Enable (MEEMWEN), and the SRAM write pulse (MEEMWTPL). And, the internal memory unit 103 stores the data that the motion vector detecting unit 104 outputs to write into the SRAM.

FIG. 15 is a time chart to illustrate the operation relating to the foregoing internal memory unit 103. In FIG. 15, the RAD1/1, 2, etc., denote the addresses when reading the SRAM. The C1/1, etc., denote the data read out from the SRAM. The WAD1/1, 2, etc., denote the addresses when writing in to the SRAM. And, the Q1/1, etc., denote the data to be written in to the SRAM.

And, the relation of the CPU interface unit 101 with the other components is as follows.

The CPU interface unit 101 executes the register write (write-in to the register unit 1102) to the motion vector detecting unit 104, in accordance with the write access from the CPU (not illustrated). And, the CPU interface unit 101 executes the register read (read-out from the register unit 1102) to the motion vector detecting unit 104, in accordance with the read access from the CPU.

2-2. Operation to Detect the Motion Vector

Next, the operation to detect the motion vector will be described. As already explained, this embodiment takes into consideration the standard H.263 of the compression expansion of dynamic images recommended by the ITU-T, and detects the motion vector through three steps. The outline is as follows, although the detail will be described later.

(Process of the First Step)

Figure 16A:
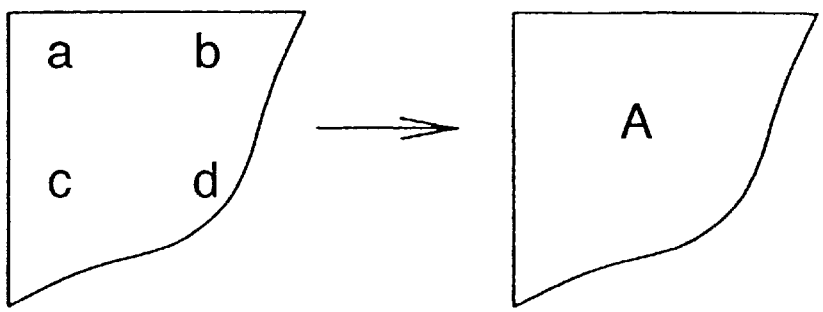
FIG. 16 is a chart to explain the image reduction and the image generation of the half pixel accuracy.

The first step generates an image of the four pixel average (1/4 reduced image) of both the present screen and the reference screen. As shown in FIG. 16(A), a pair of four adjoining pixels are gazed. By the four values a~d of the four pixels, the average (a+b+c+d)/4=A is calculated. The step obtains the image made up by the pixel values thus calculated, that is, the 1/4 reduced image.

Provided that the reference region of a reference screen is as shown in FIG. 72, for example, the 1/4 reduced image of this reference region will be as shown in FIG. 73. That is, R1/1, R1/2, R2/1, and R2/2 make up RQ1/1 as the 1/4 pixel average; R3/1, R3/2, R4/1, and R4/2 make up RQ2/1 as the 1/4 pixel average.

And, the sums of the differential absolute values between the pixel data of the reduced images of the gazed block and the pixel data of the reduced images of the reference region are calculated. Concretely, the sums of the differential absolute values are calculated between the pixel data of the gazed block and the pixel data of 256 blocks given by the even vectors within −16~+14 of the reference region, of which center is the block corresponding to the position corresponding to the gazed block. Naturally, the sums of the differential absolute values between the 1/4 reduced images are obtained. And, the vector to reduce the sum of the differential absolute values to the minimum is detected.

(Process of the Second Step)

The second step employs the original image not reduced (also named as the image of integral pixels) of both the present screen and the reference screen. And, the sums of the differential absolute values are calculated between the pixel data of the gazed block and the pixel data of the 4 blocks given by the 4 vectors within 0~+1, of which center is the vector that reduces the sum of the differential absolute values detected by the process of the first step to the minimum. And, the step detects the vector to reduce the sum of the differential absolute values to the minimum.

(Process of the Third Step)

Figure 16B:
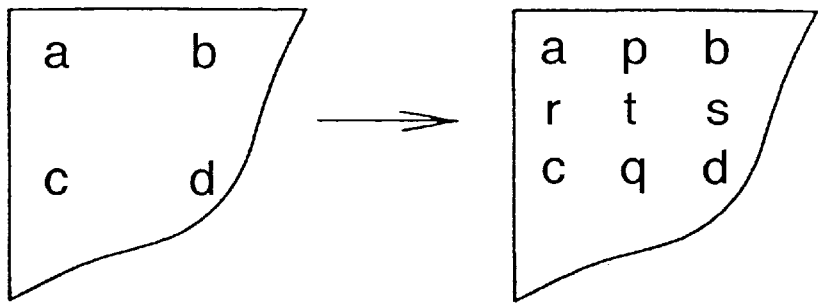

The third step employs the original image not reduced as to the present screen. As to the reference screen on the other hand, the step employs the image formed of the original image data not reduced and the newly calculated image data, which will be hereunder described. That is, as shown in FIG. 16(B), the average values (a+b)/2=p and (c+d)/2=q of the lateral (horizontal) adjoining pixel values of the original image, the average values (a+c)/2=r and (b+d)/2=s of the longitudinal (vertical) adjoining pixel values of the original image, and the average (p+q)/2=t of the adjoining lateral average values are calculated. And, the screen comprised of the pixel values p~t thus calculated and the pixel values a~d of the original images is served as a reference screen. The reference screen including the newly calculated pixel values assumes a dense pixel array of half-pixel accuracy as compared with the array of the original pixels; and in this specification, it is named "the reference screen of the half pixel accuracy."

Next, the sums of the differential absolute values are calculated between the pixel data of the gazed block and the pixel data of the 8 blocks given by the 8 vectors within −0.5~+0.5 of the reference screen of the half pixel accuracy, of which center is the vector that reduces the sum of the differential absolute values detected by the process of the second step to the minimum.

And, the motion vector is detected from the block to reduce the sum of the differential absolute values to the minimum and the gazed block.

Here in this embodiment, the region including the 8 blocks corresponds to "the reference region of the half pixel accuracy" as defined in this invention.

The detailed procedure of the operation to detect the motion vector through the foregoing first third steps is outlined as shown in FIG. 74.

Next, the processes as shown in FIG. 74 will now be described.

(CDLC Process)

The motion vector detecting unit 104 generates an address to access the image data of the gazed block in which the motion vectors are searched, and outputs the address to the DRAM interface unit 102. The DRAM interface unit 102 accesses the frame memory being the external memory by the address, and fetches the data of the gazed block (16 pixels×16 lines) of the present screen. The motion vector detecting unit 104 converts the format of the foregoing data into the format whereby the data can be written into the SRAM of the internal memory unit 103, namely, the SRAM write data format, and thereafter the motion vector detecting unit 104 transfers the converted data to the internal memory unit 103. And, the motion vector detecting unit 104 generates an address to array the gazed block in the SRAM, in addition to the conversion of the write data; and further, the motion vector detecting unit 104 executes the write access to the SRAM in accordance with this address, and writes the image data of the gazed block in the SRAM.

(1/4 IGC Process)

The 1/4 IGC process generates the reduced image (1/4 screen, 8 pixels×8 lines) by the 4 pixel average from the image data (16 pixels×16 lines) of the gazed block GB of the present screen that are stored in the SRAM through the foregoing CDLC process, on the basis of the principle explained referring to FIG. 16(A), and stores the reduced image in the SRAM.

Figure 17:
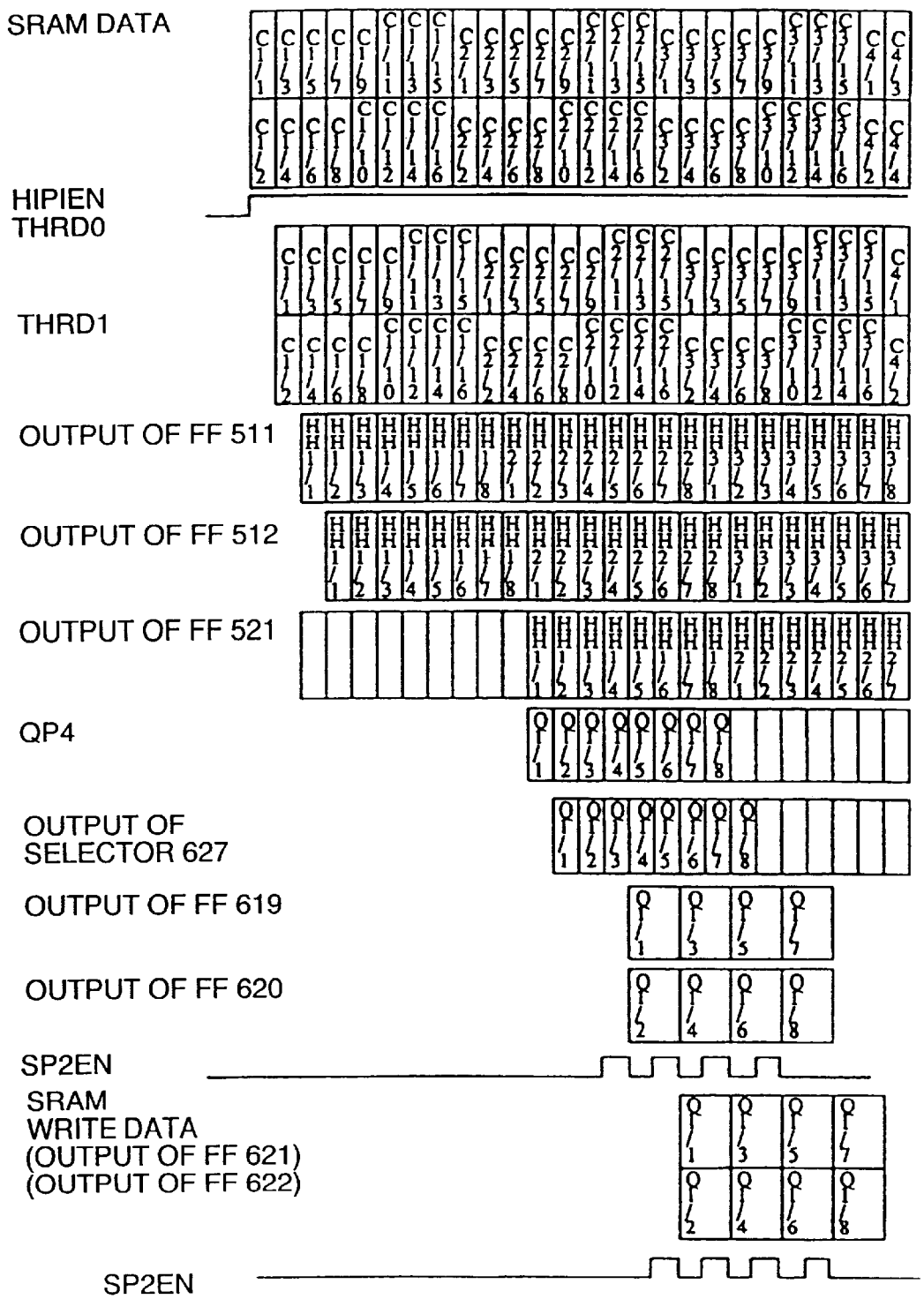
FIG. 17 is a time chart of the reduced image generating process of a gazed block.

How the reduced image is generated in the circuits as shown in FIG. 4~FIG. 6 will now be described. FIG. 17 is a time chart to explain the 1/4 IGC process.

The image data of the gazed block are inputted from the SRAM to the switch 401 of the data distribution unit 301 in FIG. 4 as the SRAM data, by the unit of 16 pixels in the order from the first line through the 16-th line. The data are outputted to the subsequent stages through the switch (SW)

401 as the signal MEMTH0 and the signal MEMTH1. And, the data are outputted through the flip-flops 402, 403 as the signal THRD0, THRD1. Here, C1/1~C1/16, etc., in FIG. 17 denote the first pixel~the 16-th pixel of the first line.

The signal THRD0 is inputted to the selector 501 of the image processing unit 302 in FIG. 5, and the signal THRD1 is inputted to the selector 502 of the image processing unit 302. The selectors 501, 502 select the signals THRD0, THRD1, respectively. These signals are added by the adder 506. Thereby, the pixel values of the horizontal two pixels are added. That is, the second means 302b is used to calculate the horizontal two pixel average in this 1/4 IGC process. During this addition, 1 is added simultaneously in order to round off.

In FIG. 17, the pixel values of the horizontal two pixels are indicated by HH1/1, etc., for the first line, and by the HH2/1, etc., for the second line.

Next, the added value of the horizontal two pixels is delayed through the flip-flop 511, selector 504, flip-flops 513~520, selector 505, and flip-flop 521. Here, this delay time is specified as a time within which the added value of the horizontal two pixels can be inputted to the adder 508 from the selector 503, when the added value of the horizontal two pixels of the next line is outputted from the flip-flop 512. That is, in FIG. 17, the delay time is specified as a time within which the timing can be adjusted so that, when the output of the flip-flop 512 becomes HH2/1, the output of the flip-flop 521 becomes HH1/1.

Accordingly, the added value of the horizontal two pixels of the first line and the added value of the horizontal two pixels of the second line are added at the adder 508. In consequence, four pixel data are added. The output of this adder is connected to the circuits of the subsequent stages in the state that the data are shifted right for two bits. Thereby, this added value can be divided by 4, and the signal QP4 of the 4 pixel average, namely, the reduced image data is generated.

The signal QP4 of the 4 pixel average is inputted to the data selection unit 303 as shown in FIG. 6. Then, the signal QP4 is inputted to the flip-flop 617 through the flip-flop 626 and the selector 627. Further, the signal QP4 is packed so as to match with the data length of the SRAM by the flip-flop 618 and the selectors 607, 608. In this case, the two pixels of the 4 pixel average plane are packed as one write data of the SRAM. The packed data is outputted as the SRAM write data through the flip-flops 619~622 (see the SRAM write data in FIG. 17).

(DLC1 Process)

The DLC1 process reads the image data (48 pixels×46 lines in this embodiment) of the reference region of the reference screen from the frame memory being the external memory, generates the image (reduced image of 24 pixels× 23 lines in this case) of the 4 pixel average from the image data read out, and stores the reduced image in the SRAM of the internal memory unit 103.

The reduced image of the reference region can be generated in the same procedure as the reduced image of the gazed block is generated. This will be described later referring to FIG. 20, etc.

In the conventional method, the image data of the reference region is stored in the internal memory as they are (without being subjected to any process). In this invention, however, the image data of the reference region is reduced to be stored in the SRAM, and therefore, an SRAM of a less storage capacity can be used as the SRAM of the internal memory unit 103.

When the image data of the reference region is written from the frame memory into the internal memory unit 103 of the motion vector detecting device 100, it is preferable not to write the whole reference region, but to write only a part of it. And, it is preferable to make up a reference region for the current gazed block with this rewritten part and the image data remaining in the SRAM. In other words, it is preferable to make up a reference region for the current gazed block with the image data not currently rewritten and the foregoing rewritten part, of the reference region used when the motion vector of the gazed block at one block previous in time to the present gazed block is detected.

The reason is as follows. The image data of the reference region used when the motion vector is detected at one block previous in time to the present gazed block has the overlapping part with the image data of the reference region for the present gazed block. Therefore, a part of the image data of the reference region used when the motion vector is detected at one block previous in time to the present gazed block can be used as a part of the image data of the reference region for the present gazed block. To arrange as above will reduce the process for transferring the image data of the reference region from the frame memory to the internal memory; and therefore. the processing speed of the motion vector detecting device can be increased.

What percentage of the image data of the reference region stored in the external memory should be read into the internal memory can be determined arbitrarily depending on the design.

It may be arranged to access a region of 48 pixels×46 lines of the frame memory and reduce the image data thereby obtained into 24 pixels×23 lines and store it in the SRAM. However in this embodiment, only 16 pixels×46 lines are accessed to the frame memory, and as to the image data of remaining 32 pixels×46 lines, a part of the image data is utilized which has been stored in the SRAM to detect the motion vector of the gazed block directly before. That is, only ⅓ of the data stored in the SRAM is rewritten, and the rest is loaded with the data until that time. Concretely, the image data storage region for the reference region is divided into three to be used as follows.

As already described with reference to FIG. 71, the SRAM is divided into the blocks of E0~E19. In this embodiment, the image data storage region for the reference region is allocated to the blocks of E5~E13 of the E0~E19. These regions E5~E13 store the image data of 24 pixels×23 lines. However in this case, the blocks of the E5~E13 are divided into three blocks, that is, the block 0 of E5~E7, the block 1 of E8~E10, and the block 2 of E11~E13.

Figure 18:
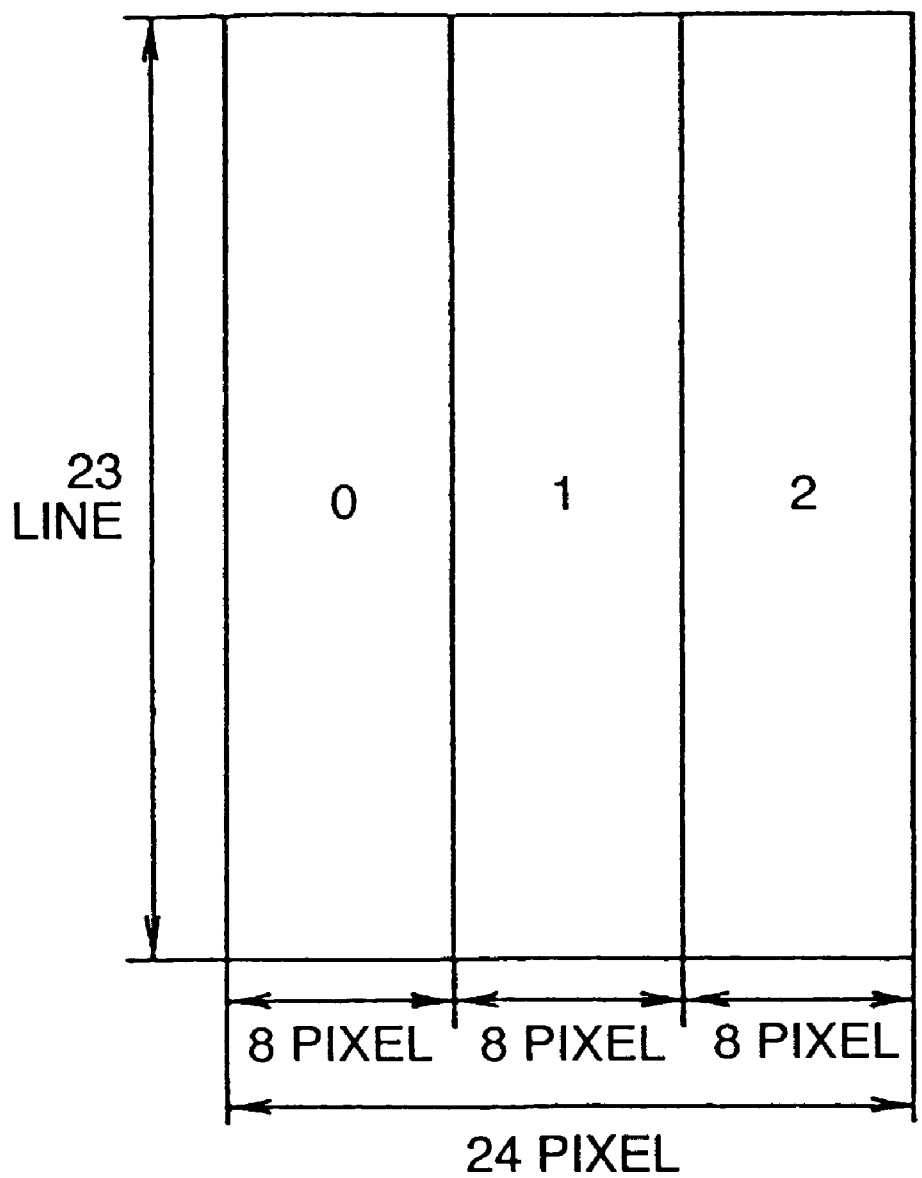
FIG. 18 is a chart to explain a division of the reference screen storage region in an SRAM.

FIG. 18 is a chart to schematically illustrate this state. Using the three blocks 0~2, the image data for the reference region is prepared as follows. This will be explained in detail with reference to FIG. 19.

First, to detect the motion vector of a first gazed block of the present screen, the SRAM is loaded with reduced data being the image data of the reference region for the first gazed block. The image data consists of 24 pixels by 23 lines. And, as shown in the chart for explaining the process of the first gazed block GB1 in FIG. 19, the 8 pixels×23 lines on the left is stored in the block 0 of the SRAM, the 8 pixels×23 lines in the center is stored in the block 1 of the SRAM, and the 8 pixels×23 lines on the right is stored in the block 2 of the SRAM. The image data thus stored are used as the reference region for the first gazed block, and the motion vector of the first gazed block is detected.

Figure 19:
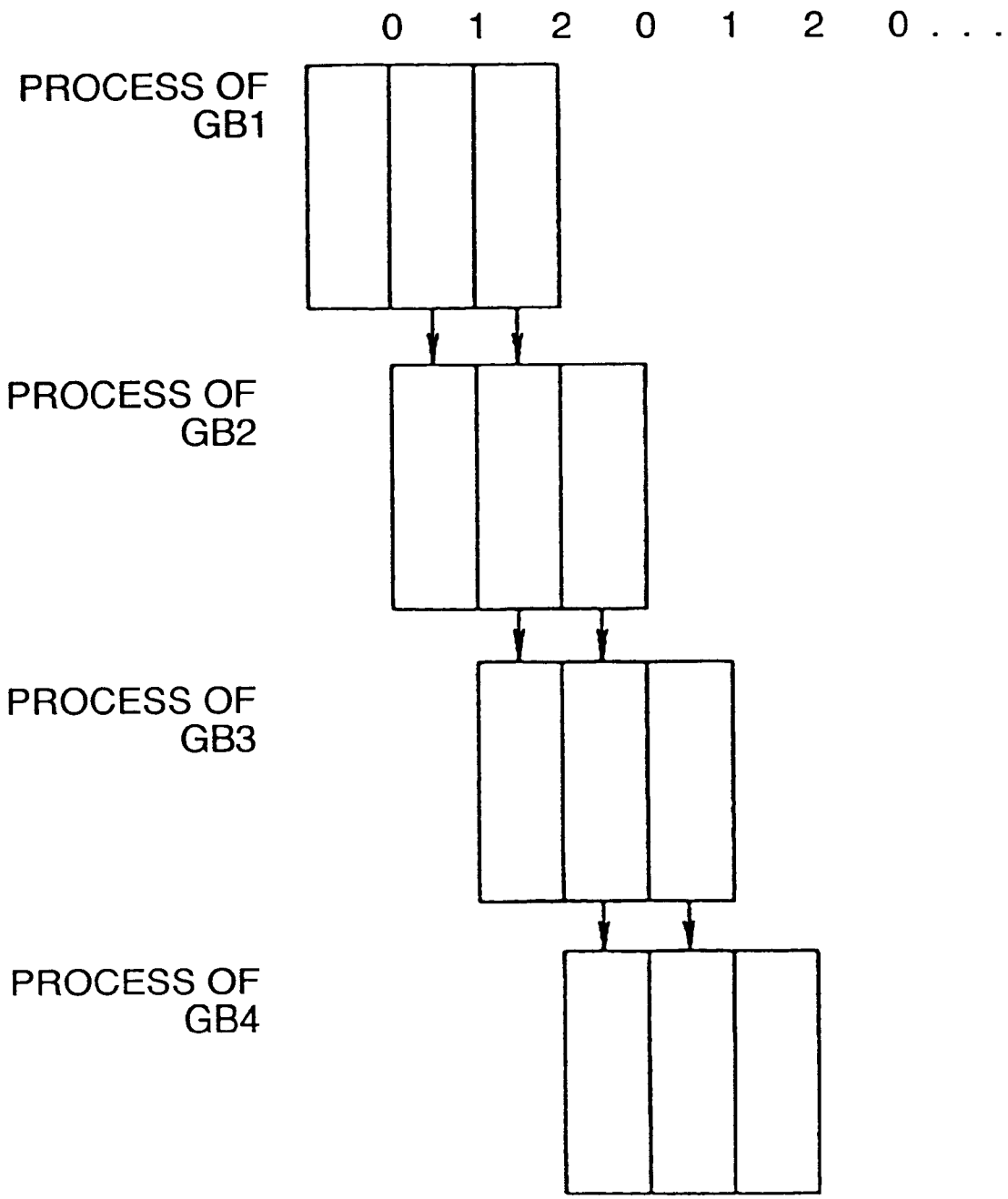
FIG. 19 is a chart to explain the usage of the reference screen storage region in the SRAM.

Next, when the operation to detect the motion vector is shifted from the first gazed block of the present screen to the adjoining block by one pixel (a second gazed block GB2), as shown in the chart for explaining the process of the second gazed block GB2 in FIG. 19, the image data stored in the blocks 1, 2 of the SRAM are used as the left and center data of the reference region of the second gazed block, and the necessary data to generate the 8 pixels×23 lines on the right are read from the frame memory into the motion vector detecting unit. And, the reduced image is generated to be stored in the block 0 of the SRAM. However, while the motion vector of the GB2 is detected, when the reference region is read out from the SRAM, the data are read out in the order of the block 1, the block 2, and the block 0. In the same manner hereafter, while the motion vectors of the third gazed block GB3, the fourth gazed block GB4, . . . , are detected, the reference regions are made up in the SRAM.

How the process to make up the reference region for the current gazed block by utilizing a part of the reference region for the previous gazed block, which is performed by the reference region preparation unit in this invention, is achieved through the circuits in FIG. 1~FIG. 6 will now be described, referring to the time chart shown in FIG. 20.

Figure 20:
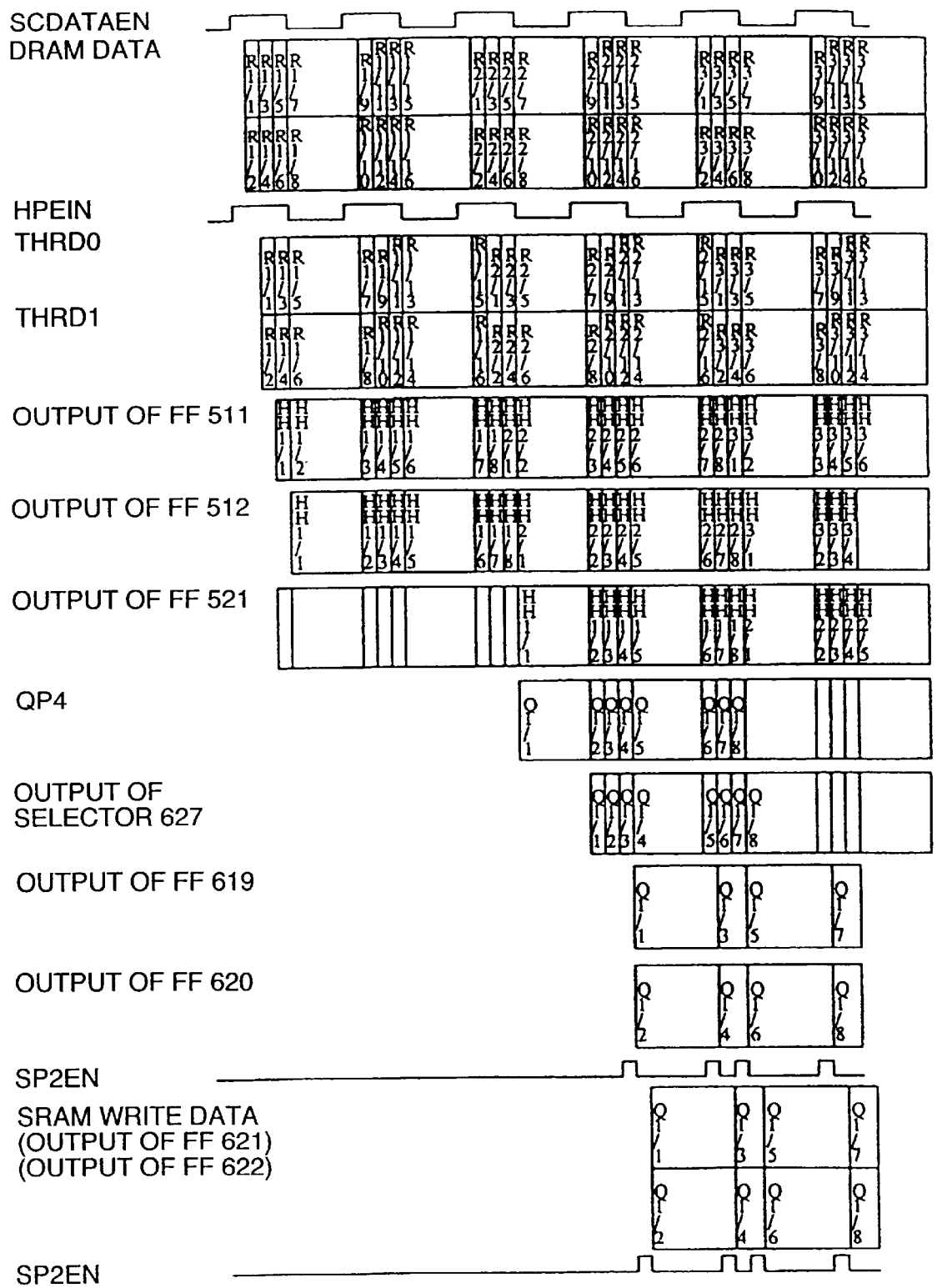
FIG. 20 is a time chart of the reduced image generating process in a reference region.

The motion vector detecting unit 104 reads the data from the first line to the 46-th line by the unit of the horizontal 16 pixels from the image data storage region for the reference region of the frame memory (see the column for the DRAM in FIG. 20, however, FIG. 20 illustrates the data only up to the third line). That is, although the 48 pixels×46 lines are originally read, the image data of the 16 pixels×46 lines only are read which are necessary for rewriting only ⅓ of the reduced image of the reference region.

The data read out are inputted to the data distribution unit in FIG. 4 as the DRAM data. The data are outputted through the switch 401 to the flip-flop 402 or 403 as the signal MEMTH0 or MEMTH1, respectively. The flip-flops 402, 403 function as delay elements for one clock, by bringing the signal HPIEN to 1 when the data from the frame memory is valid. On the other hand, the flip-flops 402, 403 hold the valid data, by reducing the signal HPIEN to 0 when the data from the frame memory is invalid. Thereby, the flip-flops 402, 403 output only the valid data as the signal THRD0 and THRD1.

In the image processing unit 302 as shown in FIG. 5, the selectors 501 and 502 select the foregoing signals THRD0 and the signal THRD1. And, both of the signals are added by the adder 506. Thereby, the data of the horizontal two pixels are added. At that moment, 1 is added simultaneously to round off the data.

Next, the added value of the horizontal two pixels is delayed through the flip-flop 511, seletor 504, flip-flops 513 520, selector 505, and flip-flop 521. Here, the foregoing added value of the horizontal two pixels is delayed in such a manner that it can be inputted to the adder 508 in synchronization with the timing that the added value of the horizontal two pixels of the next line is outputted from the flip-flop 512. That is, in FIG. 20, the timing is adjusted such th at the output of the flip-flop 521 becomes HH1/1, when the output of the flip-flop 512 becomes HH2/1.

Accordingly, the added value of the horizontal two pixels of the first line and the added value of the horizontal two pixels of the second line are added at the adder 508. The output of this adder is shifted right for two bits (is divided by 4), and thereby the 4 pixel average, namely, the reduced image data is generated, in which the image data of the reference region is reduced. The 4 pixel average is outputted as the signal QP4.

The signal QP4 of the 4 pixel average is inputted to the data selection unit 303 as shown in FIG. 6. Then, the signal QP4 is inputted to the flip-flop 617 through the flip-flop 626 and the selector 627. Further, the signal QP4 is packed so as to match with the data length of the SRAM by the flip-flop 618 and the selectors 607, 608. In this case, the two pixels of the 4 pixel average plane are packed as one write data of the SRAM. The packed data is outputted as the SRAM write data through the flip-flops 619~622 (see the SRAM write data in FIG. 20).

The ⅓ of the reduced image of the reference region stored in the SRAM is rewritten by this SRAM write data.

(S1VDC process)

The S1VDC process executes the vector evaluation operation by each gazed block, using the foregoing 4 pixel average (reduced image). Concretely, as to the reduced image of the gazed block, the process executes the calculation of the sums (SADq) of the differential absolute values to the 256 vectors of the reference region, and the calculation of the minimum value (SADqmin) of the SADq of the 256 vectors.

The calculation of the SADq calculates the SADq of each of the even vectors within −16~+14 of both the horizontal and vertical pixel data, by means of the 4 pixel average plane (8 pixels×8 lines) of the gazed block of the present screen stored in the SRAM by the CDLC process and the 1/4 IGC process, and the 4 pixel average plane (24 pixels×23 lines) of the reference screen stored in the SRAM by the DLC1 process.

Figure 21:
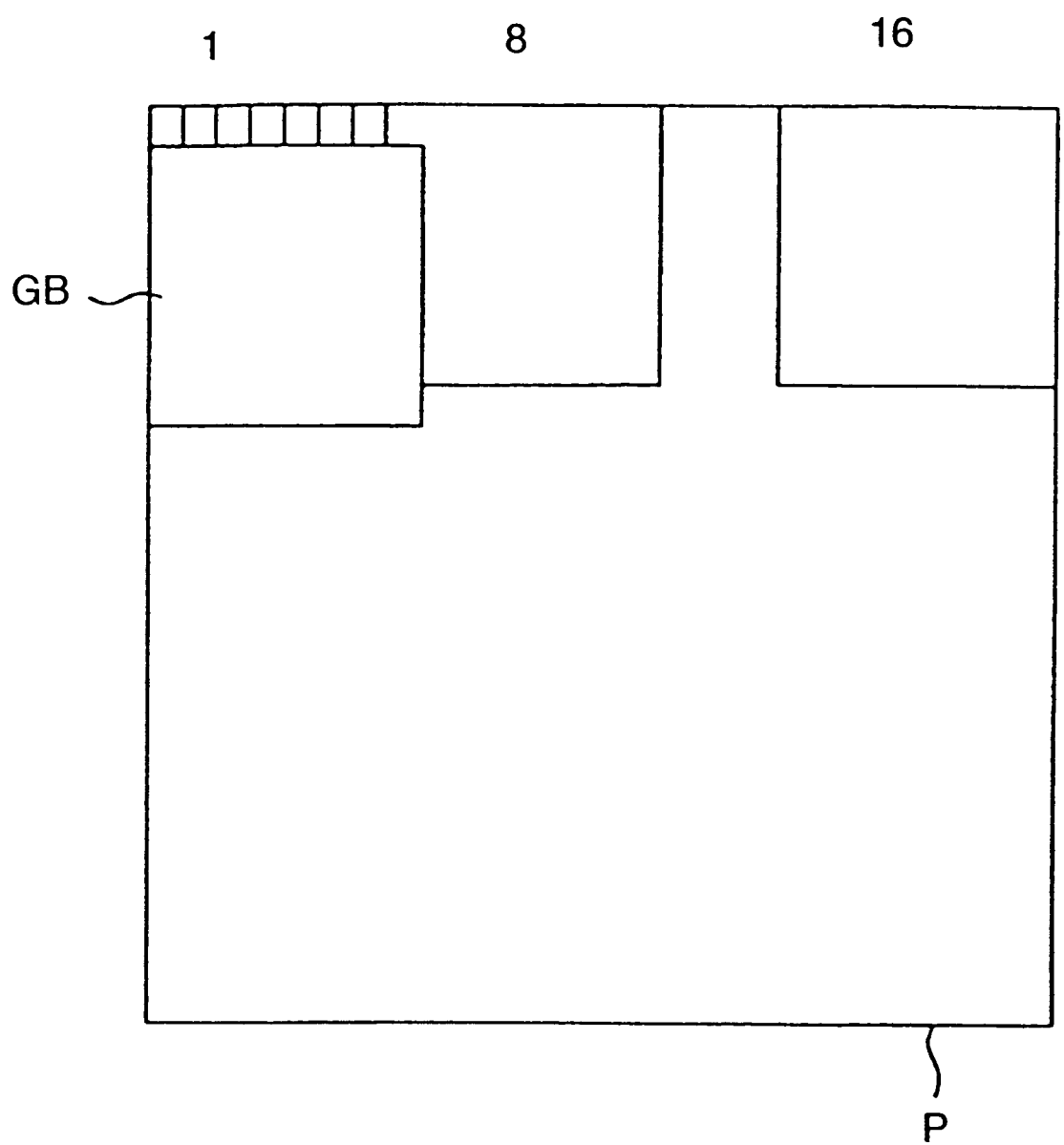
FIG. 21 is a chart to explain a vector calculation direction.

Concretely, the SADq is calculated horizontally sequentially from the left upper end (vector (−16, −16)) of the reference region, and after the SADq is calculated for 16 vectors, the calculation of the SADq is transferred to the next row. This state is shown in FIG. 21. FIG. 21 illustrates a gazed block GB that is reduced to the scale of 8 pixels×8 lines, a reference region P that is reduced to the scale of 24 pixels×23 lines, and a part of the blocks 1~8, 16 that are used for calculating each SADq of the reference region P.

The SADq is calculated horizontally (in the lateral direction in FIG. 21), starting from the left upper end (vector (−16, −16)) of the reference region P, and after the SADq is calculated for 16 vectors, the calculation of the SADq is transferred to the next row.

Figure 22:
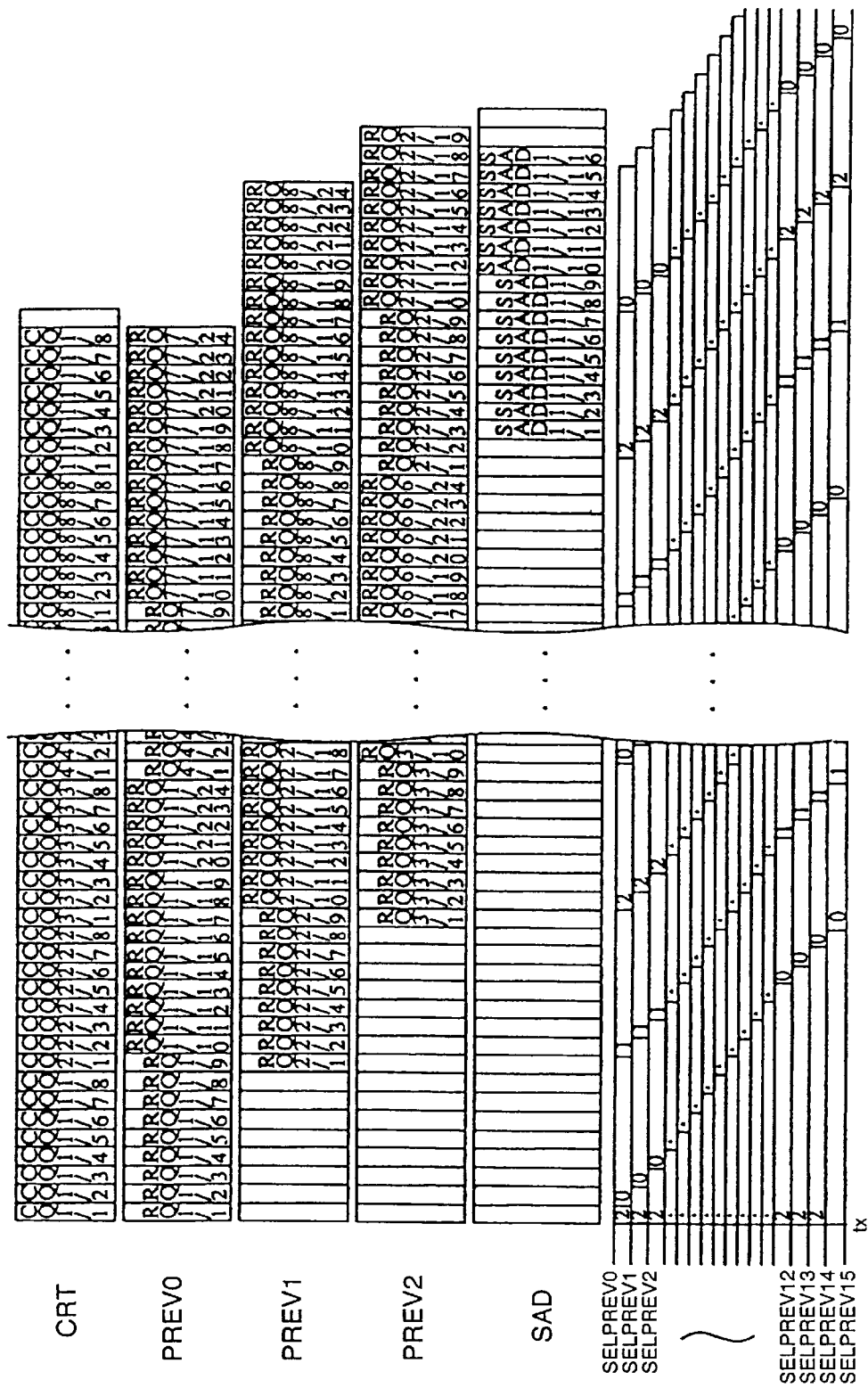
FIG. 22 is a time chart to explain the S1VDC process.
Figure 23:
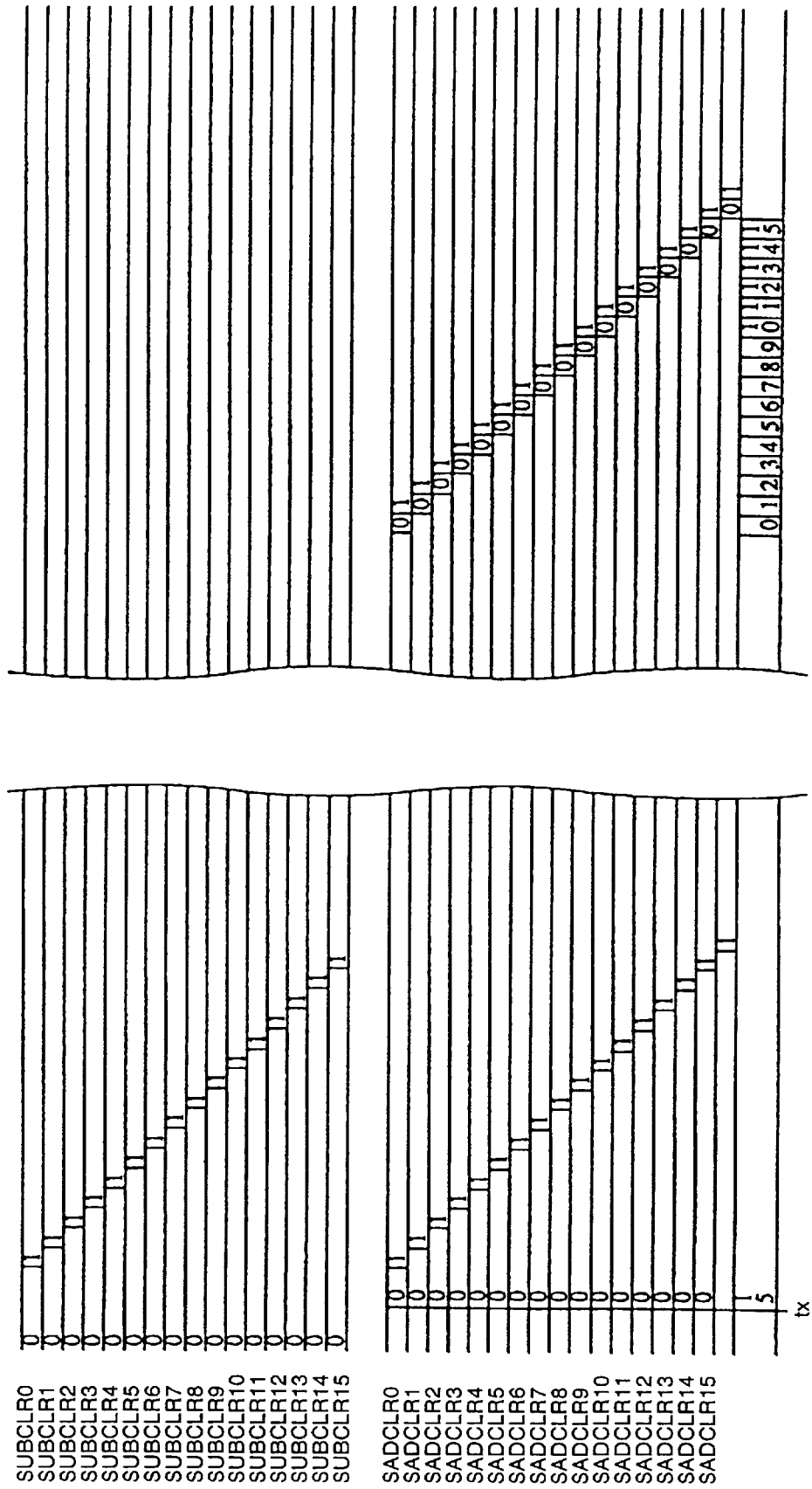
FIG. 23 is a time chart paired with the time chart to explain the S1VDC process in FIG. 22.
Figure 24:
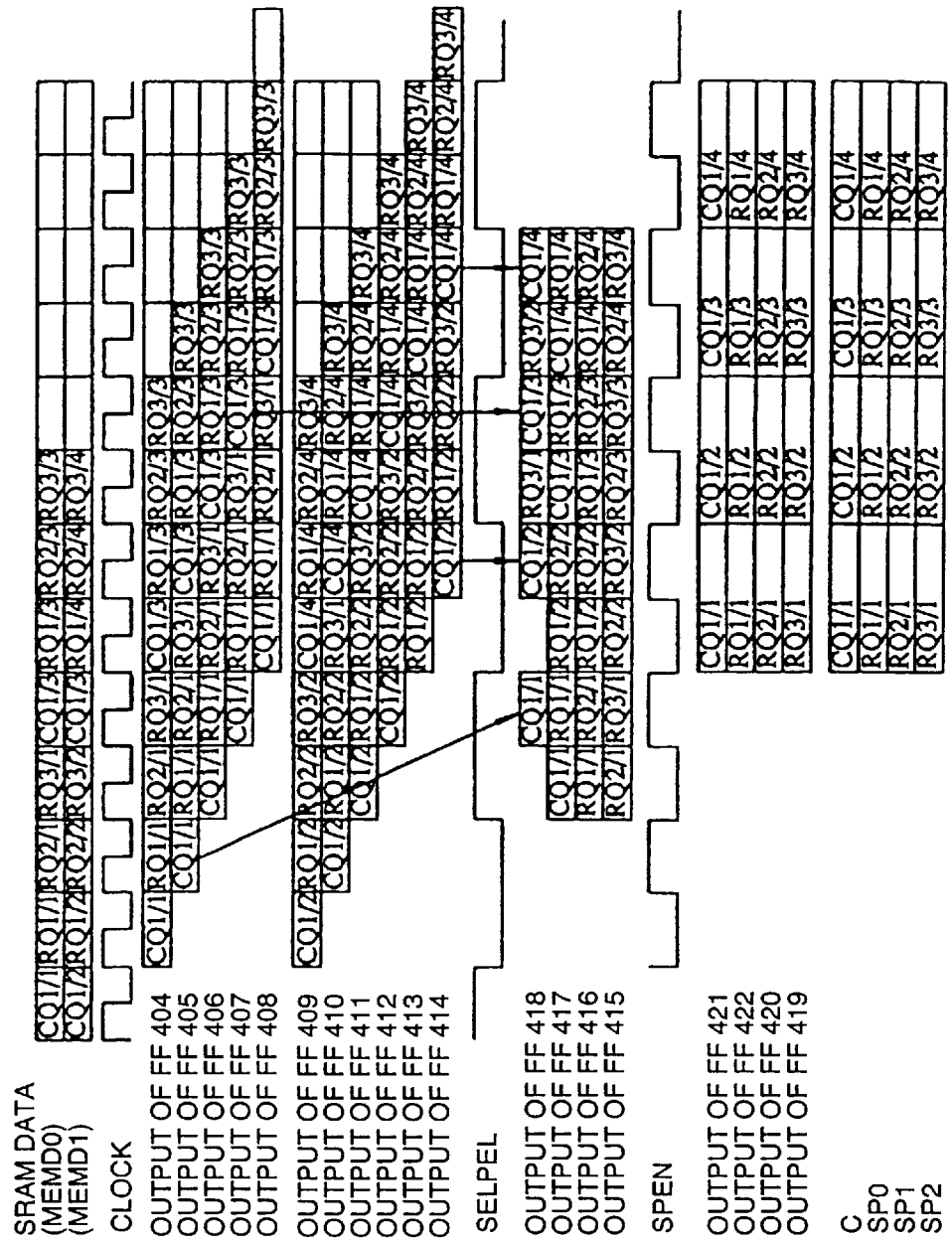
FIG. 24 is a chart to explain an operation example of the data distribution unit 301.

How the SADq is practically calculated in the circuits as shown in FIG. 1, FIG. 4~FIG. 6 will now be described with reference to the time charts as shown in FIG. 22, FIG. 23, and FIG. 24. Here, FIG. 22 and FIG. 23 originally form one time chart. However, that is divided into two sheets because of the size of the drawing. To restore FIG. 22 and FIG. 23 to the original drawing of one sheet requires longitudinally arranging both the drawings so as to synchronize the time base with tx.

The motion vector detecting unit 104 generates the addresses for accessing or reading the 4 pixel average plane (reduced image) of the gazed block stored in the SRAM by the 1/4 IGC process and the 4 pixel average plane (reduced image) of the reference region stored in the SRAM by the DLC1 process from the SRAM. And on the basis of the addresses, the motion vector detecting unit 104 executes the read access to the SRAM to read these data from the SRAM.

When the motion vector detecting unit 104 reads the data from the SRAM, as shown in the time, chart in FIG. 22, the memory data receiving unit of the motion vector detecting unit 104 reads the data outputted as the signal CRT, the data outputted as the signal PREV0, the data outputted as the signal PREV1, and the data outputted as the signal PREV2, in this order.

The data read in this manner are inputted to the data distribution unit 301 as the data of the SRAM. The distribution of the data in the data distribution unit 301 is executed as shown in the time chart in FIG. 24. The simple explanation will be as follows. Here, the CQY/X (namely CQ1/1, CQ1/3, . . . , etc.) in FIG. 24 illustrates the image data of the gazed block, and the RQY/X (namely, RQ1/1, . . . , etc.) illustrates the image data of the reference region.

The SRAM data inputted to the data distribution unit 301 are outputted to the flip-flops 404~414 on the subsequent stages as the signal MEMD0 and the signal MEMD1 by the switch 401 of the data distribution unit 301. These data are outputted through the selectors 415~418 and the flip-flops 419~421 to the circuits of the subsequent stages as the signal C as to the data of the gazed block, as the signal SP0 as to the data of the first line of the reference region, as the signal SP1 as to the data of the second line of the reference region, and as the signal SP2 as to the data of the third line of the reference region.

The signal C is inputted to the selector 601 of the data selector 303. as shown in FIG. 6, the signal SP0 is inputted to the selector 602, the signal SP1 is inputted to the selector 604, and the signal SP2 is inputted to the selector 606.

After these signals C, SP0, SP1, and SP2 are selected by the corresponding selectors 601, 602, 604, and 606, these signals are outputted as the signal CRT, the signal PREV0, the signal PREV1, and the signal PREV2 to the differential absolute value summing calculation unit 202 (see FIG. 6, FIG. 22).

And, the differential absolute value summing calculation unit 202 shown in FIG. 7 controls the signal SELPREVs 0~15 as shown in FIG. 22. Then, the selectors 751~766 input the reference screens necessary for calculating the vector values to the one input terminals of the processor elements (PEs) 0~15. And, the data of the gazed block are inputted to each of the other input terminals of the processor elements (PEs) 0~15 as the signal CRT. Thereby, the sums SADq of the differential absolute values between the pixel data of the reduced image each are calculated by the PEs. In practice, the sums of the differential absolute values with the time difference of one clock each are outputted in sequence from the PE0~PE15. The sums of the differential absolute values outputted sequentially in this manner are selected by the signal SELSAD sequentially. Thus, the sums of the differential absolute values of 256 vectors are calculated in regard to the gazed block.

FIG. 25 is a time chart to illustrate the operation to calculate the SADq in the PE0 of the PE0~PE16. In FIG. 25, C1/1~C8/8 represent the image data of the reduced gazed block. P1/1~P8/8 represent the image data of one block of the reduced reference region. SUB1/1, etc., signify |C1/1-P1/1|, etc. ADD1/1, etc., signify the sum of SUB1/1~SUB 1/8, etc. SAD1/1 signifies the sum of the differential absolute value between the pixel data of the gazed block and the pixel data of the block having the vector value (−16, −16) of the reference region.

Further, in addition to the foregoing calculation operation of the sums of the differential absolute values of 256 kinds, the motion vector detecting device 100 determines the minimum value of the sums of the differential absolute values, and at the same time holds in the register the vector value to give the minimum value and the minimum value of the sums of the differential absolute values at that time. The procedure to compare the magnitudes of the sums of the differential absolute values is as follows.

The register 1102 as shown in FIG. 13 contains a work register (flip-flop 1313 in this example) which is used as the comparison source to the sum SADq of the differential absolute values outputted from the differential absolute value summing calculation unit 202. The work register assumes the maximum value (namely, 1 for all the bits) by bringing the signal SADMCR to 1 at the start of the S1DVC process. Further, during the S1VDC process, the signal SELSAD is set so that the selector 1309 can select the output from the work register. That is, the output from the work register is arranged to be selected as the signal SADMINI.

And, in the comparison unit 1101 as shown in FIG. 12, the foregoing SADq inputted as the signal SAD and the value of the work register inputted as the signal SADMINI are compared by the comparator 1208.

In this comparison, if the value of the SADq is smaller than that of the work register, the comparator 1208 brings the signal COMP to 1. Further, the AND circuit 1211 makes the logical sum of the signal HOLDENA to indicate that the vector value is within the effective range and the output from the comparator 1208. And, if the vector value is within the effective range and the value of the SADq is smaller than that of the work register. the AND circuit 1211 brings the signal HOLDEN to 1.

If the signal HOLDEN is brought to 1, the value of the SADq used in this comparison is held in the work register. At the same time, the motion vector detecting unit holds the vector value used in this comparison.

When the SADq corresponding to the zero vector (motion vector=(0, 0)) is outputted from the differential absolute value summing calculation unit 202. the selector 1205 of the comparison unit 1101 in FIG. 12 selects the content (zero vector subtraction parameter for the S1VDC process) of the latch 1201 on the basis of the signal SELPARA. Accordingly, the adder 1207 executes the subtraction of the SADq and the parameter. Next, the comparator 1208 compares this subtraction result with the signal SADMINI from the work register. And, the register 1102 multiplies the sum SADq of the differential absolute values corresponding to the zero vector by 4, and holds the result in the latch 1310. Here, the reason that the SADq is multiplied by 4 is to convert the SADq into the sum of the differential absolute values in the image not reduced.

When the comparisons as to the sums of the differential absolute values of 256 vectors are completed according to the foregoing procedure, the register unit 1102 holds the content of the flip-flop 1313 in the latch 1321. Thus, the SLVDC process is finished.

(DLC2 Process)

Figure 26:
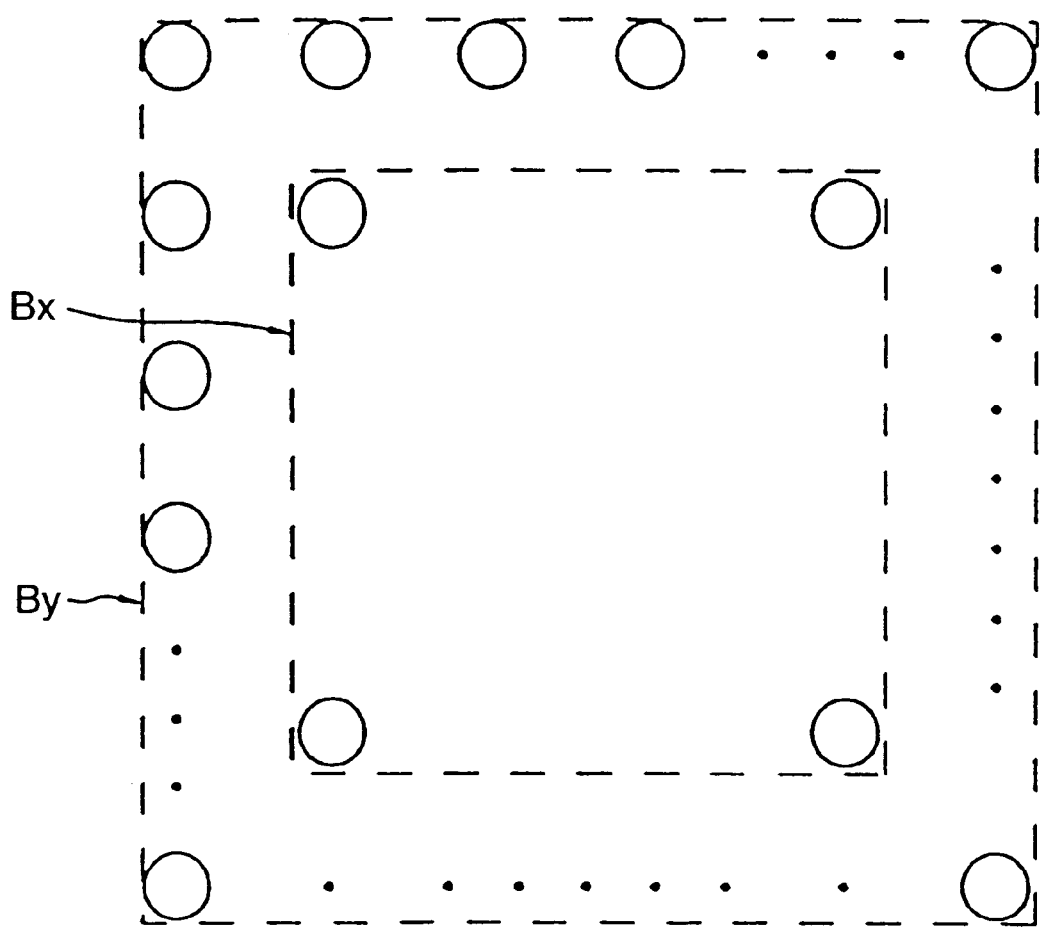
FIG. 26 is a chart to explain the vector position and the starting pixel position of the reference screen in the DLC2 process.

The DLC2 process reads the image data (18 pixels×18 lines) of the reference region of the reference screen from the external memory. The leading address of the external memory when the image data of the reference region are read is calculated by the vector calculated by the foregoing S1VDC process. That is, the leading address is determined on the basis of the block that was selected as being the most similar to the gazed block from the reference region, in the S1VDC process. FIG. 26 is a chart to explain one example of the foregoing. In the drawing, the Bx indicates a block searched by the S1VDC process, and the By indicates a reference region in the DLC2 process. As compared with the block Bx (the block not reduced (16 pixels×16 lines)) that was selected as being the most similar to the gazed block from the reference region, in the S1VDC process, in case of the DLC2 process, the region By consisting of 18 pixels×18 lines being wider by ±1 pixel is written into the SRAM. The reason that the reference region takes on 18 pixels×18 lines is to secure the pixels that the third step of the foregoing standard H.263 requires.

The data written into the SRAM in this DLC2 process is stored in the regions E14~E19 as shown in FIG. 71.

(S2VDC Process)

Figure 27A:
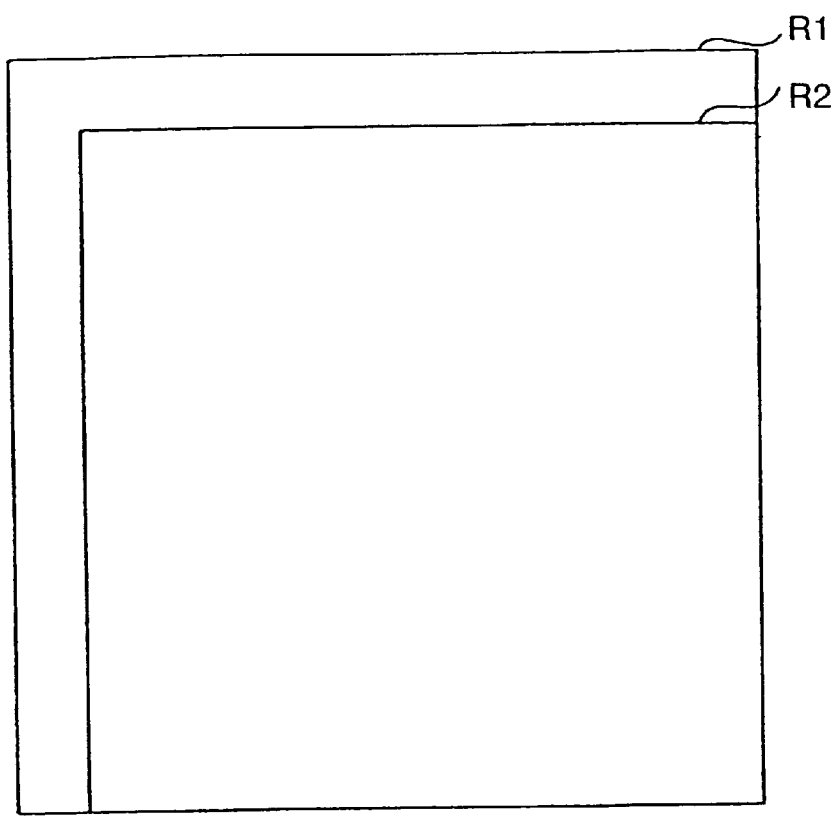
FIGS. 27(A) and 27(B) are charts to explain the S2VDC process.

The S2VDC process executes the vector evaluation operation, using the image data (16 pixels×16 lines) of the gazed block stored in the SRAM in the CDLC process, and the data of 17 pixels×17 lines out of the image data (18 pixels×18 lines) of the reference region stored in the SRAM in the DLC2 process. FIG. 27(A) is a chart to illustrate the relation between the reference region R1 stored in the SRAM in the DLC2 process and the reference region R2 used in the S2VDC process.

The S2VDC process is divided into a process to calculate the sums (SAD) of the differential absolute values between the pixel data of the gazed block and each of the pixel data of the four blocks in the reference region, and a process to calculate the minimum value (SADmin) of the sums of the differential absolute values.

Figure 27B:
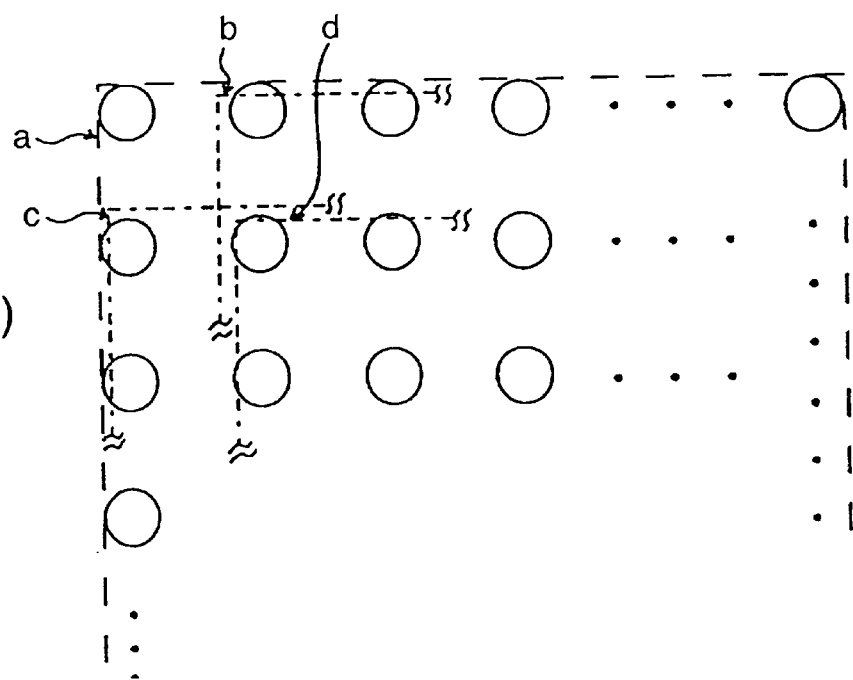

The process to calculate the SAD is carried out as follows. The sums of the differential absolute values are calculated between the image data (16 pixels×16 lines) of the gazed block stored in the SRAM by the CDLC process and each of the image data of the four blocks in the reference region stored in the SRAM by the DLC2 process. Here, the four blocks in the reference region consist of the block (in the reference region) in which the SADq in the S1VDC process becomes minimum, and the three blocks (lower, right, and obliquely right lower) surrounding the block. FIG. 27(B) is a chart to explain the four blocks. In FIG. 27(B), the block a is the block in which the SADq in the S1VDC process becomes minimum. The four blocks of the concerned block a and the three blocks b~d illustrated by the three vectors located lower, right, and obliquely right lower to the block a are the blocks to calculate the sums of the differential absolute values with the gazed block.

The sums of the differential absolute values are calculated, using the PEs of the differential absolute value summing calculation unit 202, which will be explained later. However, in the S2VDC process, only four PEs of the 16 PEs of the differential absolute value summing calculation unit 202 are used during the calculation of the sums of the differential absolute values. Accordingly, during the calculation of the sums of the differential absolute values, the average value of all the pixels of the gazed block, which is denoted MBMEAN, is calculated at the same time utilizing the vacant PE (the detail will be described later).

Figure 28:
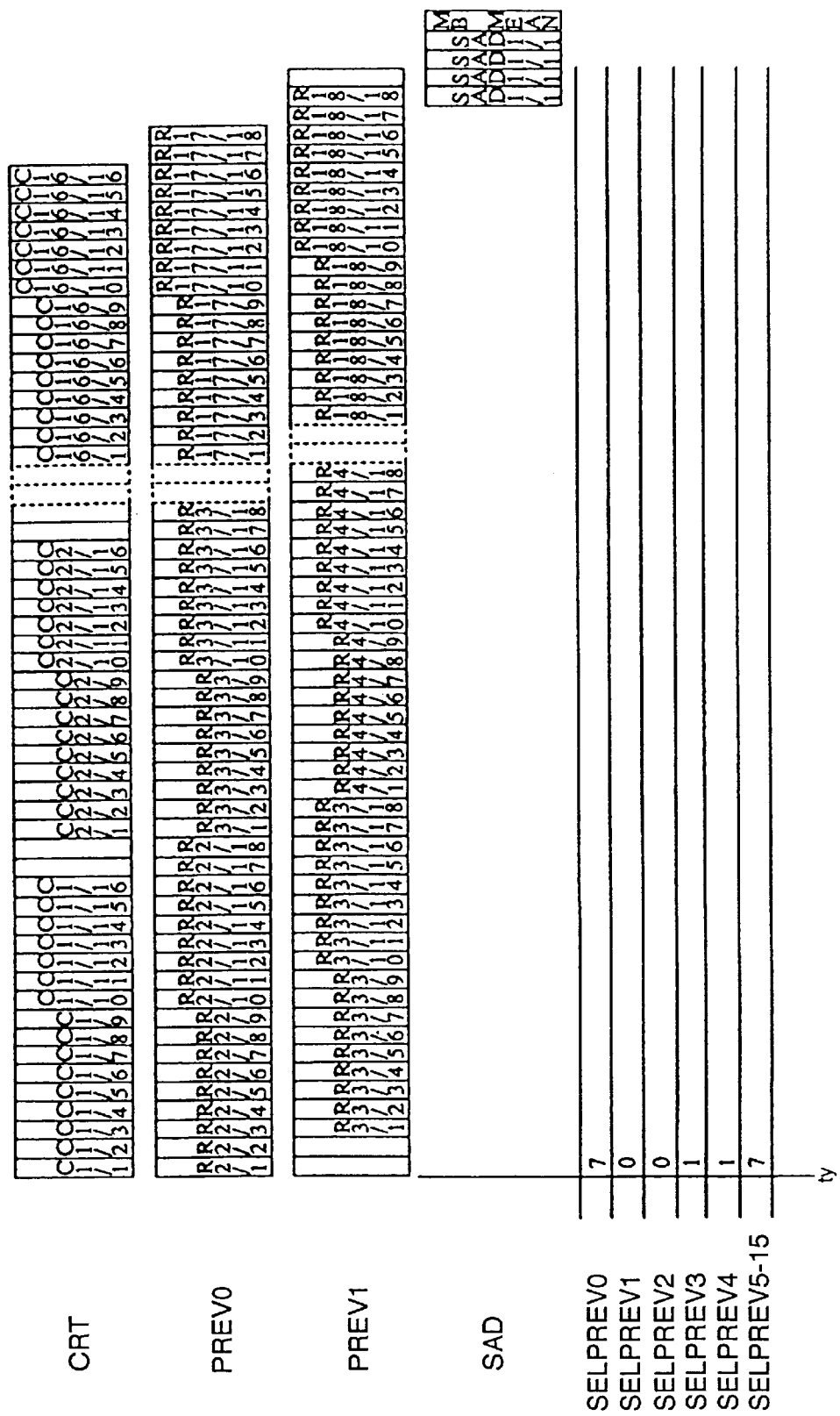
FIG. 28 is a time chart to explain the S2VDC process.
Figure 29:
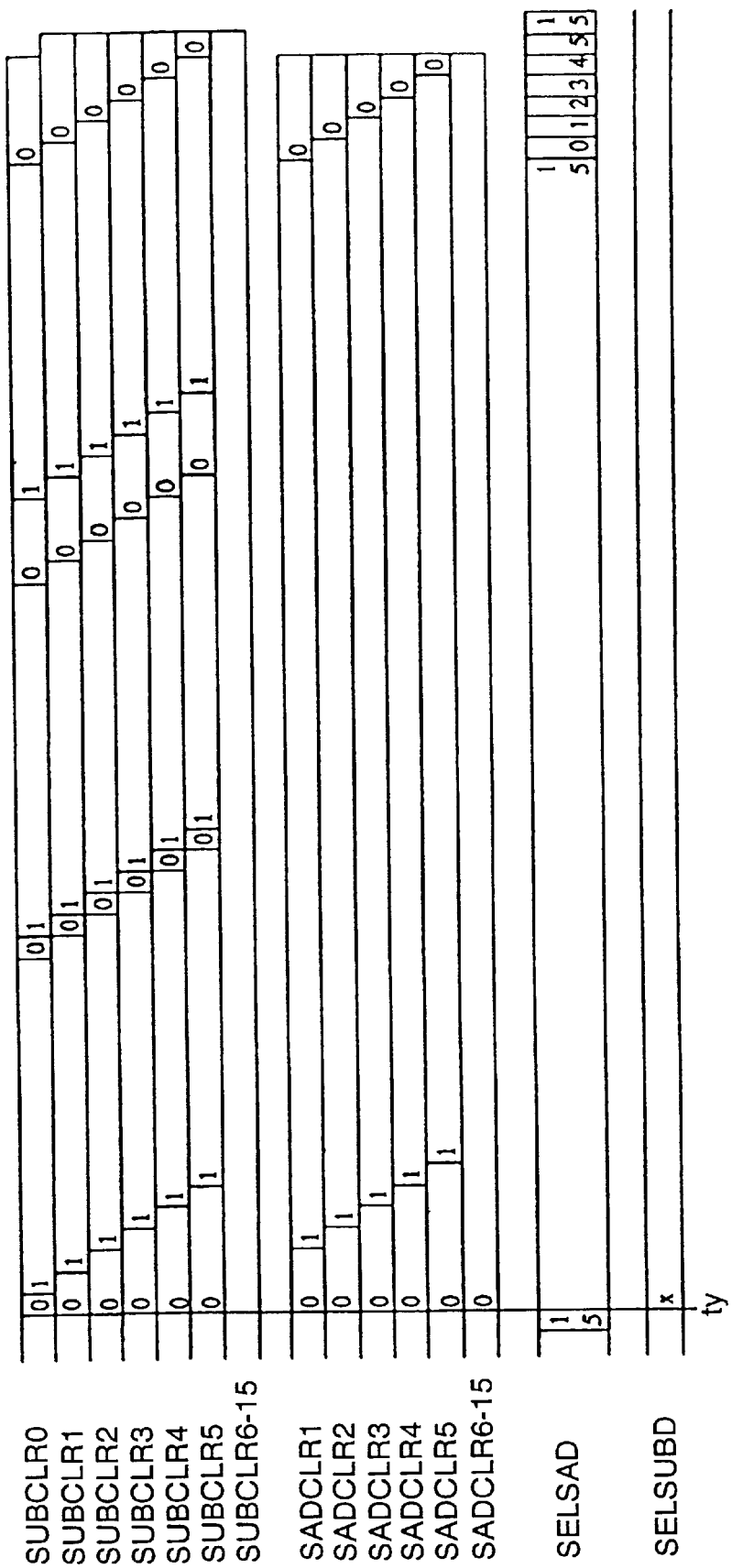
FIG. 29 is a time chart paired with the time chart to explain the S2VDC process in FIG. 28.

How the SAD and the MBMEAN are practically calculated in the circuits as shown in FIG. 1, FIG. 4~FIG. 6 will now be described with reference to the time charts as shown in FIG. 28 and FIG. 29. Here, FIG. 28 and FIG. 29 originally formed one time chart. However, that is divided into two sheets because of the size of the drawing. To restore FIG. 28 and FIG. 29 to the original drawing of one sheet requires longitudinally arranging both the drawings so as to synchronize the time base with ty.

The memory data receiving unit 201 generates the addresses for reading from the SRAM the gazed block GB of the present screen stored in the SRAM by the CDLC process and the reference region stored in the SRAM by the DLC2 process. And, the memory data receiving unit 201 executes the read access to the SRAM. And, it transfers the SRAM read data to the differential absolute value summing calculation unit 202. The differential absolute value summing calculation unit 202 calculates the sums (SAD) of the differential absolute values of the four vectors on the basis of the transferred data, which will now be detailed.

The data read from the SRAM are inputted to the data distribution unit 301 of the memory data receiving unit 201 as the SRAM read data. The SRAM read data are outputted to the circuits of the subsequent stages as the signal MEMD0 and the signal MEMD1 by the switch 401.

When the motion vector detecting unit 104 reads the data from the SRAM, as shown in the time chart in FIG. 28, the memory data receiving unit 201 of the motion vector detecting unit 104 reads the data outputted as the signal CRT, the data outputted as the signal PREV0, and the data outputted as the signal PREV1, in this order.

The data distribution unit 301 receives these input data at the flip-flops 405~414. And, after passing these data through the selectors 416~418 and the flip-flops 420~422, the data distribution unit 301 outputs to the subsequent stages the data of the gazed block as the signal C, the data of the horizontal first line of the reference region as the signal SP0, and the data of the horizontal second line of the reference region as the signal SP1.

The data selection unit 303 selects the foregoing signals C, SP0, and SP1 by the selector 601, 602, and 604, respectively. And, the data selection unit 303 outputs these signals through the flip-flops 611, 612, and 615 as the signal CRT, the signal PREV0, and the signal PREV1, respectively, to the circuits of the subsequent stages. The state that these signals are outputted is as shown in FIG. 28.

These signals CRT, PREV0, PREV1 are inputted to the differential absolute value summing calculation unit 202. Here, the control signals SELPREV1~SELPREV4 for the selectors 751~755 of the differential absolute value summing calculation unit 202 are controlled as shown in FIG. 28. Thereby, the data of the reference region are inputted to the one input terminals of the PE1~PE4 of the PEs 0~15. And, to the other input terminals of the PE1~PE4 are inputted the ‚data of the gazed block. Therefore, the sums of the differential absolute values of the four vectors are calculated.

Further, the calculation of the MBMEAN is executed utilizing the vacant PEs that the differential absolute value summing calculation unit 202 does not use during the calculation of the differential absolute values, which, for example, is executed as follows.

The reference region data inputted from the selector 756 to the PE5 are brought to 0, by setting the selector control signal SELPREV5 to a specific value. In other words, the values subtracted from the data of the gazed block are brought to 0. And, this PE5 calculates the sum of the differential absolute values. This value is that total sum of all the pixels of the gazed block. To shift this value left for 8 bits (to divide this value by 256) results in the average value MBMEAN of all the pixels of the gazed block. This value is held in the latch 1311 (MBMEAN register) of the register unit 1102 as shown in FIG. 13.

Next, the minimum value is determined among the sums of the differential absolute values of the four vectors thus calculated. And at the same time, the vector value and the sum of the differential values that give the minimum value are held in the register; and this process is carried out as follows.

The register unit 1102 as shown in FIG. 13 contains the work register (flip-flop 1313 in this example) which is used as the comparison source to the sum SAD of the differential absolute values outputted from the differential absolute value summing calculation unit 202. The work register assumes the maximum value (namely, 1 for all the bits) by bringing the signal SADMCR to 1 at the start of the S2DVC process. Further, during the S2VDC process, the signal SELSAD is set so that the selector 1309 can select the output from the work register. That is, the output from the work register is arranged to be selected as the signal SADMINI.

And, in the comparison unit 1101 as shown in FIG. 12, the signal SAD and the value of the work register inputted as the signal SADMINI are compared by the comparator 1208.

In this comparison, if the value of the SAD is smaller than that of the work register, the comparator 1208 brings the signal COMP to 1. Further, the AND circuit 1211 of the comparison unit 1101 makes the logical sum of the signal HOLDENA to indicate that the vector value is within the effective range and the output from the comparator 1208. And, if the vector value is within the effective range and the value of the SAD is smaller than that of the work register, the AND circuit 1211 brings the signal HOLDEN to 1.

If the signal HOLDEN is brought to 1, the value of the SAD used in this comparison is held in the work register. At the same time, the motion vector detecting unit holds the vector value used in this comparison.

When the SAD corresponding to the zero vector (motion vector=(0, 0)) is outputted from the differential absolute value summing calculation unit 202, the selector 1205 of the comparison unit 1101 in FIG. 12 selects the content (zero vector subtraction parameter for the S2VDC process) of the latch 1202 on the basis of the signal SELPARA. Accordingly, the adder 1207 executes the subtraction of the SAD and this parameter. Next, the comparator 1208 compares this subtraction result with the signal SADMINI from the work register. And, the register 1102 holds the sum SAD of the differential absolute values corresponding to the zero vector in the latch 1310.

When the comparisons as to the sums of the differential absolute values of the four vectors are completed according to the foregoing procedure, the register unit 1102 holds the content of the flip-flop 1313 in the latch 1321. Thus, the S2VDC is finished.

(S3VDC Process)

The S3VDC process executes the vector evaluation operation, using the image data (16 pixels×16 lines) of the gazed block GB of the present screen, and the image data of 18 pixels×17 lines out of the of the reference region data (18 pixels×18 lines) stored in the SRAM in the CDLC process and the DLC2 process. The region to be used in the reference region is different depending on the result in the S2VDC process. This is explained in FIG. 30(A) and FIG. 30(B).

Figure 30A:
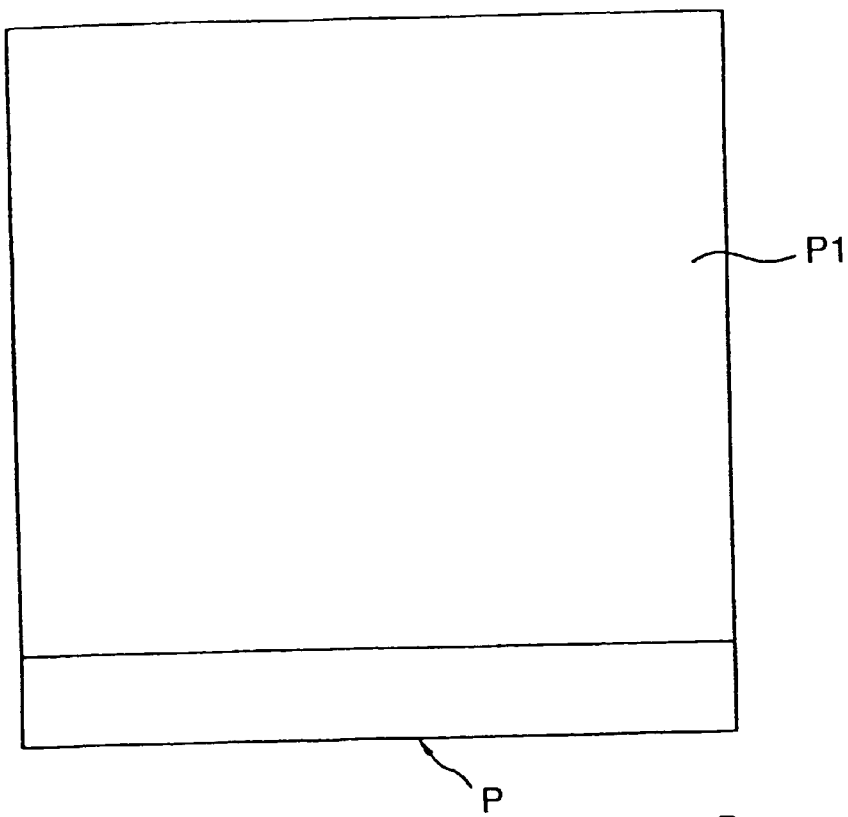
FIGS. 30(A) and 30(B) are charts to explain the use region of the reference screen in the S3VDC process.
Figure 30B:
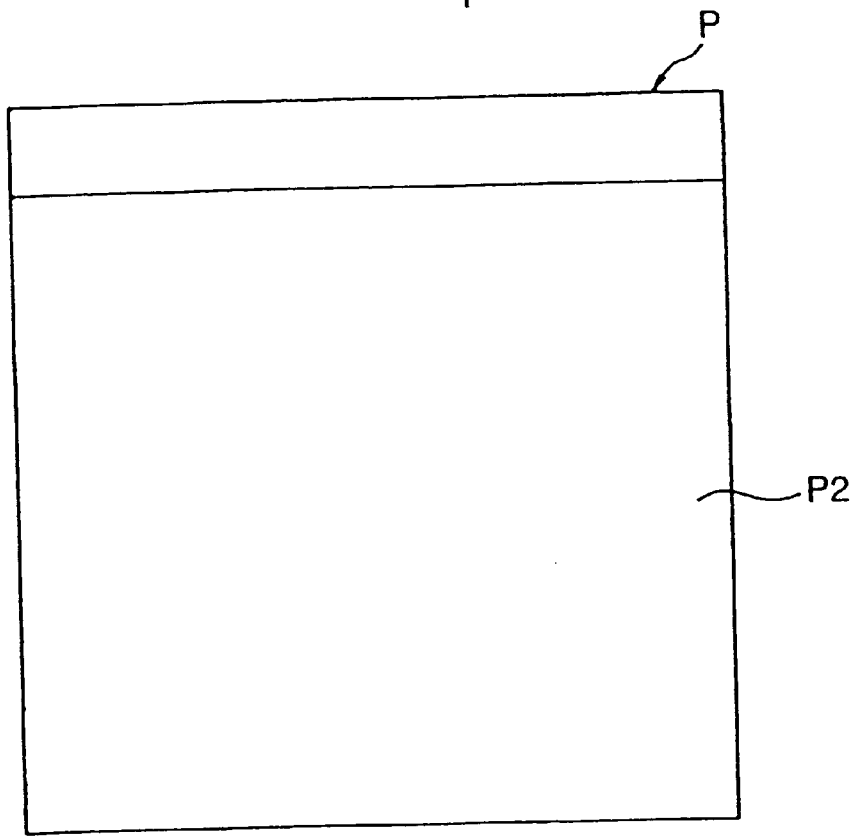

If the most similar block to the gazed block in the S2VDC process results in one of the upper blocks (block a or block b in FIG. 27(A)) of the four blocks (blocks a d as shown in FIG. 27(A)) in the reference region, as shown in FIG. 30(A), the region P1 from the first to the 18-th line in the reference region P is used for the S3VDC process. And, if the most similar block to the gazed block in the S2VDC process results in one of the lower blocks (block c or block d in FIG. 27(A)) of the four blocks (blocks a~d as shown in FIG. 27(A)) in the reference region, as shown in FIG. 30(B), the region P2 from the first to the 17-th line in the reference region P is used for the S3VDC process.

The S3VDC process is classified roughly into the calculation of the sums (SAD) of the differential absolute values of 8 vectors maximum, the determination operation of the minimum value (SADmin) of the calculated SAD, and the determination operation of the inter-frame predictive coding. And, the calculation of the SAD is executed between the gazed block and each of the 8 blocks maximum in the reference region of the half pixel accuracy. The processes will now be discussed in detail.

The number of the blocks of the half pixel accuracy in the reference region that are used for the calculation of the SAD is determined, depending on that the block in the reference region most similar to the gazed block in the S2VDC process results in which one of the blocks a~d in FIG. 27(B), which will be explained with reference to FIG. 31(A)~FIG. 31(D).

In FIG. 31(A)~FIG. 31(D), the blank circles indicate the pixels of the original reference screen, which are also referred to as the "pixels of integral unit". And, the circles with slant lines indicate either (1): the pixels of the half pixel accuracy given by the average value of the horizontally adjoining two pixels of integral unit, (2): the pixels of the half pixel accuracy given by the average value of the vertically adjoining two pixels of integral unit, or (3): the pixels of the half pixel accuracy given by the average value of the horizontally, vertically adjoining four pixels of integral unit.

As shown in FIG. 31(A)~FIG. 31(D), depending on which block of the blocks a~d was the block determined by the S2VDC process, the number of the blocks of the half pixel accuracy becomes 8, 5, 5, 3. Here, the a~d in FIG. 31(A)~FIG. 31(D) have the same meanings as the a~d in FIG. 27(B).

The sums of the differential absolute values are calculated between these reference regions of the half pixel accuracy and the gazed block. This will be explained with reference to FIG. 3~FIG. 7, and FIG. 32~FIG. 35. FIG. 32~FIG. 35 are the time charts to explain the S3VDC process. Here, FIG. 32~FIG. 35 together form one time chart, which has been divided into four sheets because of the size of the drawing. To restore FIG. 32~FIG. 35 to the original drawing of one sheet requires longitudinally arranging FIG. 32 and FIG. 33 so as to synchronize the time base with tz, to connect FIG. 34 to FIG. 32 at time tz+n, and to connect FIG. 35 to FIG. 33 at time tz+n.

The motion vector detecting unit 104 generates the addresses for reading from the SRAM the gazed block of the present screen stored in the SRAM by the CDLC process and the reference region stored in the SRAM by the DLC2 process. And, the motion vector detecting unit 104 executes the read access to the SRAM. And, the SRAM read data are inputted to the data distribution unit 301.

Figure 32:
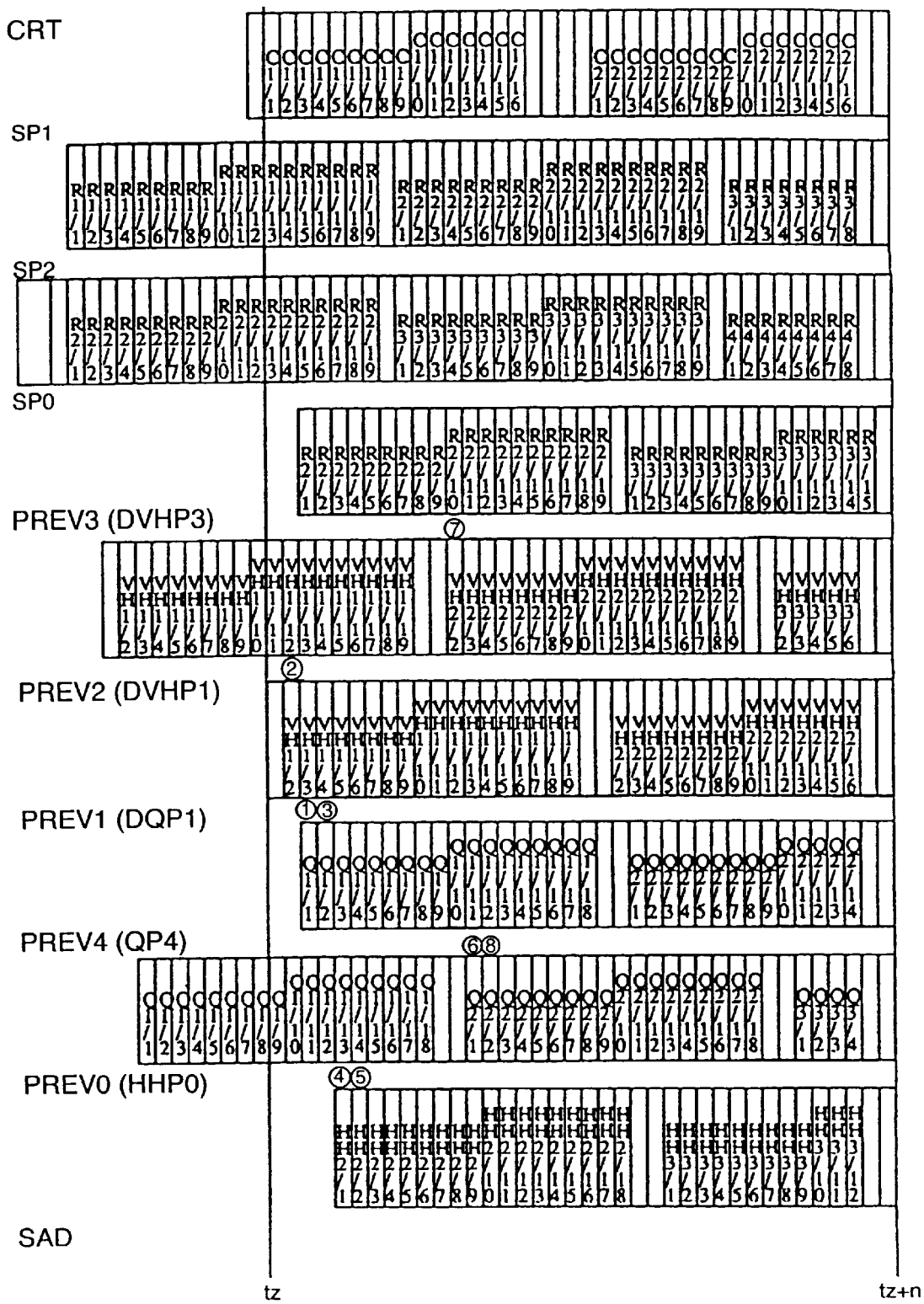
FIG. 32 is a chart to explain the S3VDC process.
Figure 35:
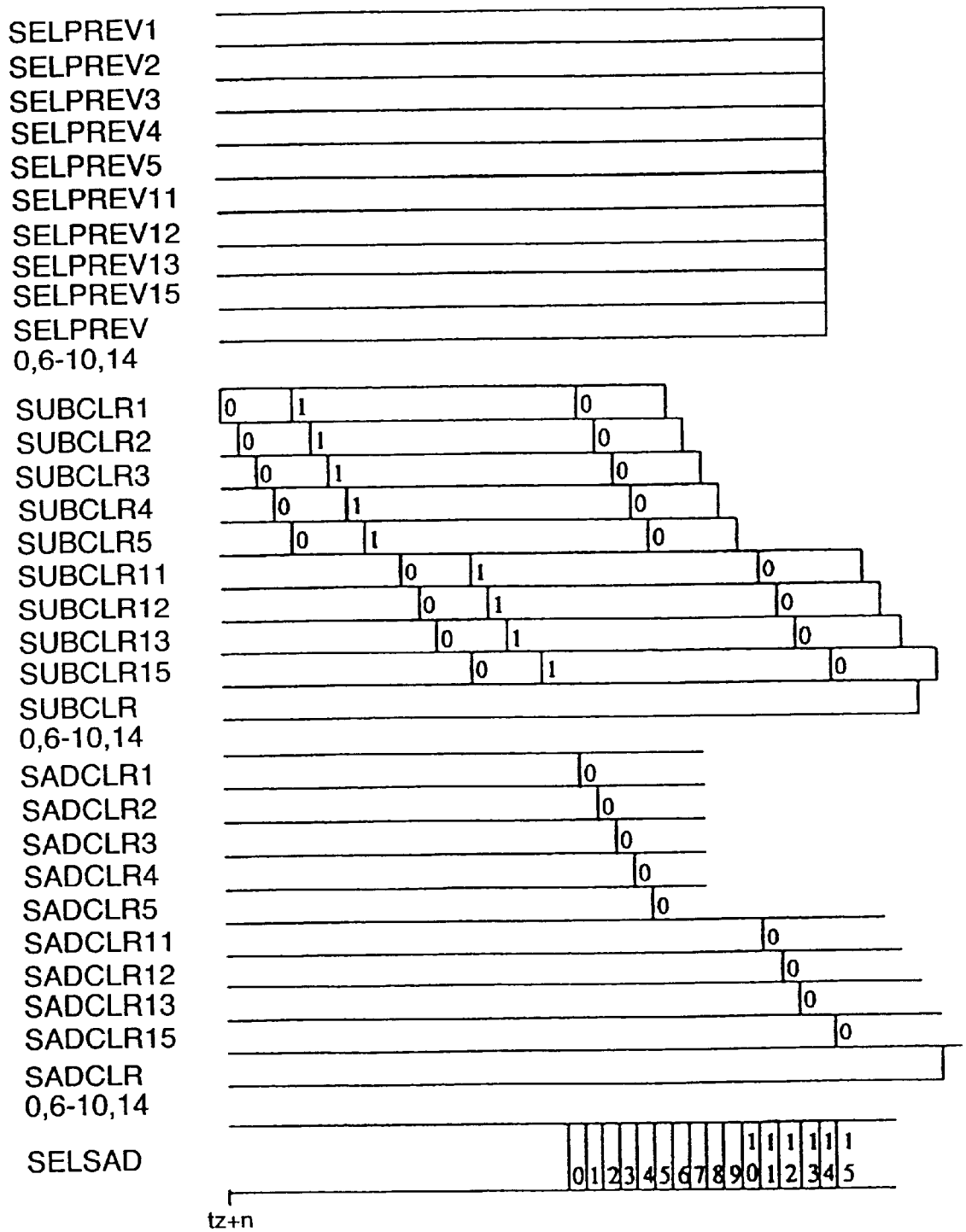
FIG. 35 is a chart to explain the S3VDC process.
Figure 36:
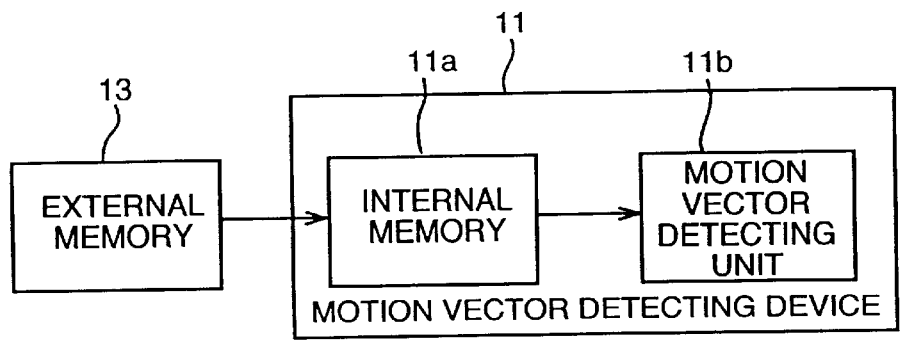
FIG. 36 is a chart to explain a conventional technique.
Figure 37:
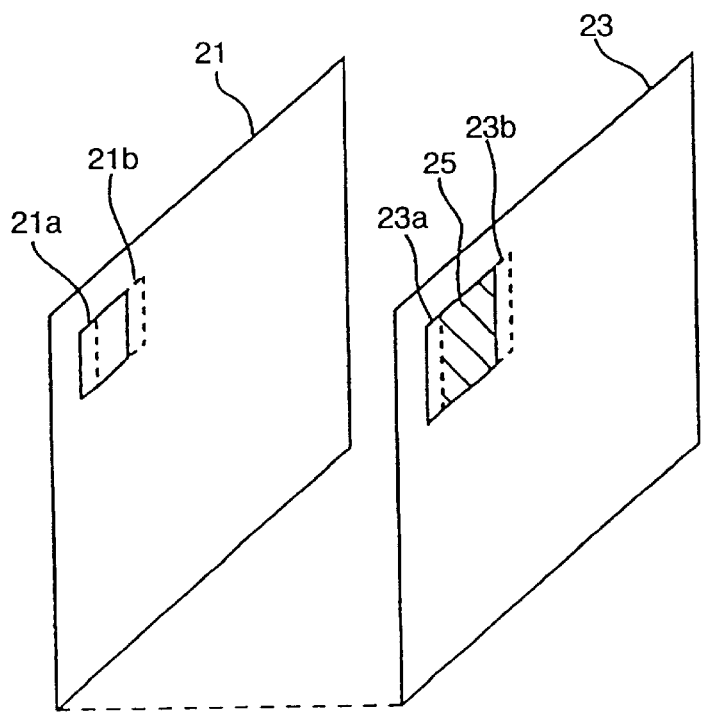
FIG. 37 is a chart to explain the conventional technique.

When the motion vector detecting unit 104 reads the data from the SRAM, as shown in the time chart in FIG. 32, the memory data receiving unit 201 of the motion vector detecting unit 104 reads the data outputted as the signal CRT, the data outputted as the signal SP0, the data outputted as the signal SP1, and the data outputted as the signal SP2, in this order.

The data distribution unit 301 outputs the SRAM data through the switch 401 to the flip-flops 405~414 as the signal MEMD0 and the signal MEMD1. And, through the selectors 416~418 and the flip-flops 420~422, the data distribution unit 301 outputs to the subsequent stages the data of the gazed block of the present screen as the signal C, the data of the horizontal second line of the reference region as the signal SP0, the data of the horizontal first line of the reference region as the signal SP1, and the data of the horizontal second line of the reference region as the signal SP2.

The data selection unit 303 selects the foregoing signal C by the selector 601, and outputs it through the flip-flop 611 as the signal CRT.

And, the image processing unit 302 generates the average value of the horizontal two pixels from the foregoing signal SP0, through the flip-flop 510 and the adder 507, and outputs the average value as the signal HHP0. And, the foregoing signals SP1, SP2 are selected by the selectors 501, 502 of the image processing unit 302 to be inputted to the adder 506. Thereby, the adder 506 generates the sum of the vertical two pixels. The generated sum is shifted right by one bit to be connected to the subsequent circuits of the image processing unit 302. That is, the signal HVHP3 as the average of the horizontal two pixels is outputted to the subsequent circuits.

The output of the flip-flop 511 being the sum of the horizontal two pixels is inputted to the adder 508 through the flip-flop 512 and the selector 503. Then, the adder 508 generates the sum of the vertical two pixel sum (previous sum) held in the flip-flop 511 until that time and the vertical two pixel sum at this time (the sum through the selector 503), namely, the four pixel sum. The four pixel sum thus generated is shifted right by two bits to be connected to the subsequent circuits of the image processing unit 302. That is, the four pixel sum is outputted as the signal QP4 to the subsequent circuits.

And, the output of the flip-flop 511 being the sum of the horizontal two pixels is inputted to the fifth means 302e (the fourth means 302d) through the selector 504 and the flip-flops 513~520.

The output of the flip-flop 521 inside the fifth means 302e is inputted to the adder 509 through the flip-flop 522. The adder 509 generates the sum of this inputted data and the data held in the flip-flop 522, namely, the four pixel sum. The four pixel sum thus generated is connected to the subsequent circuits through the flip-flops 523, 524, with two bits shifted right. That is, the four pixel sum is outputted to the subsequent circuits, as the signal DQP1 being the average of the four pixels.

And, the output of the flip-flop 521 is connected to the subsequent circuits through the flip-flop 522. However, the output is shifted right by one bit to be connected to the subsequent circuits, as the signal DVHP1 of the vertical two pixel average.

Here, the foregoing signal DQP1 is equivalent to a signal in which the signal QP4 (namely, four pixel average data) is delayed for 10 cycles. And, the signal DVHP1 is equivalent to a signal in which the signal HVHP3 (namely, vertical two pixel average data) is delayed for 10 cycles.

The reason to use the signal DQP1 and the signal DVHP1 is as follows. The circuit construction of this embodiment makes it possible to calculate the sums of the differential absolute values of some vectors in parallel. However, it is necessary to complete the leading pixel data of each block in the reference region within 16 cycles, with regard to all the vectors intended to be processed in parallel. The reason is that the leading pixel data of the gazed block of the present screen pass through the PE0~PE15 (FIG. 7) in 16 cycles, in case of the circuit construction of the differential absolute value summing calculation unit 202 in this embodiment. And, if a data input exceeds the 16 cycles, the S3VDC is required to be carried out twice, and double processing time is required, which is undesirable. On the other hand, to simply delay the longitudinal two pixel average as the signal HVHP3 and the four pixel average as the signal QP4 for 10 cycles requires 20 flip-flops. However, in case of the image processing unit 302 as shown in FIG. 5, the 10 flip-flops delay the signal HVHP3 (here, the sum of the longitudinal two pixels), and the adder generates the four pixel average from the sum of the longitudinal adjoining two pixels, thus reducing the circuit scale.

More concrete explanation will be given. First, the reference region of the half pixel accuracy in the S3VDC process will be confirmed with reference to FIG. 31.

In FIG. 31(A), the reference regions to be used include (1): a region of the four pixel average with A1 as the leading pixel, (2): a region of the longitudinal two pixel average with A2 as the leading pixel, (3): a region of the four pixel average with A3 as the leading pixel, (4): a region of the lateral two pixel average with A4 as the leading pixel, (5): a region of the lateral two pixel average with A5 as the leading pixel, (6): a region of the four pixel average with A6 as the leading pixel, (7): a region of the longitudinal two pixel average with A7 as the leading pixel, and (8): a region of the four pixel average with A8 as the leading pixel. Concretely, these reference regions (1)~(8) are illustrated in FIGS. 75~82, by the regions enclosed with thick lines.

Next, how these reference regions are inputted to the PEs of the differential absolute value summing calculation unit 202 will be described with reference to FIG. 32. Here, in FIG. 32, the symbols (1)~(8) are attached to the data parts of the foregoing reference regions (1)~(8).

The foregoing signals HHP0, HVHP3, QP4, DQP1, DVHP1 each are inputted to the data selection unit 303.

In the data selection unit 303, the selector 602 selects the signal HHP0 according to the signal SELP0. And, it outputs this HHP0 as the signal PREV0 to the differential absolute value summing calculation unit 202.

Further, in the data selection unit 303, the selector 603 selects the signal HVHP3 according to the signal SELP3. And, it outputs this HVHP3 as the signal PREV3 to the differential absolute value summing calculation unit 202.

Further, in the data selection unit 303, the selector 604 selects the signal DQP1 according to the signal SELP1. And, it outputs this DQP1 as the signal PREV1 to the differential absolute value summing calculation unit 202.

Further, in the data selection unit 303, the selector 605 selects the signal DVHP1 according to the signal SELP2. And, it outputs this DVHP1 as the signal PREV2 to the differential absolute value summing calculation unit 202.

Further, the data selection unit 303 outputs the signal QP4 as the signal PREV4 to the differential absolute value summing calculation unit 202.

Therefore, the signal PREV3 is the pixel data of the region (7) as shown in FIG. 80, namely, the region of the longitudinal two pixel average with A7 as the leading pixel. The signal PREV2 is the pixel data of the region (2) as shown in FIG. 79, namely, the region of the longitudinal two pixel average with A2 as the leading pixel. The signal PREV1 is the pixel data of the region (1) as shown in FIG. 75, namely, the region of the four pixel average with A1 as the leading pixel, and the pixel data of the region (3) as shown in FIG. 76, namely, the region of the four pixel average with A3 as the leading pixel. The signal PREV4 is the pixel data of the region (6) as shown in FIG. 77, namely, the region of the four pixel average with A6 as the leading pixel, and the pixel data of the region (8) as shown in FIG. 78, namely, the region of the four pixel average with A8 as the leading pixel. The signal PREV0 is the pixel data of the region (4) as shown in FIG. 87, namely, the region of the lateral two pixel average with A4 as the leading pixel, and the pixel data of the region (5) as shown in FIG. 82, namely, the region of the lateral two pixel average with A5 as the leading pixel.

FIG. 32 confirms that the data of the leading pixels of the reference regions (1) to (8) are arranged within 16 cycles.

And, in the differential absolute value summing calculation unit 202, the control signals SELPREVs 1~5 for the selectors 752~756 and the control signals SELEPREVs 11~13 for the selectors 762~764 are controlled as shown in FIG. 33. Thereby, the image data of the reference region are inputted to the one input terminals of the PEs 1~5 and PEs 11~13. And, the image data of the gazed block are inputted to the other input terminals of the PEs 1~5 and PEs 11~13 out of the PEs 0 to 15. With these input data are sequentially calculated (1): the sum of the differential absolute values SVH1/1 (A2 in FIG. 31) between the image data of the gazed block and the vertical two pixel average of the reference region, by PE 732, (2): the sum of the differential absolute values SQ1/1 (A1 in FIG. 31) between the image data of the gazed block and the four pixel average of the reference region, by PE733, (3): the sum of the differential absolute values SQ1/2 (A3 in FIG. 31) between the image data of the gazed block and the four pixel average of the reference region, by PE734, (4): the sum of the differential absolute values SHH1/1 (A4 in FIG. 31) between the image data of the gazed block and the horizontal two pixel average of the reference region, by PE 735, (5): the sum of the differential absolute values SHH1/2 (A5 in FIG. 31) between the image data of the gazed block and the horizontal two pixel average of the reference region, by PE 736, (6): the sum of the differential absolute values SVH2/1 (A7 in FIG. 31) between the image data of the gazed block and the vertical two pixel average of the reference region, by PE 742, (7): the sum of the differential absolute values SQ2/1 (A6 in FIG. 31) between the image data of the gazed block and the four pixel average of the reference region, by PE743, and (8): the sum of the differential absolute values SQ2/2 (A8 in FIG. 31) between the image data of the gazed block and the four pixel average of the reference region, by PE743.

Next, the minimum value of the SAD calculated in the foregoing manner is determined, and at the same time the vector value to give the minimum value and the sum of the differential absolute values are held in the register. This process is carried out as follows.

The register 1102 as shown in FIG. 13 contains the work register (flip-flop 1313 in this example) which is used as the comparison source to the sum SAD of the differential absolute values outputted from the differential absolute value summing calculation unit 202. The work register in this case holds the values in the S2VDC process as they remain. Further, during the S3VDC process, the signal SELSAD is set so that the selector 1309 can select the output from the work register. That is, the output from the work register is arranged to be selected as the signal SADMINI.

And, in the comparison unit 1101 as shown in FIG. 12, the signal SAD and the value of the work register inputted as the signal SADMINI are compared by the comparator 1208.

In this comparison, if the value of the SAD is smaller than that of the work register, the comparator 1208 brings the signal COMP to 1. Further, the AND circuit 1211 of the comparison unit 1101 makes the logical sum of the signal HOLDENA to indicate that the vector value is within the effective range and the output from the comparator 1208. And, if the vector value is within the effective range and the value of the SAD is smaller than that of the work register, the AND circuit 1211 brings the signal HOLDEN to 1.

If the signal HOLDEN is brought to 1, the value of the SAD used in this comparison is held in the work register. At the same time, the motion vector detecting unit holds the vector value used in this comparison. According to the foregoing procedure, when all the magnitude comparisons of the SADs are finished, the register unit 1102 holds the contents of the flip-flop 1313 in the latch 1321.

And, the S3VDC process utilizes vacant PEs that are not in use for the calculation of the sum of the differential absolute values by the differential absolute value summing calculation unit 202, and calculates the sum of the differential absolute values (the second sum of the differential absolute values) between the average value of all the pixels of the gazed block and each of the pixels of the gazed block. This calculation is carried out as follows, for example.

The signal MBMEAN is inputted to the PE15 through the selector 766, by setting the selector control signal SEL-PREV15 to a specific value. As already mentioned, this signal MBMEAN is calculated by utilizing a vacant PE in the S2VDC process. That is, the value subtracted from the data of the gazed block in the PE 15 is set to the MBMEAN. And, this PE calculates the sum of the differential absolute values. Accordingly, this value becomes the sum of the differential absolute values (namely, the second sum of the differential absolute values) between the average value of all the pixels of the gazed block and each of the pixels of the gazed block. This value is held in the latch 1312 of the register unit 1102.

(Judgment Operation Process of the Inter-Frame Predictive Coding)

When the determination of the minimum value of the SADs is completed, the judgment whether or not to execute the inter-frame predictive coding is carried out. This judgment is issued such that the inter-frame predictive coding is executed when the condition, for example, $SADmin \leq A+500$ is satisfied. Here, the A denotes the second sum of the differential absolute values that was calculated in the S3VDC process, the SADmin indicates the minimum value of the SADs, and the 500 is a predetermined inter-frame predictive coding parameter.

How the judgment operation of the inter-frame predictive coding is executed will be described concretely.

The selector 1308 selects the second sum A of the differential absolute values held in the latch 1312 as shown in FIG. 13, in accordance with the signal SELMB. This value A is outputted as the signal MBMEAN through the flip-flop 1322. And, the selector 1309 selects the SADmin held in the latch 1321 in accordance with the signal SELSAD, and outputs it as the signal SADMINI.

This signal MBMEAN is selected by the selector 766 of the differential absolute value summing calculation unit 202 as shown in FIG. 7, and inputted to the PE15. This output of the PE15 is outputted as the signal SAD through the selector 767 and the flip-flop 722.

Further, the second sum A of the differential absolute values is inputted to the comparison unit 1101 in FIG. 12 as the signal SAD, and the signal SADMINI is inputted to the other input terminal of the comparator 1208. At that moment, the selector 1205 is supplied with the signal SELPARA so that the selector 1205 can select the content of the latch 1203 (the inter-frame predictive coding judgment parameter). Accordingly, the adder 1207 adds the output of the latch 1203 (namely, the inter-frame predictive coding parameter) and the second sum A of the differential absolute values. This addition result and the SADmin are compared by the comparator 1210. In other words, the judgment as to whether the condition $SADmin \leq A+500$ is satisfied is executed. And, the comparator 1210 outputs the comparison result.

Further, when the comparator 1210 outputs the comparison result of the foregoing SADmin against (A+inter-frame predictive coding parameter), the signal REGEN is brought to 1. In response to this, the foregoing comparison result is held in the latch 1314. In accordance with this result, the inter-frame predictive coding is either executed or not executed. Since the inter-frame predictive coding is not the characteristic of the present invention, the description will be omitted.

Further, the present invention is not at all limited to the foregoing embodiment, and various modifications and changes can be made in many ways. The circuit construction of each part, for example, can be made up with other constructions than the foregoing examples, which give similar functions to the foregoing examples.

As clearly understood from the foregoing description, according to one aspect of the invention, the motion vector detecting device is provided with the image processing unit that reduces at least one of the gazed block and the reference region into a form that can be used for the detection of the motion vector in the first step, and thereafter, transfers the reduced data to the internal memory. Therefore, the capacity of the internal memory can be reduced.

According to the standard H.263, for example, the reference region required for searching the motion vectors in one gazed block consists of 48 pixels×48 lines. To store this reference region in the internal memory requires a memory region of 2304 bytes, assuming that one pixel consists of 8 bits. In this invention, however, the region used in the reference screen needs 24 pixels×23 lines in the first step for searching the motion vector, and 18 pixels×18 lines in the second and third steps. Therefore, the necessary capacity for the internal memory is 876 bytes in total, assuming that one pixel consists of 8 bits. Therefore, the capacity of the internal memory can be cut down to about ⅓ compared with the conventional one.

Further, in the construction wherein the image processing unit can be used for both the generation of the reduced image and the generation of the reference region of the half pixel accuracy, a part of the circuits used in the first and the third steps can be shared. Accordingly, the circuit scale of the motion vector detecting device can be reduced.

Further, according to another aspect of the invention, the motion vector detecting device is provided with the reference region preparation unit that rewrites new data into only a part of the reference region stored in the internal memory, and thereby forms the reference region for the gazed block for this time in the internal memory. Accordingly, the number of the processes to transfer the image data of the reference region from the external memory to the internal memory can be reduced; and to that extent, the speed of the motion vector detecting process can be increased.

According to the standard H.263, for example, the reference region required for searching the motion vectors in one gazed block consists of 48 pixels×48 lines. The number of accesses to the external memory to obtain such a region amounts to 288, assuming that one access can read 8 pixels. In this invention, however, assuming that the internal memory is rewritten by ⅓ each time, the reference region to be accessed in the external memory can be reduced to 16 pixels×46 lines. And, the region to be accessed in the external memory in the second step consists of 18 pixels×18 lines. Therefore, in this invention, to obtain the reference region for one gazed block needs 150 accesses to the external memory including the first and the second steps. Therefore, the number of accesses can be reduced to about half, as compared with the conventional one.

Further, according to another aspect of the invention, the motion vector detecting device is provided with the differential absolute value summing calculation unit including a plurality of the processor elements (PE) that calculate the sum of the differential absolute values (the first sum of the differential absolute values) between the pixel data of the gazed block and the pixel data of the reference region. The differential absolute value summing calculation unit calculates either one of the average value of all the pixels of the gazed block being the parameter used for the judgment of the inter-frame predictive coding and the sum of the differential absolute values (the second sum of the differential absolute values) between the concerned average value and each of the pixel data of the gazed block using the PE which is not used in the calculation of the differential absolute value in any of the time of either the first or second step.

Therefore, the calculation of the parameter can be executed at the same time with each step of searching the motion vector, which shortens the processing time to detect the motion vector as compared with the conventional one.

Therefore, the motion vector detecting device relating to the invention is able to increase the processing speed and to simplify the device construction, as compared with the conventional motion vector detecting device.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A motion vector detecting device in which a process, including a first step to reduce each of a gazed block of a present screen and a reference region of a reference screen and search a block most similar to the reduced gazed block in the reduced reference region, and a second step to search a block most similar to the gazed block in a part, including the block searched in the first step, of the non-reduced reference region, detects the motion vector of the gazed block, wherein the gazed block and the reference region are stored in an internal memory, and the searches are executed on the basis of the stored information, the motion vector detecting device comprising an image processing unit that reduces the gazed block and the reference region into a reduced form for use in the search of the first step, and thereafter, transfers the result of the reduction to the internal memory, wherein the reduction is performed by calculating at least one pixel average of two adjoining pixels.

2. The motion vector detecting device as claimed in claim 1, wherein the image processing unit is used to sequentially reduce at least one of the gazed block and the reference region into a reduced form for use in the search of the first step, and thereafter, the image processing unit transfers the result of the reduction to the internal memory.

3. The motion vector detecting device as claimed in claim 1, wherein the image processing unit is used to reduce the reference region into a reduced form for use in the search of the first step.

4. The motion vector detecting device as claimed in claim 1, wherein:

the motion vector detecting device executes a third step that calculates an average of adjoining pixel data in a part including the block searched in the second step to thereby generate a new pixel, generates a new reference region of a half pixel accuracy with the new pixel and the original pixel, and searches a block most similar to the gazed block from the reference region of a half pixel accuracy, and the image processing unit is also used as a means to generate the reference region of a half pixel accuracy.

5. A motion vector detecting device in which a process, including a first step to reduce each of a gazed block of a present screen and a reference region of a reference screen and search a block most similar to the reduced gazed block in the reduced reference region, and a second step to search a block most similar to the gazed block in a part, including the block searched in the first step, of the non-reduced reference region, detects the motion vector of the gazed block, wherein the gazed block and the reference region are stored in an internal memory, and the searches are executed on the basis of the stored information, the motion vector detecting device comprising an image processing unit that reduces at least one of the gazed block and the reference region into a reduced form for use in the search of the first step, and thereafter, transfers the result of the reduction to the internal memory, the image processing unit comprising:
a first means to add values of horizontal two pixels of an image to thereby generate a horizontal two pixel average,
a second means to be selectively used as either a means to add values of horizontal two pixels of the image to thereby generate a horizontal two pixel average, or a means to add values of vertical two pixels to thereby generate a vertical two pixel average, and
a third means to add a sum calculated by the second means and a sum calculated in the past by the second means to thereby generate a four pixel average.

6. The motion vector detecting device as claimed in claim 5, wherein the sum calculated in the past is a sum that the second means calculated in the previous adding process, or a sum calculated in the adding process executed previously for one horizontal line of an image against the adding process executed at this time.

7. The motion vector detecting device as claimed in claim 5, wherein the image processing unit further comprises:
a fourth means that is selectively supplied with either a sum by the second means of a value of horizontal one pixel and delays the inputted value for a specific time, and
a fifth means that is selectively supplied with either a value inputted to the fourth means or a value that is inputted to the fourth means and is delayed by the fourth means, and adds the inputted value and a value similarly inputted in the past to the fifth means to generate an average value thereof.

8. A motion vector detecting device that searches a part most similar to a gazed block of a present screen from a reference region of a reference screen to detect a motion vector of the gazed block, in which the gazed block and the reference region, including a case in which the gazed block and the reference region are in a reduced state, the motion vector detecting device comprising a reference region preparation unit that rewrites new data into only a part of the reference region that was stored in the internal memory in order to detect the motion vector of a previous gazed block, and thereby forms a reference region for a gazed block for this time in the internal memory.

9. The motion vector detecting device as claimed in claim 8, wherein, when a region of the internal memory in which the reference region is stored is defined as first through n-th blocks, the reference region preparation unit rewrites data cyclically by each block of the first through n-th blocks in order from the first block to the n-th block, at each serial operation that sequentially detects the motion vector of the gazed block.

10. The motion vector detecting device as claimed in claim 1, the motion vector detecting device being connected to an inter-frame predictive coding device and further comprising:
a differential absolute value summing calculation unit, including a plurality of processor elements (PE), that calculates, for the searches in the first and second steps, a first sum of differential absolute values between pixel data of the gazed block and pixel data of the reference region,
wherein the differential absolute value summing calculation unit is used as a calculation unit which uses a PE that is not in use for the calculation of the first sum of differential absolute values during a period of the first step, and thereby calculates an average value of all the pixels of the gazed block, the average value being a parameter used for judging whether or not to execute an inter-frame predictive coding, and which also uses a PE that is not in use for the calculation of the first sum of differential absolute values during a period of the second step, and thereby calculates a second sum of differential absolute values between the average value of all the pixels of the gazed block and each pixel data of the gazed block.

11. The motion vector detecting device as claimed in claim 10, wherein:
the motion vector detecting device executes a third step that calculates an average value of adjoining pixel data in a part of the non-reduced reference region including the block searched in the second step to thereby generate a new pixel, generates a new reference region of a half pixel accuracy with the new pixel and the original pixels, and searches a block most similar to the gazed block from the reference region of a half pixel accuracy, and
the differential absolute value summing calculation unit uses a PE that is not in use for the calculation of the first sum of the differential absolute values during the period of the second step to thereby calculate an average value of all the pixels of the gazed block, and uses a PE that is not in use for the calculation of the differential absolute values during the period of the third step to thereby calculate the second sum of differential absolute values.

12. The motion vector detecting device as claimed in claim 1, further comprising a reference region preparation unit that rewrites new data into only a part of the reference region that was stored in the internal memory in order to detect the motion vector of a previous gazed block, and thereby forms a reference region for a gazed block for this time in the internal memory.

13. The motion vector detecting device as claimed in claim 1, further comprising a differential absolute value summing calculation unit that comprises processor elements (PE) and uses a PE that is not in use for calculation of a first sum of differential absolute values during a period of the first step, and thereby calculates an average value of all the pixels of the gazed block, the average value being a parameter used for judging whether or not to execute an inter-frame predictive coding, and also uses a PE that is not in use for calculation of a first sum of differential absolute values during a period of the second step, and thereby calculates a second sum of differential absolute values between the average value of all the pixels of the gazed block and each pixel data of the gazed block.

14. The motion vector detecting device as claimed in claim 8, further comprising a differential absolute value summing calculation unit that comprises processor elements (PE) and uses a PE that is not in use for calculation of a first sum of differential absolute values during a period of a first step, and thereby calculates an average value of all the pixels of the gazed block, the average value being a parameter used for judging whether or not to execute an inter-frame predictive coding, and also uses a PE that is not in use for calculation of a first sum of differential absolute values during a period of a second step, and thereby calculates a second sum of differential absolute values between the average value of all the pixels of the gazed block and each pixel data of the gazed block.

15. The motion vector detecting device as claimed in claim 1, further comprising:

a reference region preparation unit that rewrites new data into only a part of the reference region that was stored in the internal memory in order to detect the motion vector of a previous gazed block, and thereby forms a reference region for a gazed block for this time in the internal memory, and a differential absolute value summing calculation unit that comprises processor elements (PE) and uses a PE that is not in use for calculation of a first sum of differential absolute values during a period of the first step, and thereby calculates an average value of all the pixels of the gazed block, the average value being a parameter used for judging whether or not to execute an inter-frame predictive coding, and also uses a PE that is not in use for calculation of a first sum of differential absolute values during a period of the second step, and thereby calculates a second sum of differential absolute values between the average value of all the pixels of the gazed block and each pixel data of the gazed block.

16. The motion vector detecting device as claimed in claim 4, further comprising a differential absolute value summing calculation unit that comprises processor elements (PE) and uses a PE that is not in use for calculation of a first sum of differential absolute values during a period of the second step to thereby calculate an average value of all the pixels of the gazed block, and uses a PE not in use for the calculation of the first sum of differential absolute values during the period of the third step to thereby calculate a second sum of differential absolute values.

17. The motion vector detecting device as claimed in claim 4, further comprising:

a reference region preparation unit that rewrites new data into only a part of the reference region that was stored in the internal memory in order to detect the motion vector of a previous gazed block, and thereby forms a reference region for a gazed block for this time in the internal memory, and a differential absolute value summing calculation unit that comprises processor elements (PE) and uses a PE that is not in use for calculation of a first sum of differential absolute values during a period of the second step to thereby calculate an average value of all the pixels of the gazed block, and uses a PE that is not in use for calculation of a first sum of differential absolute values during a period of the third step to thereby calculate a second sum of differential absolute values.

18. The motion vector detecting device as claimed in claim 4, further comprising:

a reference region preparation unit that, when a region of the internal memory in which the reference region is stored is defined as first through n-th blocks, rewrites data cyclically by each block of the first through n-th blocks in order from the first block to the n-th block, at each serial operation that sequentially detects the motion vector of the gazed block, and a differential absolute value summing calculation unit that comprises processor elements (PE) and uses a PE that is not in use for calculation of a first sum of differential absolute values during a period of the second step to thereby calculate an average value of all the pixels of the gazed block, and uses a PE that is not in use for calculation of a first sum of differential absolute values during a period of the third step to thereby calculate a second sum of differential absolute values.

* * * * *